(12) United States Patent
Suwa et al.

(10) Patent No.: US 10,754,200 B2
(45) Date of Patent: Aug. 25, 2020

(54) LIQUID CRYSTAL DISPLAY APPARATUS

(71) Applicant: SONY CORPORATION, Tokyo (JP)

(72) Inventors: Shunichi Suwa, Kanagawa (JP);
Masashi Miyakawa, Kanagawa (JP);
Chikashi Kobayashi, Kanagawa (JP);
Yoji Nagase, Kanagawa (JP)

(73) Assignee: SONY CORPORATION, Tokyo (JP)

(*) Notice: Subject to any disclaimer, the term of this patent is extended or adjusted under 35 U.S.C. 154(b) by 5 days.

(21) Appl. No.: 15/678,280

(22) Filed: Aug. 16, 2017

(65) Prior Publication Data

US 2017/0343861 A1 Nov. 30, 2017

Related U.S. Application Data

(63) Continuation of application No. 14/069,468, filed on Nov. 1, 2013, now Pat. No. 9,753,330.

(30) Foreign Application Priority Data

Nov. 8, 2012 (JP) .................................. 2012-246598

(51) Int. Cl.
*G02F 1/1337* (2006.01)
*G02F 1/1343* (2006.01)

(52) U.S. Cl.
CPC .. *G02F 1/133707* (2013.01); *G02F 1/133753* (2013.01); *G02F 1/134309* (2013.01); *G02F 2001/133776* (2013.01)

(58) Field of Classification Search
None
See application file for complete search history.

(56) References Cited

U.S. PATENT DOCUMENTS 6,118,505 A * 9/2000 Nagata .............. G02F 1/136209
349/106
8,253,890 B2 * 8/2012 Zhong ............... G02F 1/136213
349/106

(Continued)

FOREIGN PATENT DOCUMENTS

CN 1737673 A 2/2006
CN 101965537 A 2/2011

(Continued)

OTHER PUBLICATIONS

Notice of Allowance and Fees Due (PTOL-85) for U.S. Appl. No. 14/069,468, dated May 3, 2017, 09 pages.

(Continued)

*Primary Examiner* — Richard H Kim
(74) *Attorney, Agent, or Firm* — Chip Law Group

(57) ABSTRACT

According to some aspects, a liquid crystal display panel comprising an electrode is provided. The electrode comprises a plurality of convex branch electrode portions arranged in a plane, the convex branch electrode portions being convex when viewed from a first direction perpendicular to the plane and extending from a central region of the electrode to a periphery of the electrode, and a plurality of concave branch electrode portions, the concave branch electrode portions being concave when viewed from the first direction, extending from the central region to the periphery and adjacent to convex branch electrode portions. According to some aspects, a method of applying a pretilt to molecules in a liquid crystal layer of a liquid crystal display panel by applying a voltage to the liquid crystal layer via first and second electrodes is provided.

10 Claims, 49 Drawing Sheets

(56) References Cited

U.S. PATENT DOCUMENTS

| | | | |
|---|---|---|---|
| 2010/0182557 A1 | 7/2010 | You et al. | |
| 2011/0260957 A1 | 10/2011 | Jeong et al. | |
| 2011/0317104 A1 | 12/2011 | Nakamura et al. | |
| 2014/0111753 A1 | 4/2014 | Kobayashi et al. | |
| 2014/0340625 A1* | 11/2014 | Hsu .................... | G02F 1/13454 349/153 |

FOREIGN PATENT DOCUMENTS

| | | |
|---|---|---|
| JP | 05-232473 A | 9/1993 |
| JP | 2002-357830 A | 12/2002 |
| JP | 2004-302260 A | 10/2004 |
| JP | 2011-232736 A | 11/2011 |
| TW | 200407592 A | 5/2004 |

OTHER PUBLICATIONS

Non-Final Rejection for U.S. Appl. No. 14/069,468, dated Oct. 17, 2016, 9 pages.
Advisory Action (PTOL-303) for U.S. Appl. No. 14/069,468, dated Sep. 8, 2016, 2 pages.
Final Rejection for U.S. Appl. No. 14/069,468, dated Jun. 28, 2016, 13 pages.
Non-Final Rejection for U.S. Appl. No. 14/069,468, dated Feb. 22, 2016, 12 pages.
Office Action for CN Patent Application No. 201310470016.4, dated Jul. 13, 2017, 09 pages of Office Action and 11 pages of English Translation.

\* cited by examiner

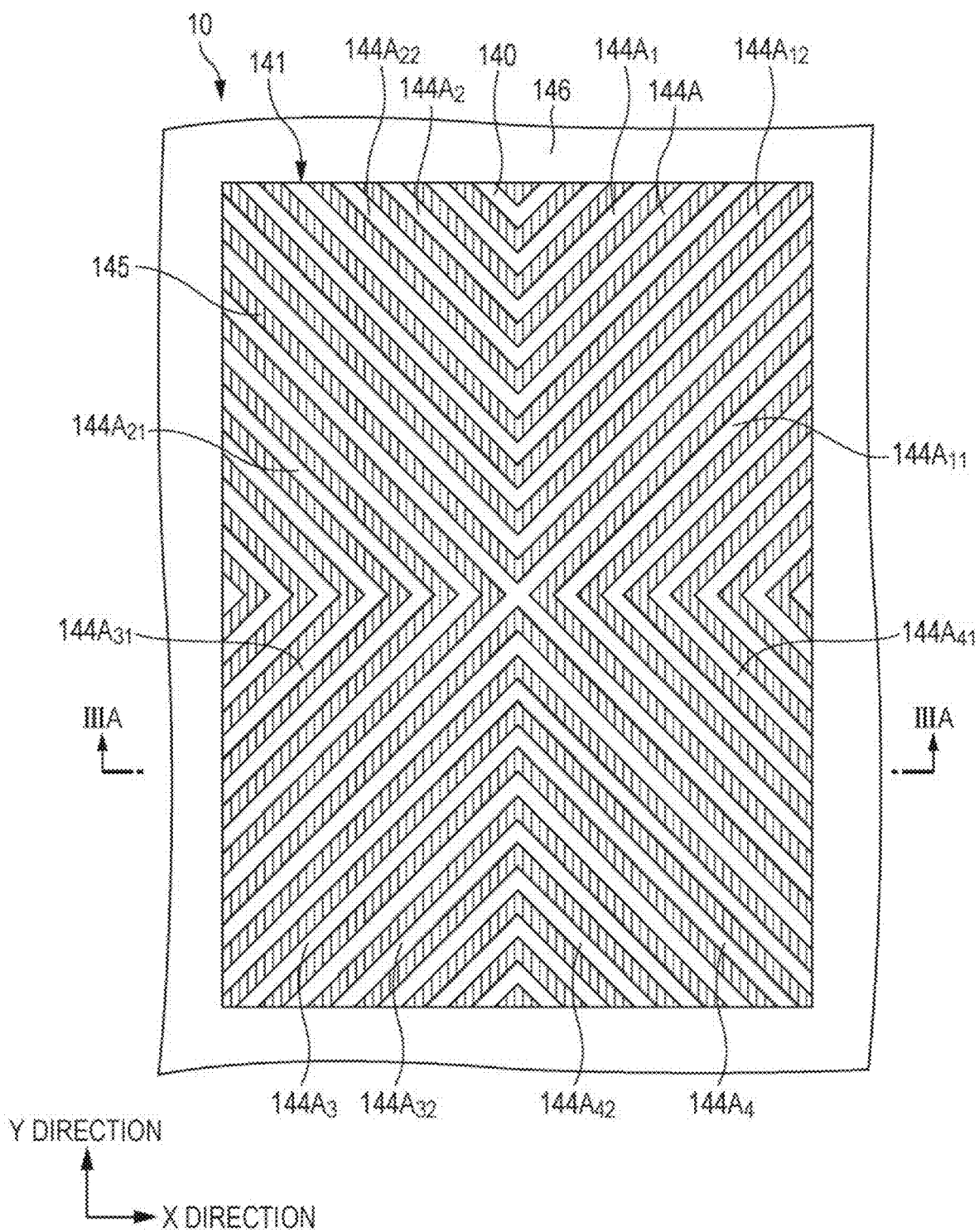

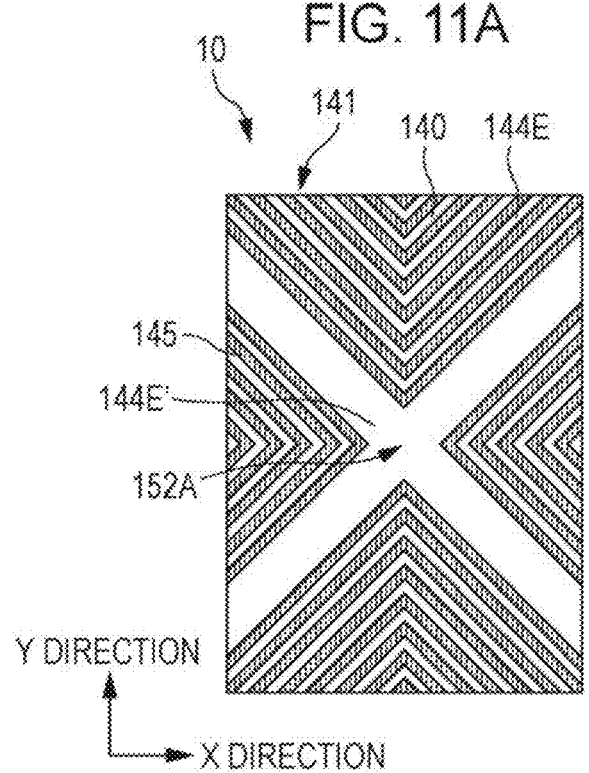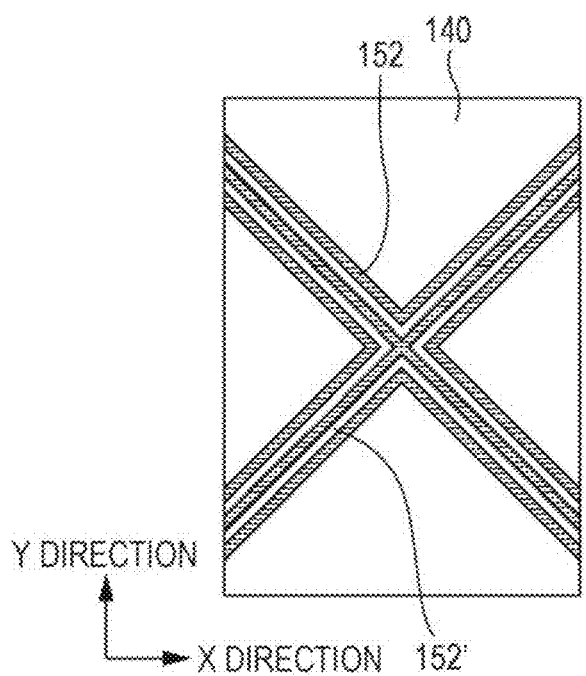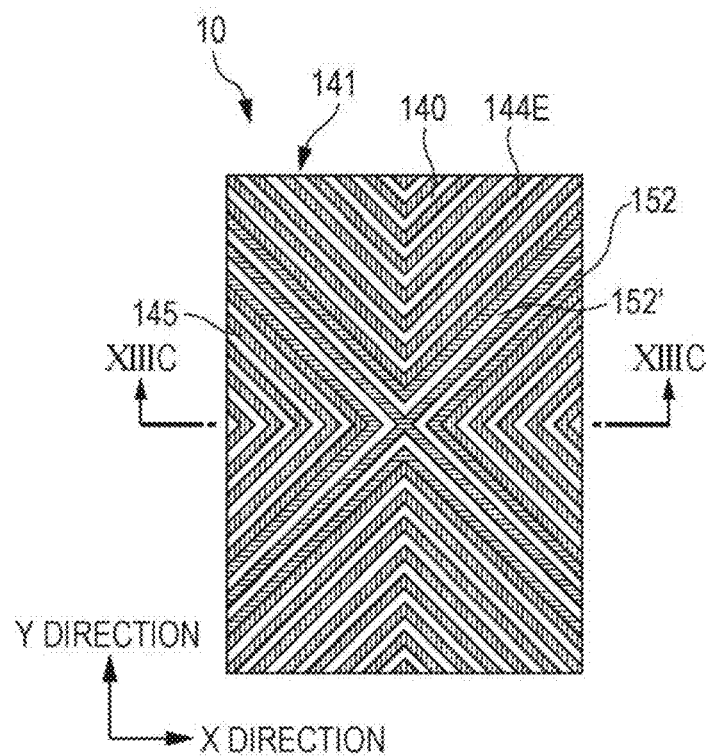

LIQUID CRYSTAL DISPLAY APPARATUS

CROSS REFERENCE TO RELATED APPLICATIONS

The present disclosure is a continuation of U.S. patent application Ser. No. 14/069,468 filed in USPTO on Nov. 1, 2013 which claims priority from Japanese Priority Patent Application JP 2012-246598 filed in the Japan Patent Office on Nov. 8, 2012. Each of the above referenced applications is hereby incorporated by reference in its entirety.

BACKGROUND

The present disclosure relates to a liquid crystal display apparatus that includes a liquid crystal display device in which a liquid crystal layer is sealed between a pair of substrates that includes an alignment film on an opposed surface thereof.

In recent years, a liquid crystal display (LCD) has been widely used as a display monitor of a liquid crystal television, a notebook personal computer, a car navigation device or the like. The liquid crystal display has various display modes (types) according to molecular arrangement (alignment) of liquid crystal molecules included in a liquid crystal layer disposed between substrates. For example, a twisted nematic (TN) mode in which liquid crystal molecules are aligned to be twisted in a state where voltage is not applied is known as a display mode. In the TN mode, the liquid crystal molecules have a positive dielectric anisotropy, that is, a characteristic that a dielectric constant in a long axis direction of the liquid crystal molecules is larger than that in a short axis direction thereof. Thus, the liquid crystal molecules have a structure in which an alignment direction of the liquid crystal molecules sequentially rotates in a plane that is in parallel to a substrate surface to be aligned in a direction that is orthogonal to the substrate surface.

On the other hand, a vertical alignment (VA) mode in which liquid crystal molecules are aligned vertically with respect to a substrate surface in a state where voltage is not applied has attracted attention. In the VA mode, the liquid crystal molecules have a negative dielectric anisotropy, that is, a characteristic that a dielectric constant in a long axis direction of the liquid crystal molecules is smaller than that in a short axis direction thereof, and is capable of realizing a wide viewing angle compared with the TN mode.

In the liquid crystal display of such a VA mode, if voltage is applied, the liquid crystal molecules that are aligned in the vertical direction with respect to a substrate react to fall down in a direction that is parallel to the substrate due to the negative dielectric anisotropy, to thereby transmit light. However, since the falling direction of the liquid crystal molecules aligned in the vertical direction with respect to the substrate is random, the alignment of the liquid crystal molecules is disturbed by the voltage application, which causes deterioration of a response characteristic to voltage.

In order to regulate alignment of liquid crystal molecules in application of voltage, various techniques have been proposed. For example, a multi-domain vertical alignment (MVA) technique or a patterned vertical alignment (PVA) technique, or a technique that uses an alignment film (for example, refer to Japanese Unexamined Patent Application Publication No. 5-232473) have been proposed. In the MVA technique, an alignment control is performed using a slit or a rib (protrusion) to realize a wide viewing angle. In addition, recently, a structure (hereinafter, may be referred to as a fine slit structure) in which a plurality of fine slits is formed in an electrode (specifically, a pixel electrode) formed in one substrate and an electrode (specifically, a counter electrode) formed in the other substrate is provided as a so-called solid electrode having no slit has been proposed (for example, refer to Japanese Unexamined Patent Application Publication No. 2002-357830). However, in the fine slit structure, a part to which an electric field is not applied occurs in slits formed of fine lines and spaces, and an alignment state of liquid crystal molecules in application of voltage has a twisted structure, which lowers light transmittance.

In order to solve the above problem, a technique in which concave and convex portions instead of a plurality of fine slits are formed in a pixel electrode is disclosed in Japanese Unexamined Patent Application Publication No. 2011-232736. In this technique, in one pixel, the plurality of concave and convex portions includes a stem convex portion that extends on the X axis and the Y axis, and a plurality of branch convex portions that extends from side edges of the stem convex portion to the periphery of the pixel. Further, an extension direction of the side edges of the stem convex portion that is not joined to the branch convex portions is parallel to the X axis and is parallel to the Y axis.

SUMMARY

The technique disclosed in Japanese Unexamined Patent Application Publication No. 2011-232736 may effectively suppress occurrence of the above problem in the fine slit structure, but dark lines are easily generated in a part of the stem convex portion. Moreover, it is necessary to reduce the occurrence of dark lines, that is, to realize uniform and high light transmittance. Further, in order to regulate alignment of liquid crystal molecules in application of voltage, a pre-tilt is given to the liquid crystal molecules in a liquid crystal layer when a liquid crystal display apparatus is manufactured. Here, in order to give the pre-tilt to the liquid crystal molecules, the liquid crystal layer is exposed in a desired electric field for a predetermined time. However, certain time is necessary until alignment of the liquid crystal molecules exposed in the desired electric field is stabilized.

FIG. 49A is a photomicrograph illustrating an alignment state of liquid crystal molecules in three pixels when a liquid crystal layer starts being exposed in a desired electric field for a predetermined time in order to give a pre-tilt to the liquid crystal molecules, and FIG. 49B is a photomicrograph illustrating an alignment state of liquid crystal molecules in three pixels after a liquid crystal layer is exposed in a desired electric field for a predetermined time in order to give a pre-tilt to the liquid crystal molecules. Solid lines that extend in a transverse direction represent a black matrix provided between pixels. As shown in FIG. 49A, when the liquid crystal layer starts being exposed in the desired electric field for the predetermined time in order to give the pre-tilt to the liquid crystal molecules, a central part of a boundary portion of the liquid crystal molecules that are present in a region corresponding to four quadrants to be described later is not positioned at the center of the pixel. On the other hand, as shown in FIG. 49B, after the liquid crystal layer is exposed in the desired electric field for the predetermined time in order to give the pre-tilt to the liquid crystal molecules, the central part of the boundary portion of the liquid crystal molecules that are present in the region corresponding to four quadrants is positioned at the center of the pixel. In a liquid crystal display apparatus in the related art shown in FIG. 48 (details of which will be described later), about 5 to 10 minutes are necessary until the state shown in FIG. 49A is changed to the state shown in FIG. 49B.

Thus, it is desirable to provide a liquid crystal display apparatus that is capable of realizing uniform and high light transmittance. Further, it is also desirable to provide a liquid crystal display apparatus having a configuration or structure that is capable of giving a pre-tilt to liquid crystal molecules in a short time.

According to some aspects, a liquid crystal display panel comprising an electrode is provided. The electrode comprises a plurality of convex branch electrode portions arranged in a plane, the convex branch electrode portions being convex when viewed from a first direction perpendicular to the plane and extending from a central region of the electrode to a periphery of the electrode, and a plurality of concave branch electrode portions, the concave branch electrode portions being concave when viewed from the first direction, extending from the central region to the periphery and adjacent to convex branch electrode portions. According to some aspects, a method of applying a pretilt to molecules in a liquid crystal layer of a liquid crystal display panel by applying a voltage to the liquid crystal layer via first and second electrodes is provided.

As a result, it is possible to increase an alignment regulation force with respect to the liquid crystal molecules in the vicinity of the center of the pixel, and to reliably regulate the tilt state of the liquid crystal molecules in the vicinity of the center of the pixel.

According to this configuration, although the liquid crystal layer is exposed in a desired electric field for a predetermined time to give a pre-tilt to the liquid crystal molecules when the liquid crystal display apparatus is manufactured, it is possible to reduce the time necessary until the alignment of the liquid crystal molecules exposed in the desired electric field is stabilized. That is, it is possible to give the pre-tilt to the liquid crystal molecules in a short time, and to reduce the manufacturing time of the liquid crystal display apparatus.

BRIEF DESCRIPTION OF THE DRAWINGS

FIG. 2 is a plan view schematically illustrating a first electrode corresponding to one pixel that forms the liquid crystal display apparatus according to Example 1;

FIGS. 11A, 11B and 11C are a diagram schematically illustrating an arrangement state of a convex portion, a concave portion, a central region and the like, a diagram schematically illustrating an arrangement state of a slit portion provided in a first electrode, and a diagram illustrating an overlapped state of the concave and convex portions and the slit portion, in another modification example of a pixel that forms the liquid crystal display apparatus according to Example 5, respectively;

DETAILED DESCRIPTION

Figure 1:
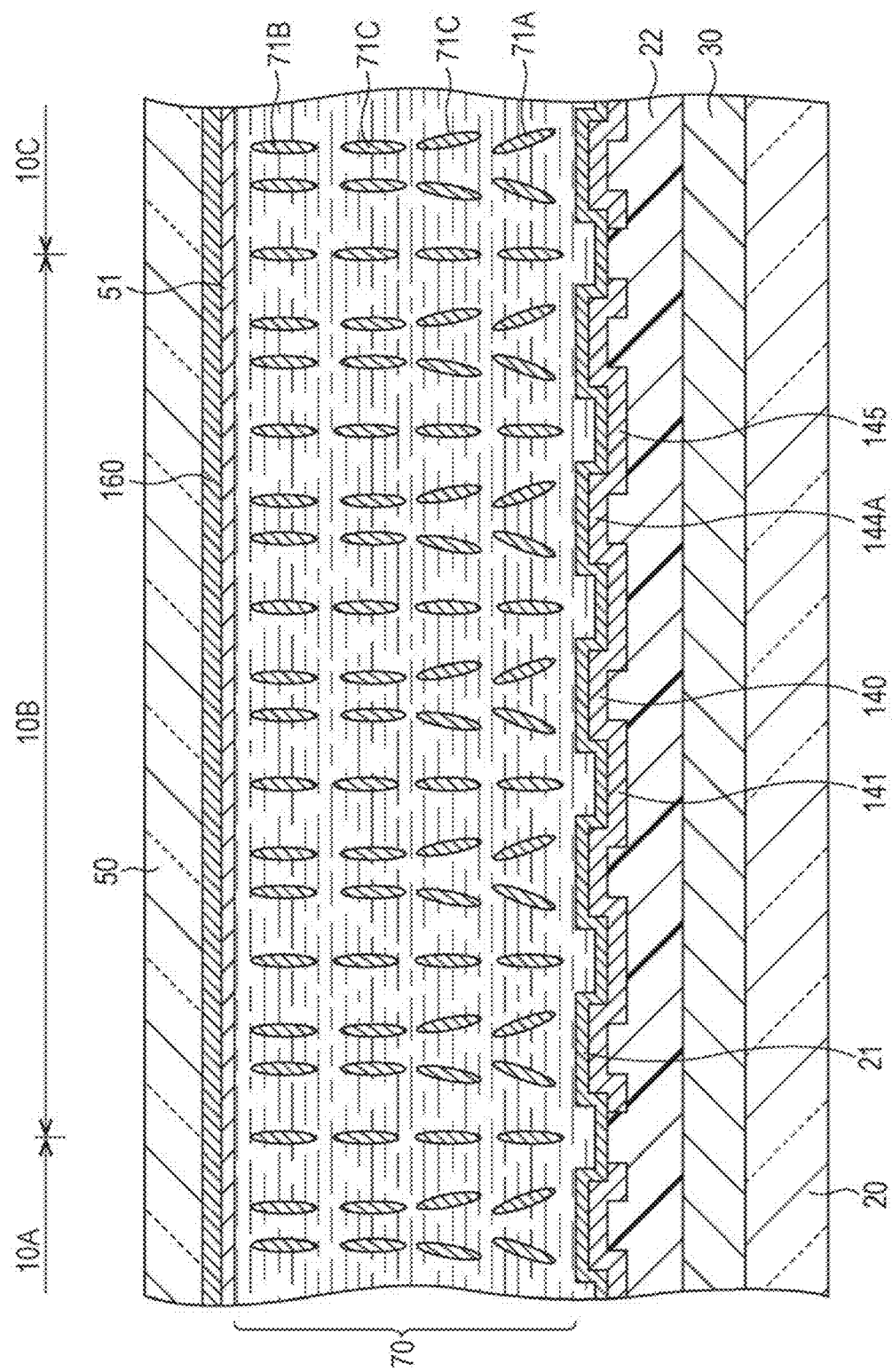
FIG. 1 is a local sectional view schematically illustrating a liquid crystal display apparatus according to Example 1 of the present disclosure.

Hereinafter, the present disclosure will be described referring to examples, but the present disclosure is not limited to the examples. Further, various numerical values or materials in the examples are shown as examples. Hereinafter, description will be made in the following order.
1. Overall description of liquid crystal display apparatus according to Embodiment 1 to Embodiment 5 of the present disclosure
2. Example 1 (liquid crystal display apparatus according to Embodiment 1 of the present disclosure)
3. Example 2 (modification of Example 1)
4. Example 3 (another modification of Example 1)
5. Example 4 (still another modification of Example 1)
6. Example 5 (still another modification of Example 1, liquid crystal display apparatus according to Embodiment 1-A of the present disclosure, and liquid crystal display apparatus according to Embodiment 3 of the present disclosure)
7. Example 6 (still another modification of Example 1, liquid crystal display apparatus according to Embodiment 1-B of the present disclosure, liquid crystal display apparatus according to Embodiment 3-B of the present disclosure, and liquid crystal display apparatus according to Embodiment 4 of the present disclosure)
8. Example 7 (still another modification of Example 1, liquid crystal display apparatus according to Embodiment 1-C of the present disclosure, liquid crystal display apparatus according to Embodiment 3-C of the present disclosure, liquid crystal display apparatus according to Embodiment 4-C of the present disclosure, and liquid crystal display apparatus according to Embodiment 5 of the present disclosure)
9. Example 8 (liquid crystal display apparatus according to Embodiment 2 of the present disclosure, liquid crystal display apparatus according to Embodiment 2-A of the present disclosure, liquid crystal display apparatus according to Embodiment 2-B of the present disclosure, liquid crystal display apparatus according to Embodiment 2-C of the present disclosure, liquid crystal display apparatus according to Embodiment 3 of the present disclosure, liquid crystal display apparatus according to Embodiment 3-B of the present disclosure, liquid crystal display apparatus according to Embodiment 3-C of the present disclosure, liquid crystal display apparatus according to Embodiment 4 of the present disclosure, liquid crystal display apparatus according to Embodiment 4-C of the present disclosure, and liquid crystal display apparatus according to Embodiment 5 of the present disclosure)
10. Example 9 (modification of Example 8)
11. Example 10 (another modification of Example 8)
12. Example 11 (modification of Example 10)
13. Example 12 (another modification of Example 10)
14. Example 13 (liquid crystal display apparatus according to Embodiment 5 of the present disclosure), and others Overall description of liquid crystal display apparatus according to Embodiment 1 to Embodiment 5 of the present disclosure An arrangement state of convex portions or branch convex portions (hereinafter, may be referred to as "branch convex portions or the like") as mentioned above are referred to as a multi-domain electrode structure. Here, since regions where extension directions of the branch convex portions or the like are different are formed in one pixel, it is possible to enhance a viewing angle characteristic. Preferably, a plurality of branch convex portions or the like that occupies a first quadrant has an axis line that extends at 45 degrees with respect to the X axis, a plurality of branch convex portions or the like that occupies a second quadrant has an axis line that extends at 135 degrees with respect to the X axis, a plurality of branch convex portions or the like that occupies a third quadrant has an axis line that extends at 225 degrees with respect to the X axis, and a plurality of branch convex portions or the like that occupies a fourth quadrant has an axis line that extends at 315 degrees with respect to the X axis, but this values (angles) are not limitative. Further, "assuming that the X axis and the Y axis pass through the center of a pixel" specifically represents "assuming that an (X, Y) coordinate system is formed by the X axis and the Y axis that pass through the center of the pixel and are in parallel to edge portions of the pixel", for example. Except for a liquid crystal display apparatus according to Embodiment 5 of the present disclosure, it is preferable that the branch convex portions or the like be linearly symmetric with respect to the X axis and be also symmetric with respect to the Y axis. Further, in a liquid crystal display apparatus according to Embodiment 1 to Embodiment 5 of the present disclosure, it is preferable that the branch convex portions or the like be rotationally symmetric (point symmetric) with respect to the center of the pixel at 180 degrees.

In a liquid crystal display apparatus according to Embodiment 1 of the present disclosure, a stem convex portion is not provided, differently from a liquid crystal display apparatus according to Embodiment 2 of the present disclosure. Convex portions in the liquid crystal display apparatus according to Embodiment 1 of the present disclosure substantially corresponds to branch convex portions in the liquid crystal display apparatus according to Embodiment 2 of the present disclosure. Here, each convex portion that extends from the X axis and occupies a first quadrant is joined to each convex portion that extends from the X axis and occupies a fourth quadrant, each convex portion that extends from the Y axis and occupies the first quadrant is joined to each convex portion that extends from the Y axis and occupies a second quadrant, each convex portion that extends from the X axis and occupies the second quadrant is joined to each convex portion that extends from the X axis and occupies a third quadrant, and each convex portion that extends from the Y axis and occupies the third quadrant is joined to each convex portion that extends from the Y axis and occupies the fourth quadrant.

Further, in such a configuration in the liquid crystal display apparatus according to Embodiment 1 of the present disclosure, a protrusion that extends in a direction toward the periphery of a pixel may be provided at a junction of two convex portions. Here, the protrusion may be surrounded by a plurality of segments, a single curve, a plurality of curves, or a combination of a segment and a curve. The tip of the protrusion may be in contact with the junction of two adjacent convex portions in the direction toward the periphery of the pixel. Here, the liquid crystal display apparatus in which the contact portion is long substantially corresponds to the liquid crystal display apparatus according to Embodiment 2 of the present disclosure.

Further, in the liquid crystal display apparatus according to Embodiment 1 of the present disclosure, a configuration may be used in which each convex portion that extends from the X axis or the vicinity thereof and occupies the first quadrant is not joined to each convex portion that extends from the X axis or the vicinity thereof and occupies the fourth quadrant, each convex portion that extends from the Y axis or the vicinity thereof and occupies the first quadrant is not joined to each convex portion that extends from the Y axis or the vicinity thereof and occupies the second quadrant, each convex portion that extends from the X axis or the vicinity thereof and occupies the second quadrant is not joined to each convex portion that extends from the X axis or the vicinity thereof and occupies the third quadrant, and each convex portion that extends from the Y axis or the vicinity thereof and occupies the third quadrant is not joined to each convex portion that extends from the Y axis or the vicinity thereof and occupies the fourth quadrant.

In the liquid crystal display apparatus according to Embodiment 1 of the present disclosure that includes preferable various structures or configurations described above, the width of the convex portion may be narrowed toward the periphery of the pixel.

Further, in the liquid crystal display apparatus according to Embodiment 1 of the present disclosure that includes preferable various structures or configurations described above, a slit portion may be formed in a first electrode. This configuration is referred to as a "liquid crystal display apparatus according to Embodiment 1-A of the present disclosure", for ease of description.

Here, in the liquid crystal display apparatus according to Embodiment 1-A of the present disclosure, the slit portion may be formed in a concave portion region, but the slit portion may be preferably formed in a convex portion region. Further, in such a configuration, the slit portion may be provided in a convex portion region including a central region (central part) of the pixel, may be formed in a convex portion region that extends toward the central region of the pixel, or may be formed in a convex portion region provided in a region that is narrowed by the convex portions that extend toward the central region of the pixel and the Y axis. The width of the slit portion may be 1 μm to 4 μm, and preferably, 2 μm to 3 μm, for example. This is similarly applied to description about a slit portion to be described below.

Further, the slit portion that extends in parallel with the convex portion may be formed at a top part of the convex portion, or the slit portion that extends in parallel with the concave portion may be formed at a bottom part of the concave portion. In this case, the slit portion may be formed in the entire convex portion or may be formed in a part of the convex portion. In a case where the slit portion is formed in the part of the convex portion, it is preferable to form the slit portion in the convex portion in a central region (central part) of the pixel and in the vicinity thereof. Further, the slit portion may be formed in the entire concave portion or may be formed in a part of the concave portion. In a case where the slit portion is formed in the part of the concave portion, it is preferable to form the slit portion in the concave portion in the central region (central part) of the pixel and in the vicinity thereof. Further, the slit portion that extends in parallel with the convex portion may be formed at a top part of the convex portion, and the slit portion that extends in parallel with the concave portion may be formed at a bottom part of the concave portion. In this case, the slit portion may be formed in the entire convex portion, or may be formed in a part of the convex portion. Further, the slit portion may be formed in the entire concave portion or may be formed in a part of the concave portion. In a part of the top surface of the convex portion where the slit portion is not provided, the first electrode is formed, and in a part of the bottom part of the concave portion where the slit portion is not provided, the first electrode is formed. Here, it is necessary to form the slit portion so that a convex portion is not separated from the other convex portions due to the slit portion, or so that a concave portion is not separated from the other concave portions due to the slit portion. However, in a display apparatus of a so-called multi pixel driving method in which one pixel is divided into a plurality of regions and the respective regions are independently driven, in the respective regions, it is preferable to form the slit portion so that a convex portion is not separated from the other convex portions due to the slit portion, or so that a concave portion is not separated from the other concave portions due to the slit portion. In a case where the slit portion is provided at the top surface of the convex portion, the width of the convex portion and the width of the slit portion may have the relationship of 0.2≤(width of slit portion/width of convex portion)≤0.8, for example, and in a case where the slit portion is provided at the bottom surface of the concave portion, the width of the concave portion and the width of the slit portion may have the relationship of 0.2≤(width of slit portion/width of concave portion)≤0.8. This is similarly applied to description about a slit portion to be described below.

Further, in the liquid crystal display apparatus according to Embodiment 1-A of the present disclosure and the liquid crystal display apparatus according to Embodiment 1 of the present disclosure that includes the above-described preferable various configurations or structures, a recess may be provided in the first electrode in a central region of the pixel. Such a configuration is referred to as the "liquid crystal display apparatus according to Embodiment 1-B of the present disclosure", for ease of description.

Here, in the liquid crystal display apparatus according to Embodiment 1-B of the present disclosure, the recess may be narrowed toward the first electrode. That is, the recess may have a so-called forward tapered slope. Here, the recess is not limited thereto, and may have a vertical surface. In the configuration where the recess is narrowed toward the first electrode, an inclination angle of the recess may be 5 degrees to 60 degrees, and preferably 20 degrees to 30 degrees. Further, in the liquid crystal display apparatus according to Embodiment 1-B of the present disclosure that includes such a preferable configuration, an outer shape of the recess may be a circle or a rectangle. In the latter case, an angle formed by an outer edge of the rectangular recess and the extension direction of the convex portion (angle formed by the outer edge of the rectangular recess and the extension direction of the convex portion where the outer edge and an extension portion of the convex portion intersect with each other) may be 90 degrees or may be an acute angle. The outer shape of the recess is not limited thereto, and any shape in which the liquid crystal molecules fall down toward the center of the pixel may be used.

Further, in the liquid crystal display apparatus according to Embodiment 1-B of the present disclosure that includes the above-described preferable configuration, a configuration in which the central part of the recess forms a part of a contact hole may be used.

The regulation relating to the liquid crystal display apparatus according to the above-described Embodiment 1-B of the present disclosure may be applied to a liquid crystal display apparatus according to Embodiment 2-B of the present disclosure and a liquid crystal display apparatus according to Embodiment 3-B of the present disclosure to be described later.

Further, in the liquid crystal display apparatus according to Embodiment 1-A of the present disclosure, Embodiment 1-B of the present disclosure, and Embodiment 1 of the present disclosure that includes the above described preferable various configurations, the convex portions that extend from the X axis or the vicinity thereof and occupy the first quadrant and the convex portions that extend from the X axis or the vicinity thereof and occupy the fourth quadrant may be formed in a state of deviating from each other; the convex portions that extend from the Y axis or the vicinity thereof and occupy the first quadrant and the convex portions that extend from the Y axis or the vicinity thereof and occupy the second quadrant may be formed in a state of deviating from each other; the convex portions that extend from the X axis or the vicinity thereof and occupy the second quadrant and the convex portions that extend from the X axis or the vicinity thereof and occupy the third quadrant may be formed in a state of deviating from each other; and the convex portions that extend from the Y axis or the vicinity thereof and occupy the third quadrant and the convex portions that extend from the Y axis or the vicinity thereof and occupy the fourth quadrant may be formed in a state of deviating from each other. Such a configuration is referred to as a "liquid crystal display apparatus according to Embodiment 1-C of the present disclosure", for ease of description.

When the formation pitch of the convex portions along the X axis is Px and the formation pitch of the convex portions along the Y axis is Py, it is preferable that the convex portions that extend from the X axis or the vicinity thereof and occupy the first quadrant and the convex portions that extend from the X axis or the vicinity thereof and occupy the fourth quadrant be formed in a state of deviating from each other by (Px/2); the convex portions that extend from the Y axis or the vicinity thereof and occupy the first quadrant and the convex portions that extend from the Y axis or the vicinity thereof and occupy the second quadrant be formed in a state of deviating from each other (Py/2); the convex portions that extend from the X axis or the vicinity thereof and occupy the second quadrant and the convex portions that extend from the X axis or the vicinity thereof and occupy the third quadrant be formed in a state of deviating from each other by (Px/2); and the convex portions that extend from the Y axis or the vicinity thereof and occupy the third quadrant and the convex portions that extend from the Y axis or the vicinity thereof and occupy the fourth quadrant be formed in a state of deviating from each other by (Py/2). This is similarly applied to a liquid crystal display apparatus according to Embodiment 2-C of the present disclosure, a liquid crystal display apparatus according to Embodiment of 3-C of the present disclosure, and a liquid crystal display apparatus according to Embodiment of 4-C of the present disclosure.

Similarly, in a liquid crystal display apparatus according to Embodiment 5 of the present disclosure, when the formation pitch of branch convex portions along the X axis is Px and the formation pitch of the branch convex portions along the Y axis is Py, it is preferable that the branch convex portions that extend from the stem convex portion on the X axis and occupy the first quadrant and the branch convex portions that extend from the stem convex portion on the X axis and occupy the fourth quadrant be formed in a state of deviating from each other (Px/2), the branch convex portions that extend from the stem convex portion on the Y axis and occupy the first quadrant and the branch convex portions that extend from the stem convex portion on the Y axis and occupy the second quadrant be formed in a state of deviating from each other (Py/2), the branch convex portions that extend from the stem convex portion on the X axis and occupy the second quadrant and the branch convex portions that extend from the stem convex portion on the X axis and occupy the third quadrant be formed in a state of deviating from each other (Px/2), and the branch convex portions that extend from the stem convex portion on the Y axis and occupy the third quadrant and the branch convex portions that extend from the stem convex portion on the Y axis and occupy the fourth quadrant be formed in a state of deviating from each other (Py/2).

In a liquid crystal display apparatus according to Embodiment 2 of the present disclosure, a side edge part of the stem convex portion that is not joined to the branch convex portions may be a straight line shape and/or a curved line shape, that is, may be the straight line shape, the curved line shape or a combination of the straight line shape and the curved line shape.

In the liquid crystal display apparatus according to Embodiment 2 of the present disclosure that includes such a preferable configuration, the width of a part of the stem convex portion that is not joined to the branch convex portions may be decreased toward a tip part of the stem convex portion.

Further, in the liquid crystal display apparatus according to Embodiment 2 of the present disclosure that includes such a preferable configuration, the width of the branch convex portion may be decreased toward the periphery of the pixel.

Furthermore, in the liquid crystal display apparatus according to Embodiment 2 of the present disclosure that includes the above-described various preferable configurations, a slit portion may be formed in the first electrode. Such a configuration is referred to as a "liquid crystal display apparatus according to Embodiment 2-A of the present disclosure", for ease of description.

Here, in the liquid crystal display apparatus according to Embodiment 2-A of the present disclosure, the slit portion may be formed in a concave portion region, but the slit portion may be preferably formed in a convex portion region. Further, in such a configuration, the slit portion may be provided in a convex portion region including a central region (central part) of the pixel, may be formed in a convex portion region that extends toward the central region of the pixel, or may be formed in a convex portion region provided in a region that is narrowed by the branch convex portions that extend toward the central region of the pixel and the Y axis. Further, the slit portion that extends in parallel with the convex portion may be formed at a top part of the convex portion, or the slit portion that extends in parallel with the concave portion may be formed at a bottom part of the concave portion. It is necessary to form the slit portion so that a convex portion is not separated from the other convex portions due to the slit portion, or so that a concave portion is not separated from the other convex portions due to the slit portion. In a display apparatus of the above-mentioned multi pixel driving method, it is preferable to form the slit portion as described above.

In the liquid crystal display apparatus according to Embodiment 2-A of the present disclosure and the liquid crystal display apparatus according to Embodiment 2 of the present disclosure that includes the above-described various configurations, a recess is provided in the first electrode in a central region of the pixel. Such a configuration is referred to as the "liquid crystal display apparatus according to Embodiment 2-B of the present disclosure", for ease of description.

In the liquid crystal display apparatus according to Embodiment 2-A, Embodiment 2-B, and Embodiment 2 of the present disclosure that includes the above-described preferable various configurations, a plurality of branch convex portions that occupies a first quadrant may extend in parallel in a direction where a value on the Y coordinate increases when a value on the X coordinate increases; a plurality of branch convex portions that occupies a second quadrant may extend in parallel in a direction where a value on the Y coordinate increases when a value on the X coordinate decreases; a plurality of branch convex portions that occupies a third quadrant may extend in parallel in a direction where a value on the Y coordinate decreases when a value on the X coordinate decreases; and a plurality of branch convex portions that occupies a fourth quadrant may extend in parallel in a direction where a value on the Y coordinate decreases when a value on the X coordinate increases.

Further, in the liquid crystal display apparatus according to Embodiment 2-A of the present disclosure, Embodiment 2-B of the present disclosure, and the liquid crystal display apparatus according to Embodiment 2 of the present disclosure that includes the above-described various configurations, the branch convex portions that extend from the stem convex portion on the X axis and occupy the first quadrant and the branch convex portions that extend from the stem convex portion on the X axis and occupy the fourth quadrant may be formed in a state of deviating from each other; the branch convex portions that extend from the stem convex portion on the Y axis and occupy the first quadrant and the branch convex portions that extend from the stem convex portion on the Y axis and occupy the second quadrant may be formed in a state of deviating from each other; the branch convex portions that extend from the stem convex portion on the X axis and occupy the second quadrant and the branch convex portions that extend from the stem convex portion on the X axis and occupy the third quadrant may be formed in a state of deviating from each other; and the branch convex portions that extend from the stem convex portion on the Y axis and occupy the third quadrant and the branch convex portions that extend from the stem convex portion on the Y axis and occupy the fourth quadrant may be formed in a state of deviating from each other. Such a configuration is referred to as a "liquid crystal display apparatus according to Embodiment 2-C of the present disclosure", for ease of description.

In a liquid crystal display apparatus according to Embodiment 3 of the present disclosure, a slit portion may be formed in a concave portion region, but the slit portion may be preferably formed in a convex portion region. Further, in such a configuration, the slit portion may be provided in a convex portion region including a central region (central part) of the pixel, may be formed in a convex portion region that extends toward the central region of the pixel, or may be formed in a convex portion region provided in a region that is narrowed by the branch convex portions that extend toward the central region of the pixel and the Y axis. Further, the slit portion that extends in parallel with the convex portion may be formed at the top of the convex portion, or the slit portion that extends in parallel with the concave portion may be formed at the bottom part of the concave portion. It is necessary to form the slit portion so that a convex portion is not separated from the other convex portions due to the slit portion, or so that a concave portion is not separated from the other convex portions due to the slit portion. In a display apparatus of the above-mentioned multi pixel driving method, it is preferable to form the slit portion as described above.

Further, in the liquid crystal display apparatus according to Embodiment 3 of the present disclosure that includes the above-described preferable various configurations, the width of the convex may be narrowed toward the periphery of the pixel.

Furthermore, in the liquid crystal display apparatus according to Embodiment 3 of the present disclosure that includes the above-described preferable configurations, a recess is provided in the first electrode in a central region of the pixel. Such a configuration is referred to as a "liquid crystal display apparatus according to Embodiment 3-B of the present disclosure", for ease of description.

Further, in the liquid crystal display apparatus according to Embodiment 3-B, and the liquid crystal display apparatus according to Embodiment 3 of the present disclosure that includes the above-described preferable configurations, assuming that the X axis and the Y axis pass through the center of a pixel, a plurality of concave and convex portions may include a stem convex portion that extends on the X axis and the Y axis, and a plurality of branch convex portions that extends from a side edge of the stem convex portion toward the periphery of the pixel. Further, in this case, a plurality of branch convex portions that occupies a first quadrant may extend in parallel in a direction where a value on the Y coordinate increases when a value on the X coordinate increases; a plurality of branch convex portions that occupies a second quadrant may extend in parallel in a direction where a value on the Y coordinate increases when a value on the X coordinate decreases; a plurality of branch convex portions that occupies a third quadrant may extend in parallel in a direction where a value on the Y coordinate decreases when a value on the X coordinate decreases; and a plurality of branch convex portions that occupies a fourth quadrant may extend in parallel in a direction where a value on the Y coordinate decreases when a value on the X coordinate increases. Further, the branch convex portions that extend from the stem convex portion on the X axis and occupy the first quadrant and the branch convex portions that extend from the stem convex portion on the X axis and occupy the fourth quadrant may be formed in a state of deviating from each other; the branch convex portions that extend from the stem convex portion on the Y axis and occupy the first quadrant and the branch convex portions that extend from the stem convex portion on the Y axis and occupy the second quadrant may be formed in a state of deviating from each other; the branch convex portions that extend from the stem convex portion on the X axis and occupy the second quadrant and the branch convex portions that extend from the stem convex portion on the X axis and occupy the third quadrant may be formed in a state of deviating from each other; and the branch convex portions that extend from the stem convex portion on the Y axis and occupy the third quadrant and the branch convex portions that extend from the stem convex portion on the Y axis and occupy the fourth quadrant may be formed in a state of deviating from each other. Such a configuration is referred to as a "liquid crystal display apparatus according to Embodiment 3-C of the present disclosure", for ease of description.

In a liquid crystal display apparatus according to Embodiment 4 of the present disclosure, a configuration in which the central part of the recess forms a part of a contact hole may be used. Here, the regulation relating to the liquid crystal display apparatus according to Embodiment 1-B of the present disclosure may be applied to the liquid crystal display apparatus according to Embodiment 4 of the present disclosure.

In the liquid crystal display apparatus according to Embodiment 4 of the present disclosure that includes the above-described preferable configuration, the regulation relating to the liquid crystal display apparatus according to Embodiment 3-C of the present disclosure may be applied thereto, and such a liquid crystal display apparatus is referred to as a "liquid crystal display apparatus according to Embodiment 4-C of the present disclosure", for ease of description.

In the liquid crystal display apparatuses according to Embodiment 1 to 5 of the present disclosure that include the above-described preferable configurations (hereinafter, may be generally referred to as the "liquid crystal display apparatus of the present disclosure"), in the configuration in which the width of a branch convex portion or the like is narrowed toward the periphery of the pixel, the width of the branch convex portion or the like may be linearly narrowed toward the periphery of the pixel (configuration in which each side edge that forms the branch convex portion or the like includes one segment and the rate of change of the width is constant), but the configuration is not limitative. That is, the width may be narrowed in a curved shape (configuration in which each side edge that forms the branch convex portion or the like includes one smooth curve and the rate of change of the width varies). Further, each side edge that forms the branch convex portion or the like may be formed by two or more segments or curves, or may be narrowed in a step shape (configuration in which each side edge that forms the branch convex portion or the like has a step shape).

In the liquid crystal display apparatus of the present disclosure, an alignment regulating portion may be formed in a part of the second electrode that faces the X axis and the Y axis. If the alignment regulating portion is formed in the part of the second electrode corresponding to the stem convex portion in this way, an electric field generated by the second electrode is distorted in the vicinity of the alignment regulating portion, and the direction where the liquid crystal molecules disposed in the vicinity of the alignment regulating portion fall down is regulated. Consequently, it is possible to increase an alignment regulation force with respect to the liquid crystal molecules in the vicinity of the alignment regulating portion, and to reliably regulate the tilt state of the liquid crystal molecules in the vicinity of the alignment regulating portion. Thus, when an image is displayed, it is possible to reliably suppress the problem that dark lines are generated in a part of the image corresponding to the X axis and the Y axis. That is, it is possible to provide a liquid crystal display apparatus capable of realizing uniform and high light transmittance while maintaining an excellent voltage response characteristic, to achieve reduction in cost of a light source that forms a backlight and low power consumption, and to achieve improvement in reliability of the TFT.

The alignment regulating portion may be formed as a second electrode slit portion provided in the second electrode, may be formed as a second electrode protrusion provided in the second electrode, or may be formed as a part of the second electrode of a protrusion shape. For example, the second electrode protrusion is formed of a resist material, and the second electrode is not formed thereon. In order to provide the part of the protrusion-shaped second electrode, a convex portion may be formed on a lower side of the second electrode. Further, the part of the protrusion-shaped second electrode may be provided by the same method as a convex portion forming method of the concave and convex portions in the first electrode.

Further, in the liquid crystal display apparatus of the present disclosure, a plurality of step portions may be formed in the convex portion provided in the first electrode. Further, the cross-sectional shape of the convex portion when the convex portion is cut on a virtual vertical plane orthogonal to the extension direction of the stem convex portion may be a cross-sectional shape that the step portions go down from the center of the cross-sectional shape of the convex portion toward edges of the cross-sectional shape of the convex portion. Further, the cross-sectional shape of the convex portion when the convex portion is cut on a virtual vertical plane parallel to the extension direction of the convex portion may be a cross-sectional shape that the step portions go down from the center of the cross-sectional shape of the convex portion toward edges of the cross-sectional shape of the convex portion. If the plurality of step portions (height difference) is formed in the convex portion in this way, strong and weak parts of an electric field are generated in the convex portion, to thereby cause a lateral electric field. As a result, it is possible to strengthen the alignment regulation force with respect to the liquid crystal molecules at the central part of the convex portion, and to reliably regulate the tilt state of the liquid crystal molecules at the central part of the convex portion. Thus, when an image is displayed, it is possible to reliably suppress the problem that dark lines are generated in a part of the image corresponding to the convex portion. That is, it is possible to provide a liquid crystal display apparatus capable of realizing uniform and high light transmittance while maintaining an excellent voltage response characteristic, to achieve reduction in cost of a light source that forms a backlight and low power consumption, and to achieve improvement in reliability of the TFT.

In the liquid crystal display apparatuses of the present disclosure that includes the above-described various preferable configurations, the liquid crystal molecules may have a negative dielectric anisotropy.

The liquid crystal display apparatus or the liquid crystal display device of the present disclosure may be obtained by a method of manufacturing the liquid crystal display apparatus or the liquid crystal display device, including forming a first electrode on a first substrate and forming a first alignment film on an opposed surface of the first substrate that faces a second substrate and on the first electrode; forming a second electrode on the second substrate and forming a second alignment film on an opposed surface of the second substrate that faces the first substrate and on the second electrode; arranging the first substrate and the second substrate so that the first alignment film and the second alignment film face each other and sealing a liquid crystal layer between the first alignment film and the second alignment film; and applying a predetermined electric field to align liquid crystal molecules.

Further, in this case, it is preferable to apply the electric field so that the liquid crystal molecules are aligned in a direction of being inclined with respect to a surface of at least one substrate of the pair of substrates. Here, basically, when a pre-tilt is given, an azimuth angle (declination) of the liquid crystal molecules is regulated by the strength and direction of the electric field, and a polar angle (zenith angle) is regulated by the strength of the electric field. As necessary, the azimuth angle (declination) and the polar angle (zenith angle) of the liquid crystal molecules when the pre-tilt is given may be regulated by a molecular structure of an alignment film material.

The applying the predetermined electric field to align the liquid crystal molecules includes causing an alignment control material to react while applying the predetermined electric field to the liquid crystal layer that includes the liquid crystal molecules and the alignment control material to align the liquid crystal molecules and to give the pre-tilt. Such a method of manufacturing the liquid crystal display apparatus is referred to as a polymer stabilized alignment (PSA) method. Further, the application of the predetermined electric field to align the liquid crystal molecules includes causing an alignment control material to react while applying the predetermined electric field to the liquid crystal layer in a state where the alignment film that includes the alignment control material is formed on the opposed surface of at least one substrate and the electrode to align the liquid crystal molecules and to give the pre-tilt. Such a method of manufacturing the liquid crystal display apparatus is referred to as a field-induced photo-reactive alignment (FPA) method.

The pair of substrates includes a substrate that has a pixel electrode and a substrate that has a counter electrode. Here, for example, the first substrate may be the substrate that has the pixel electrode, and the second substrate may be the substrate that has the counter electrode. A color filter layer is formed on the side of the substrate (second substrate) that has the counter electrode, or the color filter layer is formed on the side of the substrate (first substrate) that has the pixel electrode. A circuit for driving the pixel such as a TFT is provided on the substrate (first substrate) that has the pixel electrode. A layer that includes the circuit for driving the pixel such as a TFT may be referred to as a "TFT layer". In a case where the color filter layer is formed on the side of the substrate (second substrate) that has the counter electrode, a planarizing layer is formed on the TFT layer, and the first electrode is formed on the planarizing layer. On the other hand, in a case where the color filter layer is formed on the side of the substrate (first substrate) that has the pixel electrode, the color filter layer is formed on the TFT layer, and the first electrode is formed on the color filter layer, on an overcoat layer formed on the color filter layer or on a passivation film made of an inorganic material. In the liquid crystal display apparatus, in a case where the pixel includes a plurality of sub pixels, the pixel may be replaced by the sub pixel. The first electrode and the second electrode may be formed of a transparent conductive material having transparency such as indium tin oxide (ITO), IZO, ZnO or SnO. Further, the second electrode may be formed as a so-called solid electrode (non-patterned electrode). For example, a first polarizing plate is attached to an outer surface of the first substrate, and a second polarizing plate is attached to an outer surface of the second substrate. The first polarizing plate and the second polarizing plate are disposed so that absorption axes thereof are orthogonal to each other. It is preferable that the absorption axis of the first polarizing plate be parallel to the X axis or the Y axis, and the absorption axis of the second polarizing plate be parallel to the Y axis or the X axis, but the absorption axes are not limited thereto.

Figure 43:
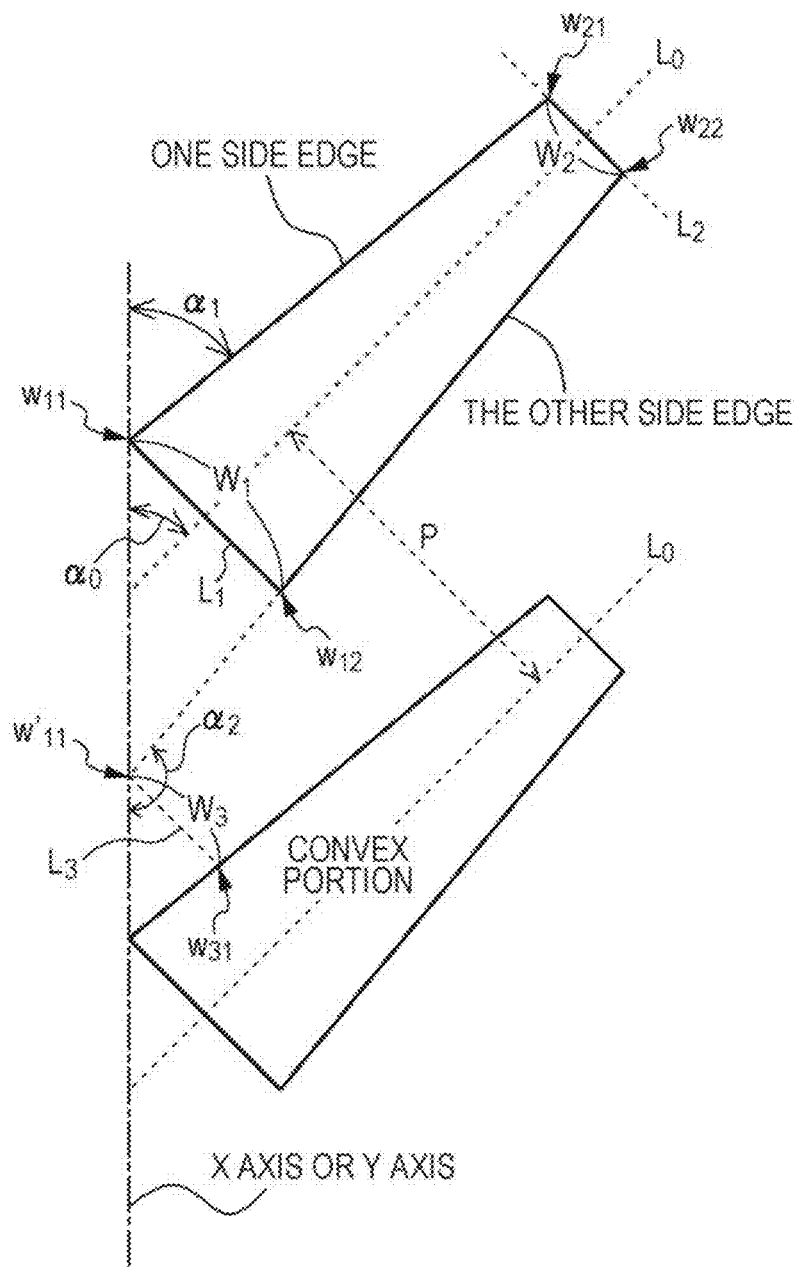
FIG. 43 is a plan view schematically illustrating a part of a convex portion, for illustration of the pitch and width of the convex portion, and the width of a tip part of the convex portion.
Figure 44:
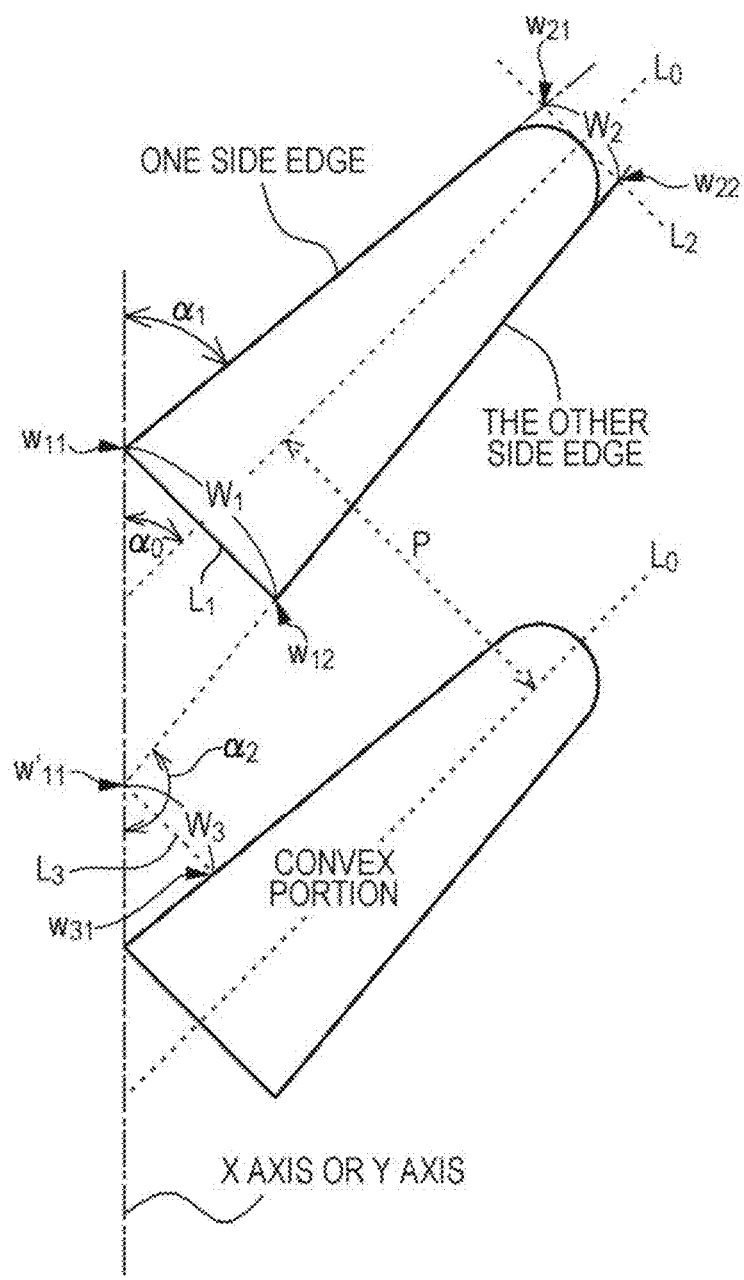
FIG. 44 is a plan view schematically illustrating a part of a convex portion, for illustration of the pitch and width of the convex portion, and the width of a tip part of the convex portion.

In the liquid crystal display apparatus of the present disclosure, as described above, the width of the branch convex portion or the like may be largest in a part of the branch convex portion or the like on the X axis or the vicinity thereof and on the Y axis and the vicinity thereof (for ease of description, referred to as a "base of the branch convex portion or the like"), and may be narrowed toward the periphery of the pixel, that is, toward the tip part of the branch convex portion or the like. Here, it is assumed that the formation pitch of the branch convex portions or the like is "P", and the width of the base of the branch convex portion or the like is "W1", and the width of the tip part of the branch convex portion or the like is "W2". As shown in FIGS. 43 and 44, when an angle formed by the X axis or the Y axis and one edge part (side edge part) of the branch convex portion or the like is α1 and an angle formed by the X axis or the Y axis and the other edge part of the branch convex portion or the like is α2, an angle α0 formed by the X axis or the Y axis and an axial line L0 of the branch convex portion or the like may be represented as follows: α0={α1+(180−α2)}/2, where 0<α1≤90 degrees and 90≤α2<180 degrees. Further, in this case, when an intersection point of the X axis or the Y axis and one side edge part is w11, an intersection point of the X axis or the Y axis and the other side edge part of the branch convex portion or the like is w11', and a point where a straight line L1 that passes through the intersection point w11 and is orthogonal to the axial line L0 of the branch convex portion or the like intersects with the other edge part of the branch convex portion or the like is w12, the distance from the intersection point w11 to the intersection point w12 is defined as a width W1 of the base part of the branch convex portion or the like. Further, when an intersection point where a straight line L2 that is orthogonal to the axial line L0 of the branch convex portion or the like and is in contact with the tip part of the branch convex portion or the like intersects with the one side edge part of the branch convex portion or the like (or an intersection point where the straight line L2 intersects with an extension line of the one side edge part of the branch convex portion or the like) is w21 and an intersection point of the straight line L2 and the other side edge part of the branch convex portion or the like (or an intersection point of the straight line L2 and an extension line of the other side edge part of the branch convex portion or the like) is w22, the distance from the intersection point w21 to the intersection point w22 is defined as a width W2 of the tip part of the branch convex portion or the like. In FIG. 44, the extension line of the side edge part is indicated by a dotted line. Further, the distance between the axial lines L0 of the adjacent branch convex portions or the like is defined as a formation pitch "P" of the branch convex portion or the like. Further, when a point where a straight line L3 that passes through the intersection point w'11 and is parallel to the straight line L1 intersects with one side edge part of the branch convex portion or the like that faces (is adjacent to) the other side edge part of the branch convex portion or the like is w31, the distance from the intersection point w'11 to the intersection point w31 is defined as a distance W3 between the branch convex portions or the like. A total taper width TP of the branch convex portion or the like may be defined as follows: TP=W1−W2. Further, an average width Wave1 of the branch convex portion or the like and an average width Wave2 of the concave portion are as follows: Wave1=(W1+W2)/2, and Wave2=P−Wave1. Here, a value of W3 may be 1 μm to 10 μm, and preferably 2 μm to 5 μm, a value of W2 may be 1 μm to 10 μm, and preferably 2 μm to 5 μm, and a value of P may be 2 μm to 20 μm, and preferably 2 μm to 10 μm. Further, a value of TP may be a value of 0.1 times to 10 times W3, for example. It is preferable that these values be applied to the longest branch convex portion or the like.

An average minimum width and an average maximum width of the branch convex portion or the like and the concave portions may be 1 μm to 25 μm, and preferably 2 μm to 20 μm, for example. When the average minimum width of the branch convex portion or the like and the concave portions is smaller than 1 μm, it is difficult to form the branch convex portion or the like and the concave portion and to secure a sufficient manufacturing yield rate. On the other hand, if the average minimum width of the branch convex portion or the like and the concave portion is larger than 25 μm, it is difficult to generate a favorable oblique electric field between the first electrode and the second electrode when a drive voltage is applied to the first electrode and the second electrode. The width of the stem convex portion may be $2\times10^{-6}$ m to $2\times10^{-5}$ m, and preferably $4\times10^{-6}$ m to $1.5\times10^{-5}$ m, for example. The height from the concave portion to the closest convex portion may be $5\times10^{-8}$ m to $1\times10^{-6}$ m, preferably $1\times10^{-7}$ m to $1\times10^{-6}$ m, and more preferably $2\times10^{-7}$ m to $6\times10^{-7}$ m, for example. The height of each step portion in the convex portion (height difference between adjacent top faces of the convex portion that form the step portion) may be $5\times10^{-8}$ m to $1\times10^{-6}$ m, and preferably $1\times10^{-7}$ m to $5\times10^{-7}$ m, for example. Thus, it is possible to perform an excellent alignment control, to secure a sufficient manufacturing yield rate, and to prevent reduction of the light transmittance and extension of the process time.

The liquid crystal display apparatus is illuminated by an existing planar lighting device (backlight). The planar lighting device may be a direct planar light source device, or may be an edge light type planar light source device (referred to as a side light type). Here, the direct planar light source device includes a light source disposed in a casing, a reflection member that is disposed in the part of the casing positioned under the light source and reflects upward light emitted from the light source, and a diffusion plate that is mounted to a casing opening portion disposed above the light source and diffuses and transmits the light emitted from the light source and the reflected light from the reflection member, for example. On the other hand, the edge light type planar light source device includes a conductive plate and a light source disposed on a side surface of the conductive plate, for example. Here, a reflection member is disposed under the conductive plate, and a diffusion sheet and a prism sheet are disposed above the conductive plate. The light source includes a cold-cathode ray fluorescent lamp, for example, and emits white light. Alternatively, for example, the light source includes a light emitting element such as an LED or semiconductor laser element. By controlling passage of the light from the planar lighting device (backlight) by the liquid crystal display apparatus, it is possible to display an image in the liquid crystal display apparatus.

Example 1

Figure 3A:
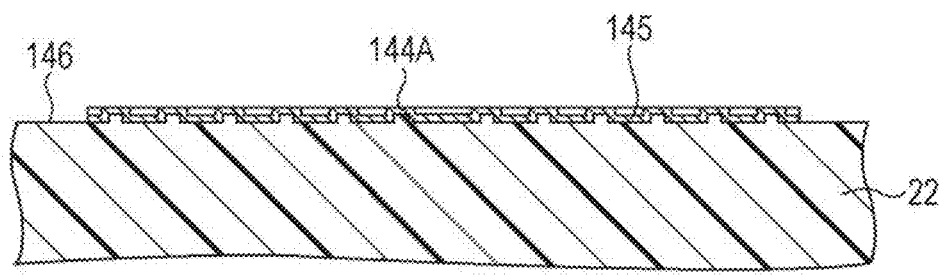
FIG. 3A is a local sectional view schematically illustrating the first electrode and the like, taken along arrow IIIA-IIIA in FIG. 2, in the liquid crystal display apparatus according to Example 1.
Figure 3B:
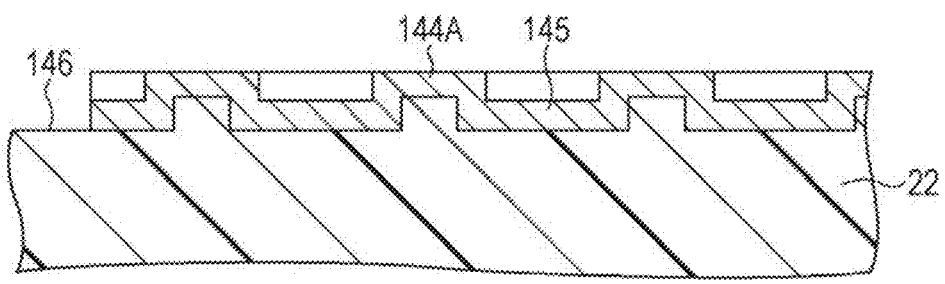
FIG. 3B is a local sectional view schematically illustrating an enlarged part of the first electrode and the like in FIG. 3A.

Example 1 relates to a liquid crystal display apparatus according to Embodiment 1 of the present disclosure. FIG. 1 is a local sectional view schematically illustrating a liquid crystal display apparatus of Example 1; FIG. 2 is a plan view schematically illustrating a first electrode corresponding to one pixel that forms the liquid crystal display apparatus of Example 1; FIG. 3A is a local sectional view schematically illustrating the first electrode and the like, taken along arrow IIIA-IIIA in FIG. 2; and FIG. 3B is a local sectional view schematically illustrating an enlarged part of the first electrode and the like in FIG. 3A.

A liquid crystal display apparatus according to Example 1 or Examples 2 to 13 (to be described later) includes arrangement of a plurality of pixels 10(10A, 10B and 10C), each pixel including a first substrate 20 and a second substrate 50; a first electrode (pixel electrode) 140, 240, 340, 440 or 540 formed on an opposed surface of the first substrate 20 that faces the second substrate 50; a first alignment film 21 that covers the first electrode 140, 240, 340, 440 or 540 and the opposed surface of the first substrate 20; a second electrode (counter electrode) 160 or 260 formed on an opposed surface of the second substrate 50 that faces the first substrate 20; a second alignment film 51 that covers the second electrode 160 or 260 and the opposed surface of the second substrate 50; and a liquid crystal layer 70 that includes liquid crystal molecules 71A, 71B and 71C provided between the first alignment film 21 and the second alignment film 51. Here, a pre-tilt is given to the liquid crystal molecules, and a plurality of concave and convex portions 141, 241, 341, 441 or 541 is formed in the first electrode 140, 240, 340, 440 or 540. Specifically, the pre-tilt is given to at least the liquid crystal molecules on the side of the first alignment film 21. The liquid crystal molecules have a negative dielectric anisotropy.

Figure 40A:
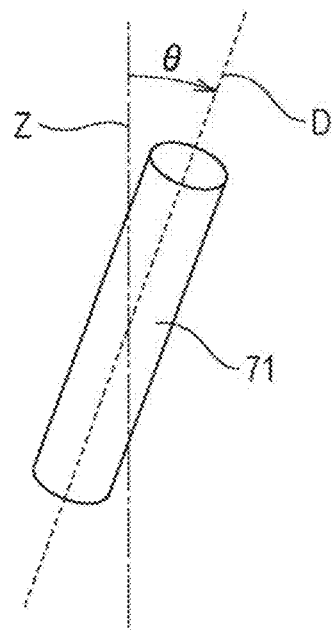
FIG. 40A is a diagram schematically illustrating a pre-tilt of liquid crystal molecules.

The liquid crystal molecules 71 may be divided into liquid crystal molecules 71A that are held on the first alignment film 21 in the vicinity of an interface with the first alignment film 21, liquid crystal molecules 71B that are held on the second alignment film 51 in the vicinity of an interface with the second alignment film 51, and the other liquid crystal molecules 71C. The liquid crystal molecules 71C are located at an intermediate position of the liquid crystal layer 70 in the thickness direction, and are arranged so that the long axis direction (director) of the liquid crystal molecules 71C is approximately perpendicular to the first substrate 20 and the second substrate 50 in a state where a drive voltage is in an off state. Here, if the drive voltage enters an on state, the liquid crystal molecules 71C are orientated to be inclined so that the director of the liquid crystal molecules 71C is parallel to the first substrate 20 and the second substrate 50. This operation is caused by a characteristic that a dielectric constant in the long axis direction is smaller than that in the short axis direction in the liquid crystal molecules 71C. The liquid crystal molecules 71A and 71B have the same characteristic, and thus, basically show the same operation as that of the liquid crystal molecules 71C according to the on and off state change in the drive voltage. Here, when the drive voltage is in the off state, the liquid crystal molecules 71A have a pre-tilt $\theta 1$ that is given by the first alignment film 21 or is given by a monomer that is mixed in the liquid crystal in advance, and have a posture in which the director is inclined with respect to a normal direction of the first substrate 20 and the second substrate 50. Similarly, the liquid crystal molecules 71B have a pre-tilt $\theta 2$ that is given by the second alignment film 51 or is given by the monomer that is mixed in the liquid crystal in advance, and have a posture in which the director is inclined with respect to the normal direction of the first substrate 20 and the second substrate 50. Here, the term of "hold" means that alignment of the liquid crystal molecules 71 is regulated while the alignment films 21 and 51 are not fixed to the liquid crystal molecules 71A and 71B. Further, when a direction (normal direction) perpendicular to the surfaces of the first substrate 20 and the second substrate 50 is represented as Z, as shown in FIG. 40A, the "pre-tilt $\theta$ ($\theta 1$ and $\theta 2$)" represents an inclination angle of a director D of the liquid crystal molecules 71 (71A, 71B) with respect to the Z direction when the drive voltage is in the off state.

In the liquid crystal layer 70, both the pre-tilts $\theta 1$ and $\theta 2$ have values larger than 0 degree. In the liquid crystal layer 70, the pre-tilts $\theta 1$ and $\theta 2$ may be the same angle ($\theta 1 = \theta 2$), or may be different angles ($\theta 1 \neq \theta 2$), but it is preferable that the pre-tilts $\theta 1$ and $\theta 2$ be different angles. Thus, compared with a case where both the pre-tilts $\theta 1$ and $\theta 2$ are 0 degree, it is possible to improve the response speed with respect to application of the drive voltage, and to obtain approximately the same contrast as in a case where both the pre-tilts $\theta 1$ and $\theta 2$ are 0 degree. Accordingly, it is possible to reduce the amount of light transmission in black display while improving a response characteristic, and to improve contrast. In a case where the pre-tilts $\theta 1$ and $\theta 2$ have different angles, it is preferable that a large pre-tilt θ among the pre-tilts θ1 and θ2 be 1 degree or more and 4 degrees or less. By setting the large pre-tilt θ within the above-mentioned range, it is possible to obtain an especially high effect.

A TFT layer 30 (details thereof will be described later) is formed on the first substrate 20, a planarizing layer 22 made of an organic insulating material such as a photosensitive polyimide resin or an acrylic resin is formed on the TFT layer 30, and the first electrode 140, 240, 340, 440 or 540 is formed on the planarizing layer 22. Reference numeral 146, 246, 346, 446 or 546 represents a portion of the first substrate 1 disposed between pixels. The planarizing layer 22 may also be formed of an inorganic insulating material such as SiO2, SiN or SiON.

Further, in the liquid crystal display apparatus according to Example 1, assuming that the X axis and the Y axis pass through the center of a pixel 10, and specifically, assuming that an (X, Y) coordinate system is formed by the X axis and the Y axis that are straight lines that pass through the center of the pixel 10 and are parallel to edge portions of the pixel, a plurality of convex portions 144A1 that occupies a first quadrant extends in parallel in a direction where a value on the Y coordinate increases when a value on the X coordinate increases, a plurality of convex portions 144A2 that occupies a second quadrant extends in parallel in a direction where a value on the Y coordinate increases when a value on the X coordinate decreases, a plurality of convex portions 144A3 that occupies a third quadrant extends in parallel in a direction where a value on the Y coordinate decreases when a value on the X coordinate decreases, and a plurality of convex portions 144A4 that occupies a fourth quadrant extends in parallel in a direction where a value on the Y coordinate decreases when a value on the X coordinate increases. The plurality of convex portions 144A1 that occupies the first quadrant extends so that an axis line thereof forms 45 degrees with respect to the X axis, the plurality of convex portions 144A2 that occupies the second quadrant extends so that an axis line thereof forms 135 degrees with respect to the X axis, the plurality of convex portions 144A3 that occupies the third quadrant extends so that an axis line thereof forms 225 degrees with respect to the X axis, and the plurality of convex portions 144A4 that occupies the fourth quadrant extends so that an axis line thereof forms 315 degrees with respect to the X axis. The convex portions 144A are linearly symmetric with respect to the X axis, are also linearly symmetric with respect to the Y axis, and are rotationally symmetric (180 degrees, point symmetric) with respect to the center of the pixel.

In the liquid crystal display apparatus according to Example 1, a stem convex portion is not provided, differently from the liquid crystal display apparatus according to Example 8 (to be described later), and the convex portion 144A in the liquid crystal display apparatus according to Example 1 corresponds to a branch convex portion in the liquid crystal display apparatus according to Example 8.

Further, each convex portion 144A11 that extends from the X axis and occupies the first quadrant is joined to each convex portion 144A41 that extends from the X axis and occupies the fourth quadrant, each convex portion 144A12 that extends from the Y axis and occupies the first quadrant is joined to each convex portion 144A22 that extends from the Y axis and occupies the second quadrant, each convex portion 144A21 that extends from the X axis and occupies the second quadrant is joined to each convex portion 144A31 that extends from the X axis and occupies the third quadrant, and each convex portion 144A32 that extends from the Y axis and occupies the third quadrant is joined to each convex portion 144A42 that extends from the Y axis and occupies the fourth quadrant. That is, the planar shape of the convex portions 144A is a "V" shape. Reference numeral subscripts "11", "12" and the like that represent convex portions, and reference numeral subscripts that represent convex portions in various examples to be described later represent parts of the same convex portions.

Side surfaces (side walls) of the convex portions, stem convex portions or branch convex portions to be described later may be vertical surfaces, may be tapered upward, or may be tapered downward. Further, in the figures, hatched lines that extend in the longitudinal direction are given to the concave portions 145, 245, 345, 445 and 545.

A first polarizing plate (not shown) is attached to an outer surface of the first substrate 20, and a second polarizing plate (not shown) is attached to an outer surface of the second substrate 50. The first polarizing plate and the second polarizing plate are disposed so that absorption axes thereof are orthogonal to each other. The absorption axis of the first polarizing plate is parallel to the X axis or the Y axis, and the absorption axis of the second polarizing plate is parallel to the Y axis or the X axis.

Figure 41:
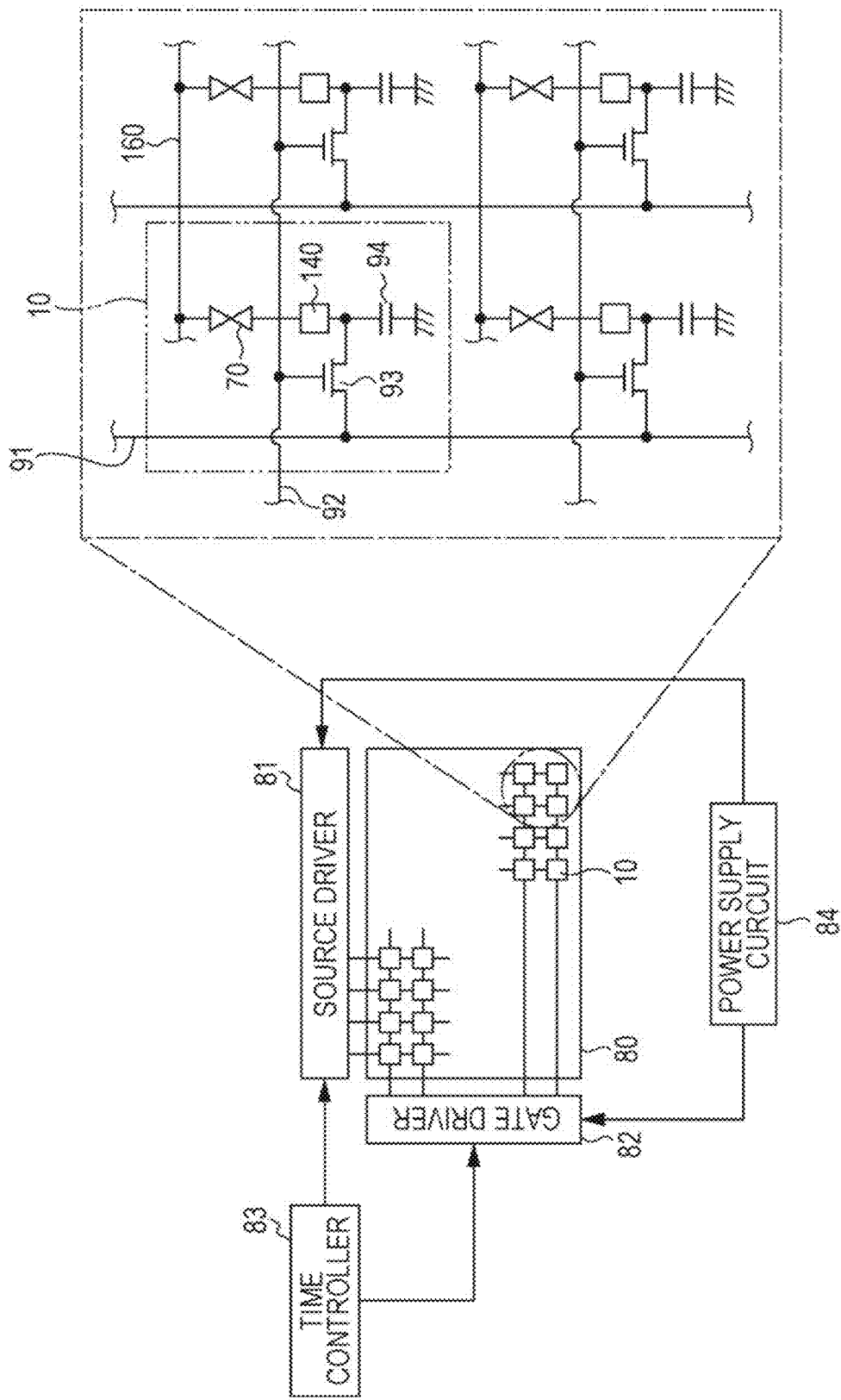
FIG. 41 is a diagram illustrating a circuit configuration of the liquid crystal display apparatus shown in FIG. 1.

FIG. 41 shows a circuit configuration in the liquid crystal display apparatus shown in FIG. 1 or the liquid crystal display apparatus according to Examples 2 to 13 (to be described later).

As shown in FIG. 41, the liquid crystal display apparatus includes a liquid crystal display device that includes the plurality of pixels 10 provided in a display region 80. In the liquid crystal display apparatus, a source driver 81 and a gate driver 82, a timing controller 83 that controls the source driver 81 and the gate driver 82, and a power supply circuit 84 that supplies electric power to the source driver 81 and the gate driver 82 are provided around the display region 80.

The display region 80 is a region where an image is displayed, which is a region configured to be able to display the image by the plurality of pixels 10 that is arranged in a matrix form. FIG. 41 shows the display region 80 that includes the plurality of pixels 10, in which a region corresponding to four pixels 10 is separately enlarged.

In the display region 80, a plurality of source lines 91 is arranged in rows, and a plurality of gate lines 92 is arranged in columns. Each pixel 10 is disposed at a position where the source line 91 and the gate line 92 intersect with each other. Each pixel 10 includes a TFT 93 and a capacitor 94 in addition to the first electrode 140 and the liquid crystal layer 70. In each TFT 93, a source electrode is connected to the source line 91, a gate electrode is connected to the gate line 92, and a drain electrode is connected to the capacitor 94 and the first electrode 140. Each source line 91 is connected to the source driver 81, and is supplied with an image signal from the source driver 81. Each gate 92 is connected to the gate driver 82, and is sequentially supplied with a scanning signal from the gate driver 82.

The source driver 81 and the gate driver 82 select a specific pixel 10 from the plurality of pixels 10.

The timing controller 83 outputs an image signal (for example, respective RGB image signals corresponding to red, green and blue), and a source driver control signal for controlling an operation of the source driver 81 to the source driver 81, for example. Further, the timing controller 83 outputs a gate driver control signal for controlling an operation of the gate driver 82 to the gate driver 82, for example. A horizontal synchronous signal, a start pulse signal, a source driver clock signal or the like may be used as the source driver control signal, for example. A vertical synchronous signal, a gate driver clock signal or the like may be used as the gate driver control signal, for example.

In manufacturing of the liquid crystal display apparatus according to Example 1, first, the TFT is formed on the basis of the following method, and then, a transparent conductive material layer made of ITO is formed on the opposed surface of the first substrate 20 on which the planarizing layer 22 is formed. The first substrate 20 is formed of a glass substrate having a thickness of 0.7 mm.

Figure 42A:
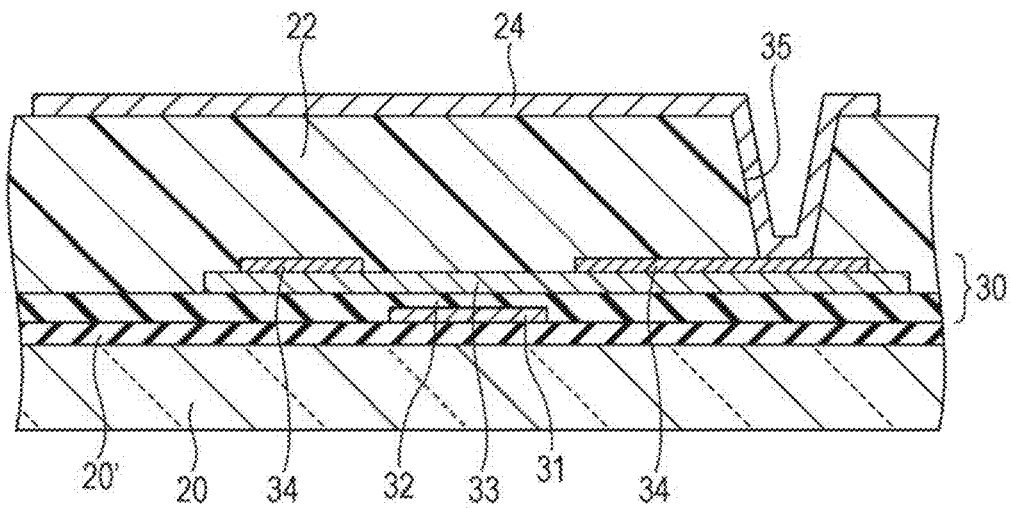
FIGS. 42A and 42B are local sectional views schematically illustrating a first substrate where a TFT and the like are formed, which show a state before concave and convex portions are formed in a first electrode.

That is, as shown in FIG. 42A, a gate electrode 31 is formed on an insulating film 20' formed on the first substrate 20, and a gate insulating layer 32 is formed on the gate electrode 31 and the insulating film 20. The gate insulating layer 32 is formed of SiO2, SiN, SiON or metallic oxide, for example. Then, a semiconductor layer 33 that is a channel formation region is formed on the gate insulating layer 32, and then, a source/drain electrode 34 is formed on the semiconductor layer 33. The semiconductor layer 33 is formed of poly-silicon or amorphous silicon, for example, and the source/drain electrode 34 is formed of a metallic film such as titanium, chrome, aluminum, molybdenum, tantalum, tungsten or copper, or an alloy film or stacked films thereof. Thus, it is possible to obtain the TFT layer 30. The TFT layer 30 may be formed on the basis of an existing method. The TFT is not limited to a so-called bottom gate top contact type, and may be a bottom gate bottom contact type, a top gate top contact type, or a top gate bottom contact type. Then, the planarizing layer 22 having a thickness of 2.5 μm is formed on the entire surface, and then, a connection hole 35 is formed in the planarizing layer 22 above one source/drain electrode 34.

Then, a resist material layer is formed on the planarizing layer 22, and then, exposure and development are performed to form concave and convex portions (the depth of the concave portions is 0.28 μm) on the resist material layer. Here, by etching the resist material layer and the planarizing layer 22, it is possible to form the concave and convex portions on the planarizing layer 22. Thereafter, by forming the transparent conductive material layer 24 made of ITO having a thickness of 0.1 μm on the entire surface, it is possible to obtain the concave and convex portions 141 (convex portions 144A and concave portions 145). By patterning the transparent conductive material layer 24 on the basis of an existing method, it is possible to provide the first electrode 140 in a matrix form. Specifications of the convex portion 144A and the concave portion 145 are as shown in the following Table 1.

On the other hand, with respect to the second substrate 50, a color filter is formed on the second substrate 50 made of a glass substrate having a thickness of 0.7 mm, and a second electrode 160 of a so-called solid electrode is formed on the color filter.

TABLE 1

Average height of convex portions: 0.2 μm
Formation pitch of convex portions: 5.0 μm
Width of convex portion: 2.5 μm
Width of concave portion: 2.5 μm Then, the first alignment film 21 is formed on the first electrode 140, and the second alignment film 51 is formed on the second electrode 160. Specifically, the material of the alignment film is coated or printed on each of the first electrode 140 and the second electrode 160, and then, is heated. The temperature of the heating process is preferably 80° C. or higher, and is more preferably 150° C. or higher and 200° C. or lower. Further, the heating process may be performed by gradually changing the heating temperature. Thus, a solvent included in the material of the alignment film that is coated or printed is evaporated, and thus, the alignment films 21 and 51 that include a polymer compound are formed. Thereafter, a rubbing process or the like may be performed as necessary. More specifically, as the first alignment film 21 and the second alignment film 51, a vertical alignment film material is coated on the first electrode 140 and the second electrode 160 on the basis of a spin coating method. Then, a drying process is performed at 80° C. for 80 seconds on a hot plate, and a baking process is performed at 200° C. for 60 minutes in a clean oven in a nitrogen atmosphere to obtain the first alignment film 21 and the second alignment film 51.

Then, the first substrate 20 and the second substrate 50 are disposed so that the alignment film 21 and the alignment film 51 face each other, and the liquid crystal layer 70 that includes the liquid crystal molecules 71 is sealed between the alignment film 21 and the alignment film 51. Specifically, by dispersing spacer protuberances for securing a cell gap, for example, plastic beads having a diameter of 3.0 μm on the surface on which the alignment film 21 or 51, of any one of the first substrate 20 and the second substrate 50, and for example, by coating an ultraviolet curing resin that includes silica particles having a particle diameter of 3.5 μm to an outer edge on the second substrate 50 by a screen printing method, a seal portion is formed. Then, a liquid crystal material obtained by mixing a polymerizable monomer (specifically, an acrylic monomer) of 0.3% by mass into a negative liquid crystal is instilled into a section surrounded by the seal portion. This method of manufacturing the liquid crystal display apparatus is referred to as a PSA method. Then, the first substrate 20 and the second substrate 50 are bonded, and the seal portion is cured. Thus, the liquid crystal layer 70 is sealed. Then, a voltage is applied between the first electrode 140 and the second electrode 160 using a voltage applying section. For example, the voltage is 3 V to 30 V, and specifically, corresponds to an AC electric field (60 Hz) of a rectangular wave having an effective value voltage of 7 V. At the same time, in order to cause the polymerizable monomer to react, a heating process or ultraviolet irradiation is performed depending on a polymerizable monomer to be used. Thus, an electric field in a direction where a predetermined angle is formed with respect to the surfaces of the first substrate 20 and the second substrate 50 is generated, and the liquid crystal molecules 71 are aligned to be inclined in a predetermined direction with respect to the vertical direction of the first substrate 20 and the second substrate 50. That is, an azimuth angle (declination) of the liquid crystal molecules 71 at that time is regulated by the strength and direction of the electric field and the polymerizable monomer mixed in the liquid crystal, and a polar angle (zenith angle) is regulated by the strength of the electric field and the polymerizable monomer mixed in the liquid crystal. Accordingly, by appropriately adjusting the value of the voltage, it is possible to control the values of the pre-tilts θ1 and θ2 of the liquid crystal molecules 71A and 71B. Here, an oblique electric field is applied between the first substrate 20 and the second substrate 50 by the concave and convex portions 141 formed in the first electrode 140. Further, a polymer layer is formed in the vicinity of the opposed surface of the substrate by reaction of the polymerizable monomer mixed in the liquid crystal. Then, a response direction of the liquid crystal molecules 71 is regulated by the formed polymer layer, and the pre-tilt state of the liquid crystal molecules 71 in the vicinity of the first substrate 20 and the second substrate 50 is fixed by a reaction product of the polymerizable monomer. According to the above processes, it is possible to complete a liquid crystal cell.

On the other hand, an alignment film having a function of storing a pre-tilt is coated and formed on at least one electrode, and then, a seal portion is formed in an FPA type in which a negative liquid crystal is injected and sealed. Then, a liquid crystal material made of the negative liquid crystal is dropped and injected into a portion surrounded by the seal portion. Further, the first substrate 20 and the second substrate 50 are bonded, and the seal portion is cured using ultraviolet rays of a wavelength of 410 nm. Then, a voltage is applied between the first electrode 140 and the second electrode 160 using a voltage applying section. For example, the voltage is 3 V to 30 V, and specifically, corresponds to an AC electric field (60 Hz) of a rectangular wave having an effective value voltage of 7 V. Thus, an electric field in a direction where a predetermined angle is formed with respect to the surfaces of the first substrate 20 and the second substrate 50 is generated, and the liquid crystal molecules 71 are aligned to be inclined in a predetermined direction with respect to the vertical direction of the first substrate 20 and the second substrate 50. That is, an azimuth angle (declination) of the liquid crystal molecules 71 at that time is regulated by the strength and direction of the electric field and the structure of the molecules of the alignment film material, and a polar angle (zenith angle) is regulated by the strength of the electric field and the structure of the molecules of the alignment film. Accordingly, by appropriately adjusting the value of the voltage, it is possible to control the values of the pre-tilts $\theta1$ and $\theta2$ of the liquid crystal molecules 71A and 71B. Further, in a state where the voltage is applied, energy lines (specifically, ultraviolet rays UV), for example, uniform ultraviolet rays of 10J (measured at a wavelength of 360 nm) are irradiated to the alignment films 21 and 51 from the outside of the first substrate 20. That is, the irradiation of ultraviolet rays is performed while applying an electric field or a magnetic field so that the liquid crystal molecules 71 are arranged in an oblique direction with respect to the surfaces of one pair of substrates 20 and 50. Thus, a cross-linkable functional group or a polymerizable functional group included in a polymer compound in the alignment films 21 and 51 reacts to form cross-link. An oblique electric field is applied between the first substrate 20 and the second substrate 50 by the concave and convex portions 141 formed in the first electrode 140. In this way, a response direction of the liquid crystal molecules 71 is stored by the polymer compound, and a pre-tilt is given to the liquid crystal molecules 71 in the vicinity of the alignment films 21 and 51. As a result, the pre-tilts $\theta1$ and $\theta2$ are given to the liquid crystal molecules 71A and 71B disposed in the vicinity of the interface with the alignment films 21 and 51 in the liquid crystal layer 70 in a non-driven state. Ultraviolet rays that mainly include a light component from a wavelength of about 295 nm to a wavelength of about 365 nm are preferably used as the ultraviolet rays UV. This is because if ultraviolet rays that mainly include a light component of a wavelength band shorter than the above-mentioned wavelength are used, there are fears that the liquid crystal molecules 71 are photolyzed and deteriorated. Here, the ultraviolet rays UV are irradiated from the outside of the first substrate 20, but may be irradiated from the outside of the second substrate 50, or may be irradiated from the outsides of both the first substrate 20 and the second substrate 50. In this case, it is preferable to irradiate the ultraviolet rays UV from the side of the substrate having high light transmittance. Further, in a case where the ultraviolet rays UV are irradiated from the outside of the second substrate 50, the ultraviolet rays UV may be absorbed into the color filter according to a wavelength band of the ultraviolet rays UV, which may make it difficult to cause the cross-link reaction. Thus, it is preferable that the irradiation be performed from the outside of the first substrate 20 (from the side of the substrate that includes the pixel electrode).

Through the above-mentioned processes, it is possible to complete the liquid crystal display apparatus (liquid crystal display device) shown in FIG. 1 in which the liquid crystal molecules 71A on the side of the first substrate 20 and the second substrate 50 show the pre-tilt. Finally, a pair of polarizing plates (not shown) is attached to the outside of the liquid crystal display apparatus so that absorption axes thereof intersect. The liquid crystal display apparatus according to Examples 2 to 13 to be described later may be manufactured by approximately the same method.

In an operation of the liquid crystal display apparatus (liquid crystal display device), if the drive voltage is applied in the selected pixel 10, the alignment state of the liquid crystal molecules 71 included in the liquid crystal layer 70 is changed according to a voltage difference between the first electrode 140 and the second electrode 160. Specifically, as the drive voltage is applied from the state before application of the drive voltage shown in FIG. 1 in the liquid crystal layer 70, the liquid crystal molecules 71A and 71B disposed in the vicinity of the alignment films 21 and 51 fall down while rotating in the inclination directions thereof, and the movement propagates to the other liquid crystal molecules 71C. Consequently, the liquid crystal molecules 71 react to have a posture that is approximately horizontal (parallel) with respect to the first substrate 20 and the second substrate 50. Thus, an optical characteristic of the liquid crystal layer 70 is changed, and incident light onto the liquid crystal display device is changed into modulated outgoing light. Gray scale is expressed on the basis of the outgoing light, to thereby display an image.

In this liquid crystal display apparatus, by applying the drive voltage between the first electrode (pixel electrode) 140 and the second electrode (counter electrode) 160 using the following procedure, the image is displayed. Specifically, the source driver 81 supplies an individual image signal to a predetermined source line 91 by input of a source driver control signal from the timing controller 83, and similarly, on the basis of an image signal input from the timing controller 83. Further, the gate driver 82 sequentially supplies a scanning signal to the gate line 92 at a predetermined time by input of the gate driver control signal from the timing controller 83. Thus, the pixel 10 disposed at a point where the source line 91 supplied with the image signal and the gate line 92 supplied with the scanning signal intersect is selected, and the drive voltage is applied to the pixel 10.

Figure 48:
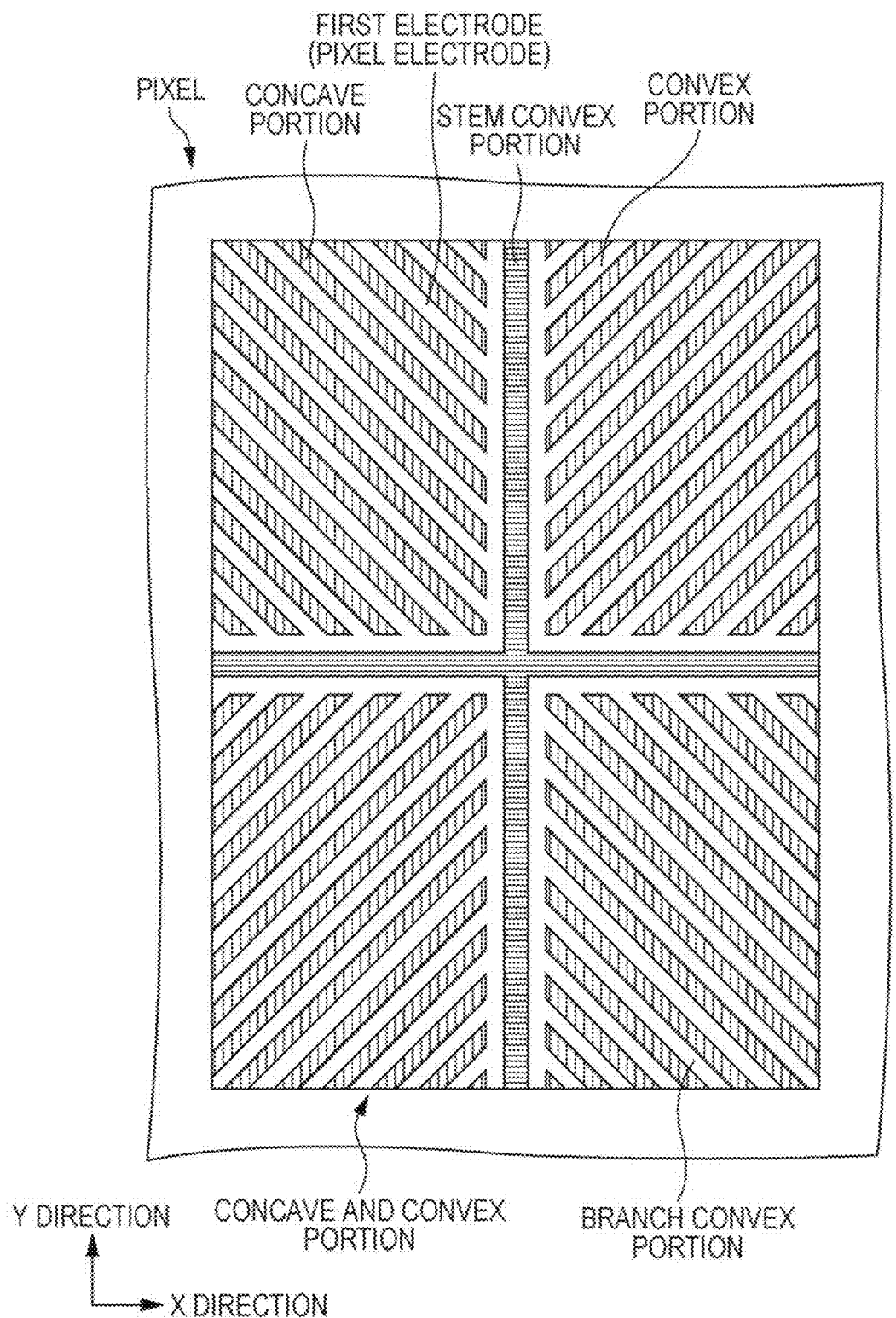
FIG. 48 is a plan view schematically illustrating a first electrode corresponding to one pixel that forms the liquid crystal display apparatus in the related art.
Figure 49A:
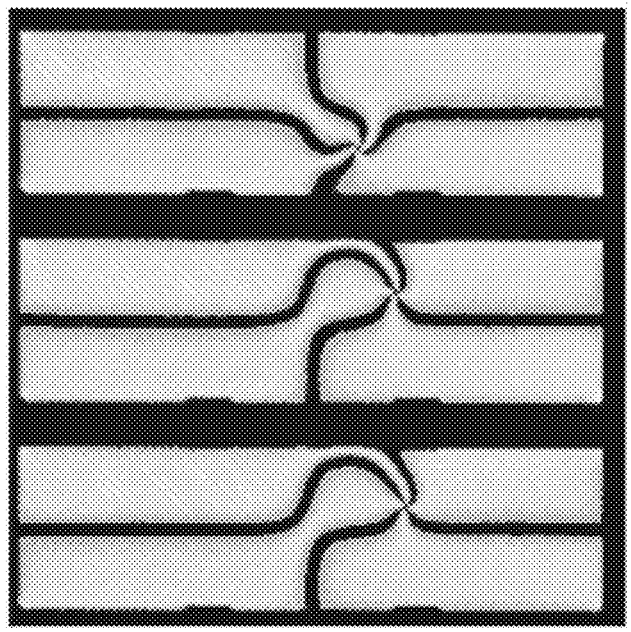
FIG. 49A is a photomicrograph illustrating an alignment state of liquid crystal molecules in three pixels when a liquid crystal layer starts being exposed in a desired electric field for a predetermined time in order to give a pre-tilt to the liquid crystal molecules.
Figure 49B:
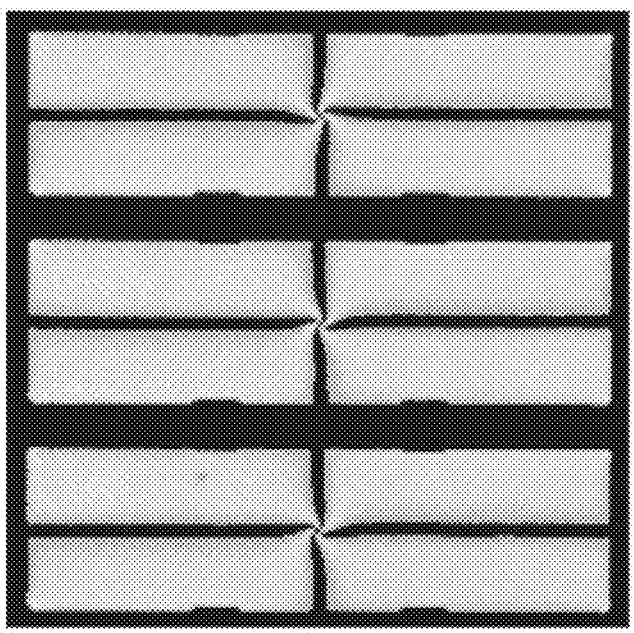
FIG. 49B is a photomicrograph illustrating an alignment state of liquid crystal molecules in three pixels after a liquid crystal layer is exposed in a desired electric field for a predetermined time in order to give a pre-tilt to the liquid crystal molecules.

If a voltage is applied to the electrodes when an image is displayed in the liquid crystal display apparatus, in the entire liquid crystal layer, the liquid crystal molecules are changed so that the director is parallel to the first substrate 20 and the second substrate 50. In the liquid crystal display apparatus disclosed in Japanese Unexamined Patent Application Publication No. 2011-232736, the plurality of concave and convex portions includes a stem convex portion that extends on the X axis and the Y axis, and a plurality of branch convex portions that extends from a side edge of the stem convex portion toward the periphery of the pixel. The extension direction of a side edge part of the stem convex portion that is not joined to the branch convex portions is parallel to the X axis or the Y axis (see FIG. 48). Accordingly, dark lines are easily generated in a part of the stem convex portion.

On the other hand, in the liquid crystal display apparatus according to Example 1, the plurality of convex portions 144A1 that occupies the first quadrant extends in parallel in the direction where the value on the Y coordinate increases as the value on the X coordinate increases, the plurality of convex portions 144A2 that occupies the second quadrant extends in parallel in the direction where the value on the Y coordinate increases as the value on the X coordinate decreases, the plurality of convex portions 144A3 that occupies the third quadrant extends in parallel in the direction where the value on the Y coordinate decreases as the value on the X coordinate decreases, and the plurality of convex portions 144A4 that occupies the fourth quadrant extends in parallel in the direction where the value on the Y coordinate decreases as the value on the X coordinate increases. That is, a part of the convex portion that extends in parallel with the X axis and a part of the convex portion that extends in parallel with the Y axis do not exist except for a tip part of the convex portion 144A. Here, by forming the tip part of the convex portion 144A with a segment orthogonal to the axis line of the convex portion 144A or by forming the tip part of the convex portion 144A with a curve, it is possible to obtain a configuration in which the part of the convex portion that extends in parallel with the X axis or the part of the convex portion that extends in parallel with the Y axis do not exist. Here, the absorption axis of the first polarizing plate is parallel to the X axis or the Y axis, the absorption axis of the second polarizing plate is parallel to the Y axis or the X axis. Accordingly, it is possible to reliably reduce the occurrence of dark lines. That is, it is possible to realize uniform and high light transmittance, and to obtain an excellent voltage response characteristic. Further, since the initial alignment is improved, when the pre-tilts are given to the liquid crystal molecules by irradiation of the uniform ultraviolet rays in a state where the AC electric field of the rectangular wave is applied to the liquid crystal cell as described above, it is possible to reduce the time for giving the pre-tilts to the liquid crystal molecules. Furthermore, reduction in alignment errors is expected, and it is thus possible to improve a yield rate, and to reduce the manufacturing cost of the liquid crystal display apparatus. In addition, since the light transmission is improved, it is possible to achieve low power consumption of a backlight and to improve TFT reliability.

Figure 42B:
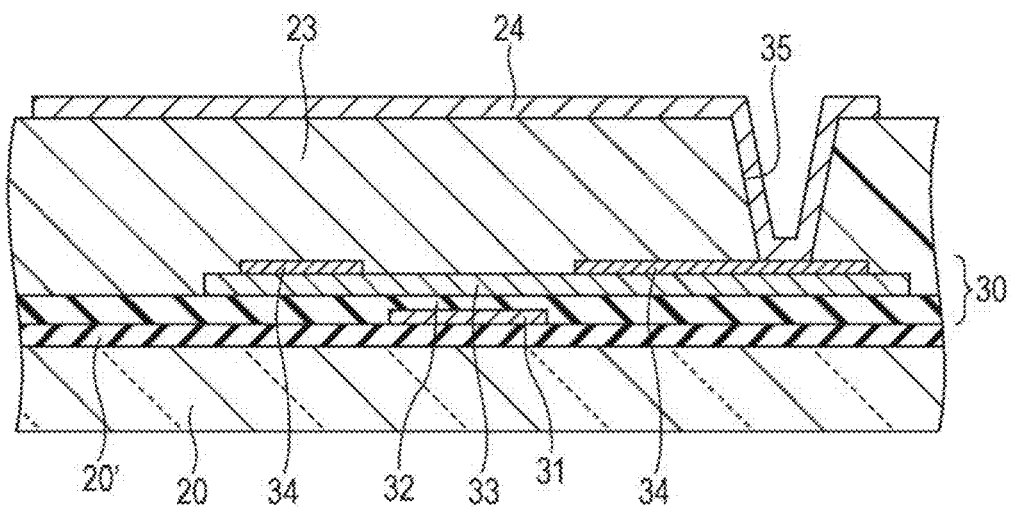

The color filter layer may be formed on the first substrate 20. Specifically, as described above, the TFT layer 30 is formed on the first substrate 20, and then, the color filter layer 23 instead of the planarizing layer 22 is formed on the TFT layer 30 on the basis of an existing method. In this way, it is possible to obtain a color filter on array (COA) structure. Further, the connection hole 35 may be formed on the color filter layer 23 above one source/drain electrode 34, and then, the transparent conductive material layer 24 for providing the first electrode 140 may be formed on the color filter layer 23 that includes the connection hole 35 (see FIG. 42B).

Example 2

Figure 4A:
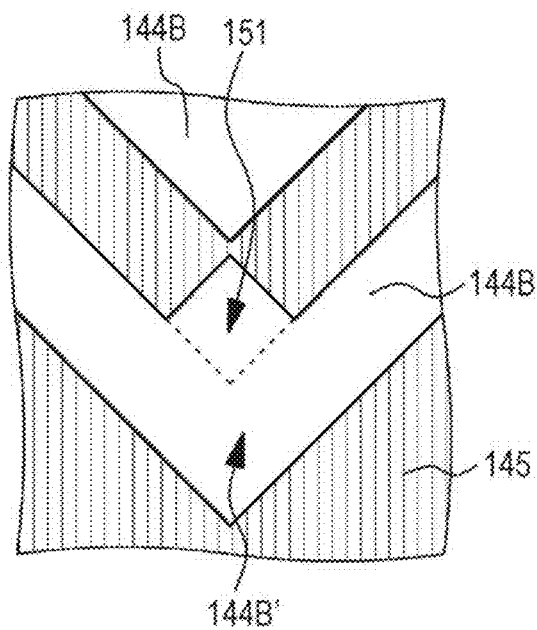
FIGS. 4A and 4B are plan views schematically illustrating a part of a first electrode corresponding to one pixel that forms a liquid crystal display apparatus according to Example 2, respectively.
Figure 4B:
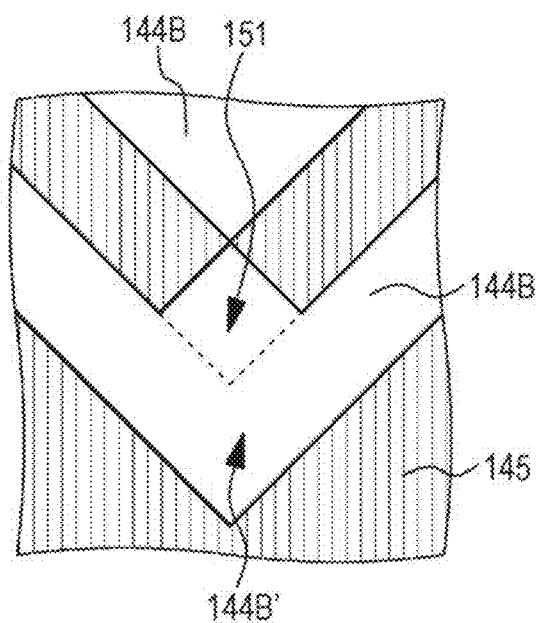
Figure 5A:
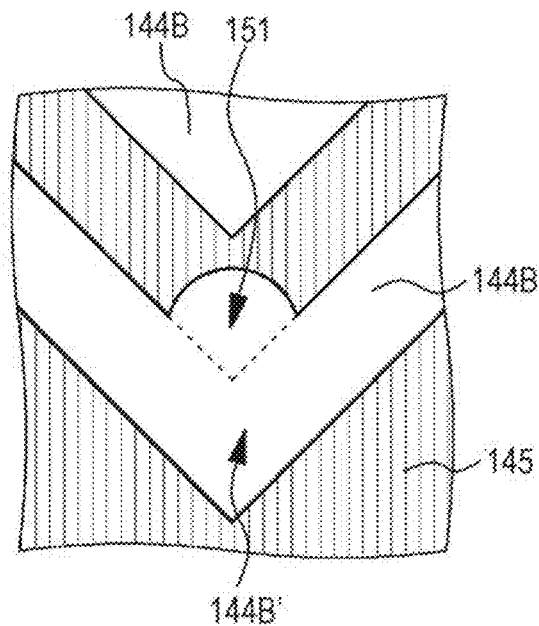
FIGS. 5A and 5B are plan views schematically illustrating a part of the first electrode corresponding to one pixel that forms the liquid crystal display apparatus according to Example 2, respectively.
Figure 5B:
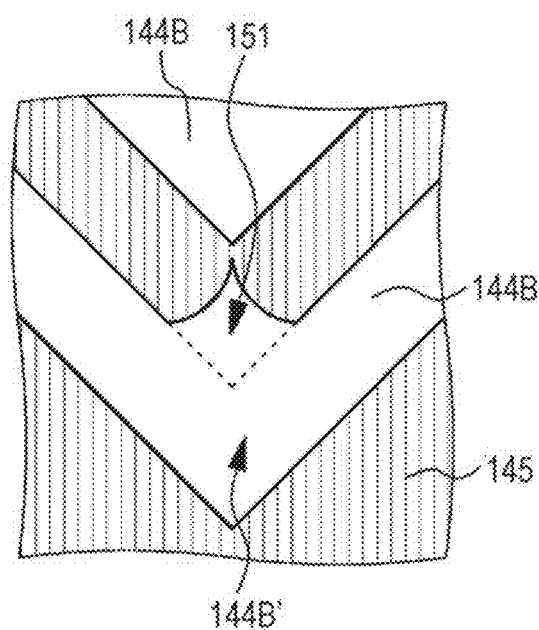

Example 2 is a modification of Example 1. FIGS. 4A and 4B and FIGS. 5A and 5B are plan views schematically illustrating a part of a first electrode corresponding to one pixel that forms a liquid crystal display apparatus according to Example 2. Here, FIGS. 4A and 4B and FIGS. 5A and 5B are plan views schematically illustrating an enlarged part of the first electrode surrounded by a circular region in the schematic plan view of the first electrode in FIG. 2. In the liquid crystal display apparatus according to Example 2, a protrusion 151 that extends in a direction toward the periphery of the pixel 10 is provided in a junction 144B' of two convex portions 144B. As shown in FIGS. 4A and 4B, the protrusion 151 may be surrounded by a plurality of segments (two segments in the shown example). Further, the protrusion 151 may be surrounded by a single curve, as shown in FIG. 5A, or may be surrounded by a plurality of curves (two curves in the shown example), as shown in FIG. 5B. Alternatively, the protrusion 151 may be surrounded by a combination of a segment and a curve. In the example shown in FIG. 4A, the tip of the protrusion 151 is not joined to the junction of two adjacent convex portions in the direction toward the periphery of the pixel. On the other hand, in the example shown in FIG. 4B, the tip of the protrusion 151 is in contact with the junction of two adjacent convex portions in the direction toward the periphery of the pixel.

With such a configuration, in a similar way, the part of the convex portion that extends in parallel with the X axis or the part of the convex portion that extends in parallel with the Y axis does not exist, or if any, the length is very short. Further, since the protrusion 151 is provided on the part of the V-shaped bottom of the convex portion, it is possible to obtain a desired alignment state of the liquid crystal molecules disposed in the vicinity of the inner part of the V-shaped bottom of the convex portion, compared with a case where the protrusion 151 is not provided in the inner part of the V-shaped bottom of the convex portion.

Example 3

Figure 6:
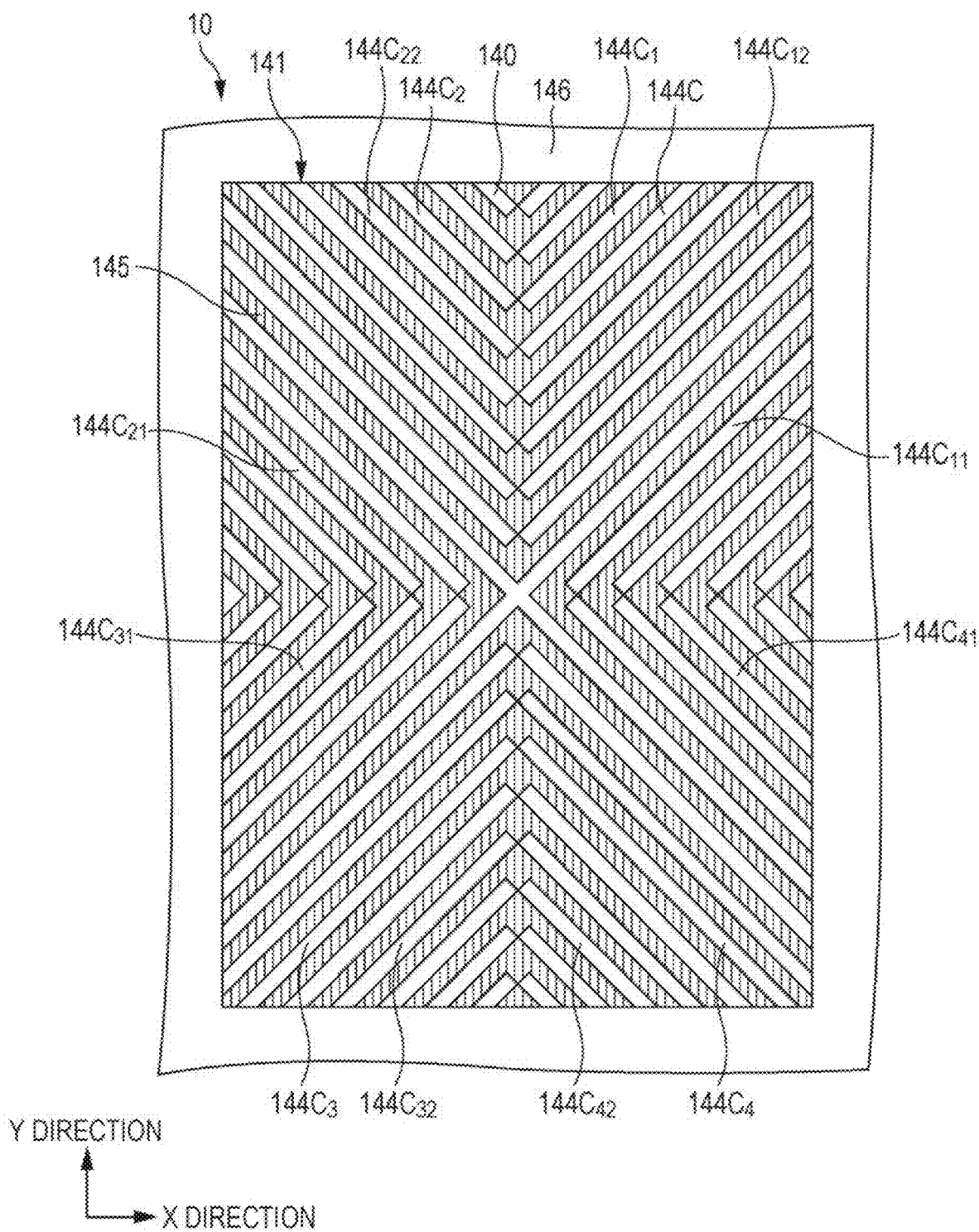
FIG. 6 is a plan view schematically illustrating a first electrode corresponding to one pixel that forms a liquid crystal display apparatus according to Example 3.

Example 3 is another modification of Example 1. In Example 1, the convex portion 144A is joined to the X axis or the Y axis, and the planar shape of the convex portion 144A is the "V" shape. On the other hand, in Example 3, the convex portion 144C is not joined to the X axis or the Y axis. Specifically, FIG. 6 is a plan view schematically illustrating a first electrode corresponding to one pixel that forms a liquid crystal display apparatus according to Example 3. As shown in FIG. 6, each convex portion 144C11 that extends from the X axis or the vicinity thereof and occupies the first quadrant is not joined to each convex portion 144C41 that extends from the X axis or the vicinity thereof and occupies the fourth quadrant, each convex portion 144C12 that extends from the Y axis or the vicinity thereof and occupies the first quadrant is not joined to each convex portion 144C22 that extends from the Y axis or the vicinity thereof and occupies the second quadrant, each convex portion 144C21 that extends from the X axis or the vicinity thereof and occupies the second quadrant is not joined to each convex portion 144C31 that extends from the X axis or the vicinity thereof and occupies the third quadrant, and each convex portion 144C32 that extends from the Y axis or the vicinity thereof and occupies the third quadrant is not joined to each convex portion 144C42 that extends from the Y axis or the vicinity thereof and occupies the fourth quadrant.

The respective convex portions 144C are not joined to each other, but may be in a contact state. Here, the "join" means a state where the respective convex portions intersect with each other over a certain length, and the "contact" means a state where the respective convex portions intersect with each other over a very short length (for example, at a point).

With such a configuration, in a similar way, the part of the convex portion that extends in parallel with the X axis or the part of the convex portion that extends in parallel with the Y axis does not exist, or if any, the length is very short. Accordingly, it is possible to obtain the same effect as in the description of Example 1.

Example 4

Figure 7:
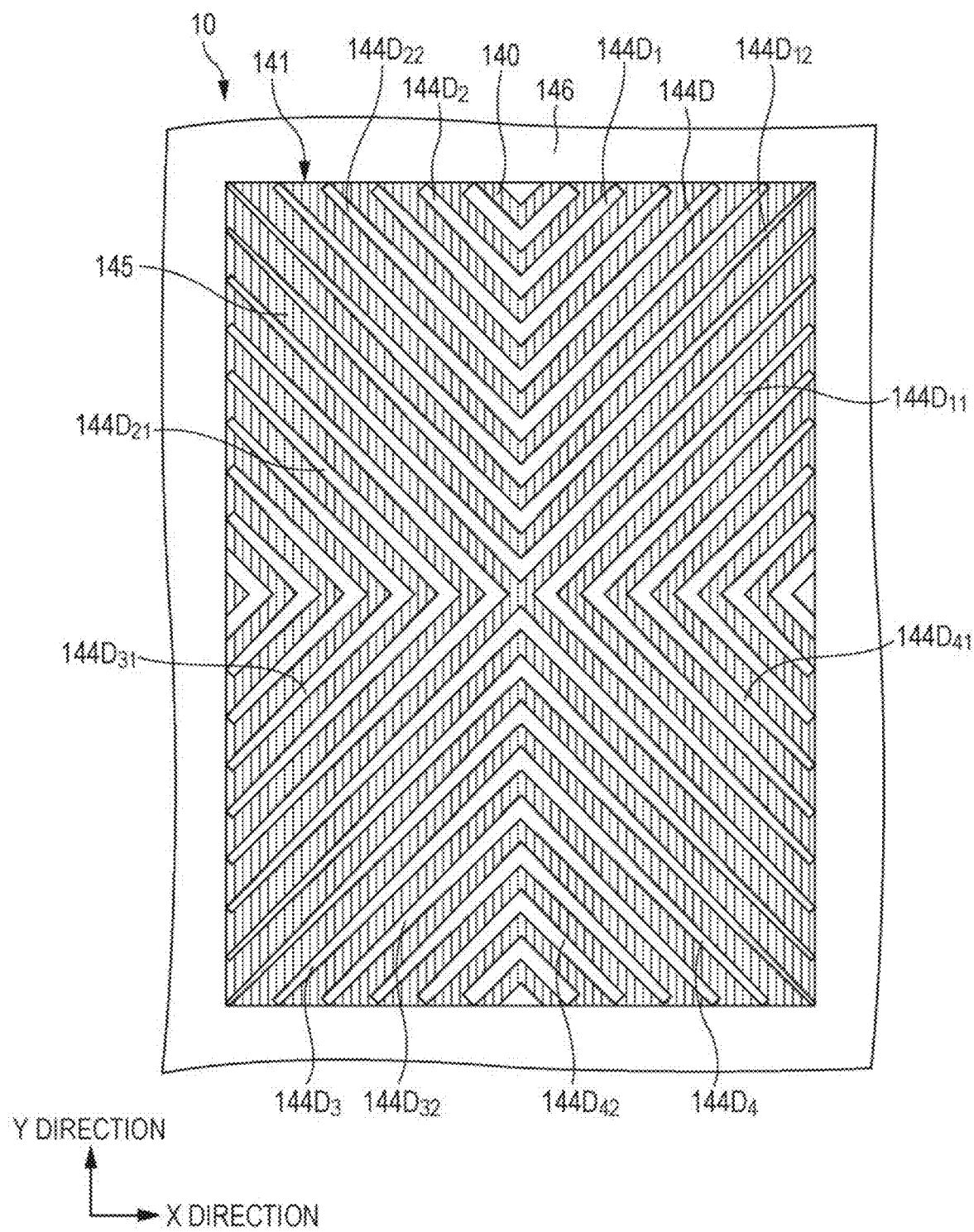
FIG. 7 is a plan view schematically illustrating a first electrode corresponding to one pixel that forms a liquid crystal display apparatus according to Example 4.

Example 4 is a modification of Examples 1 to 3. FIG. 7 is a plan view schematically illustrating a first electrode corresponding to one pixel that forms a liquid crystal display apparatus according to Example 4. As shown in FIG. 7, the width of the convex portion 144D is decreased toward the periphery of the pixel 10. Specifically, the width of the convex portion 144D is the largest on the X axis, the Y axis and in the vicinity thereof, and is decreased toward the periphery of the pixel 10 (more specifically, is linearly decreased).

Figure 8A:
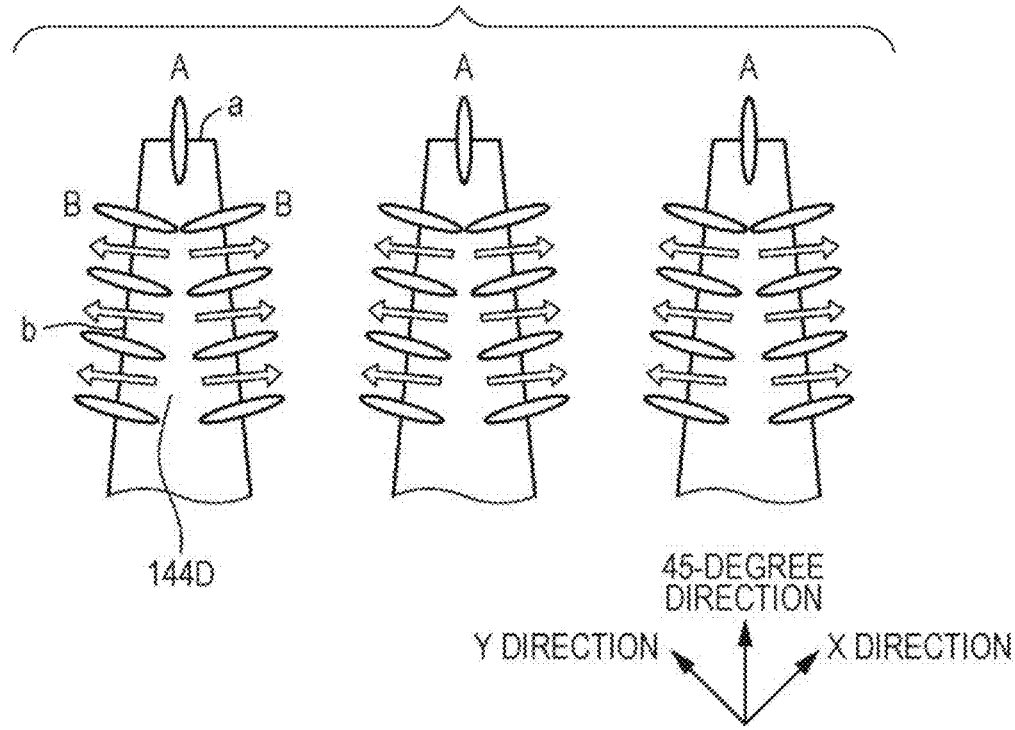
FIGS. 8A and 8B are diagrams schematically illustrating an operation of liquid crystal molecules in a convex portion in Example 4 or the like, respectively.
Figure 8B:
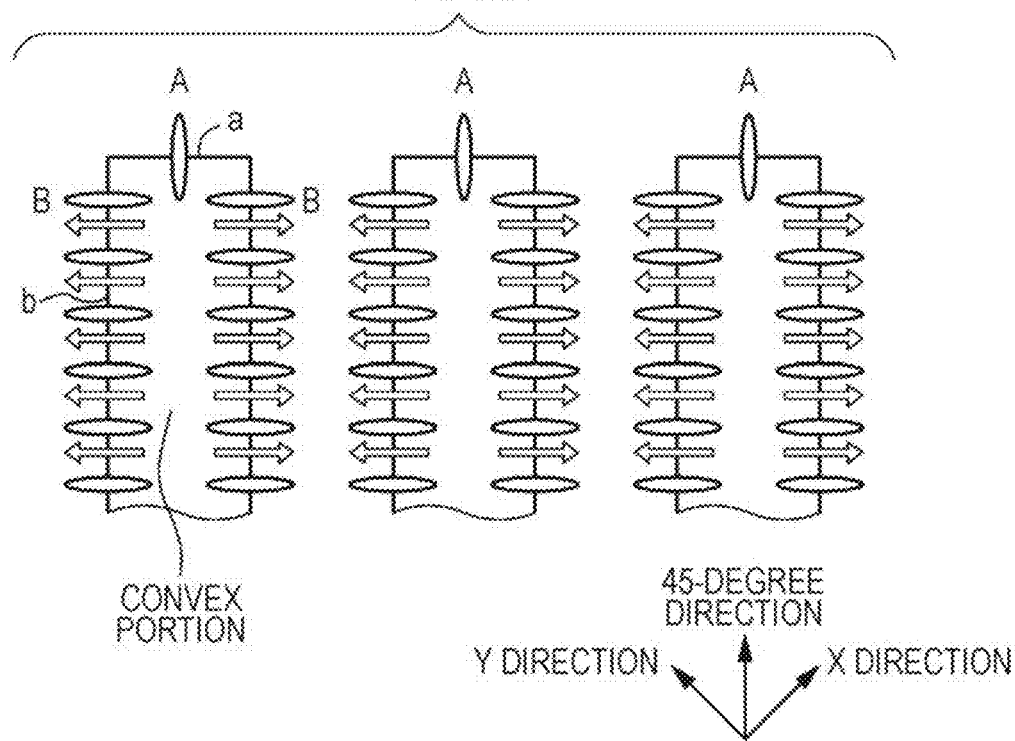

However, in manufacturing the liquid crystal display apparatus, a pre-tilt is given to liquid crystal molecules in a state where a voltage is applied to electrodes. Here, as shown in FIGS. 8A and 8B, a liquid crystal molecule A disposed at a tip edge part a of the convex portion or the vicinity thereof (for ease of description, referred to as a "tip region") is inclined in the axial direction (director) of the convex portion 144D. Further, when a thickness-directional region that includes the liquid crystal molecule A is considered in the liquid crystal layer, the movement of the liquid crystal molecule A is transmitted to the entire liquid crystal molecules of one pixel except for an edge part of the convex portion affected by a local electric field due to the structure (for ease of description, referred to as "liquid crystal molecules A'"), and the director of the liquid crystal molecules A' is inclined in the axial direction of the convex portion. Here, as shown in FIG. 8B, in a case where the convex portion is not tapered, compared with Example 4 in which the convex portion 144D is tapered as shown in FIG. 8A, the movement of the liquid crystal molecule A is hardly transmitted to the liquid crystal molecules A', or a slightly long time is taken for the movement of the liquid crystal molecule A to be transmitted to the liquid crystal molecules A'. Accordingly, in the example shown in FIG. 8B, a slightly long time is necessary for giving the pre-tilt to the liquid crystal molecules, compared with Example 4.

If the voltage is applied to the electrode when the image is displayed in the liquid crystal display apparatus, in the entire liquid crystal layer, the liquid crystal molecules are changed so that the director is in parallel with the first substrate and the second substrate. In FIGS. 8A and 8B, the direction of an electric field at a side edge of the convex portion is indicated by a white arrow. Here, when a thickness-directional columnar region is considered in the liquid crystal layer that includes liquid crystal molecules B disposed at the side edge "b" of the convex portion or the vicinity thereof (for ease of description, referred to as a "side edge region"), the liquid crystal molecules arranged in the columnar region in the thickness direction are rotated. That is, the direction of the director of the liquid crystal molecules B disposed in the side edge region and the direction of the director of the liquid crystal molecules (for ease of description, referred to as "liquid crystal molecules B'") arranged in the thickness direction in the columnar region that includes the liquid crystal molecules B have different states. An angle formed by the director of the liquid crystal molecules B and the director of the liquid crystal molecules B' is represented as β. Here, as shown in FIG. 8B, in a case where the convex portion is not tapered, since the rotation angle range of the liquid crystal molecules is wide (that is, since the angle β is large), the ratio of the liquid crystal molecules having retardation in the direction of 45 degrees with respect to the X axis direction or the Y axis direction is small. Thus, slight non-uniformity is caused in the light transmittance in the convex portion. On the other hand, in Example 4 in which the convex portion 144D is tapered, since the rotation angle range of the liquid crystal molecules is small (that is, since the angle β is small), the ratio of the liquid crystal molecules having retardation in the direction of 45 degrees with respect to the X axis direction or the Y axis direction is large. Thus, it is possible to achieve high uniformity of the light transmittance in the convex portions 144D.

Example 5

Example 5 is a modification according to Examples 1 to 4, which relates to a liquid crystal display apparatus according to Embodiment 1-A of the present disclosure, and relates to a liquid crystal display apparatus according to Embodiment 3 of the present disclosure.

Figure 9A:
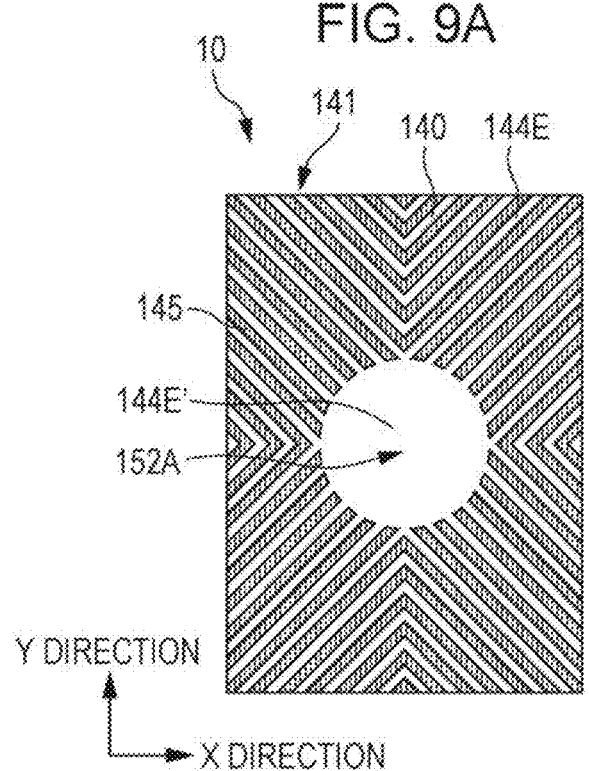
FIGS. 9A, 9B and 9C are a diagram schematically illustrating an arrangement state of a convex portion, a concave portion, a central region and the like, a diagram schematically illustrating an arrangement state of a slit portion provided in a first electrode, and a diagram illustrating an overlapped state of the concave and convex portions and the slit portion, in a pixel that forms a liquid crystal display apparatus according to Example 5, respectively.
Figure 9B:
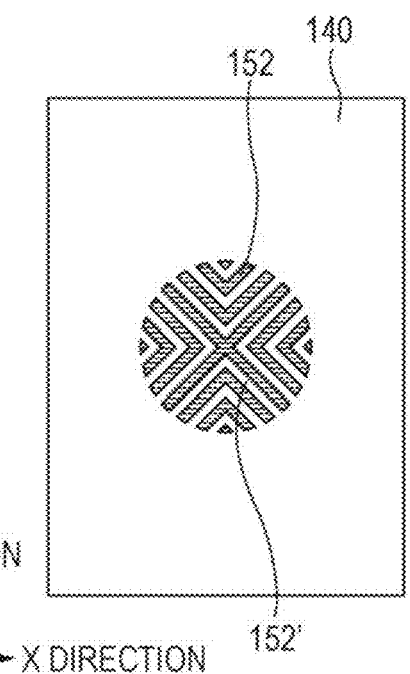
Figure 9C:
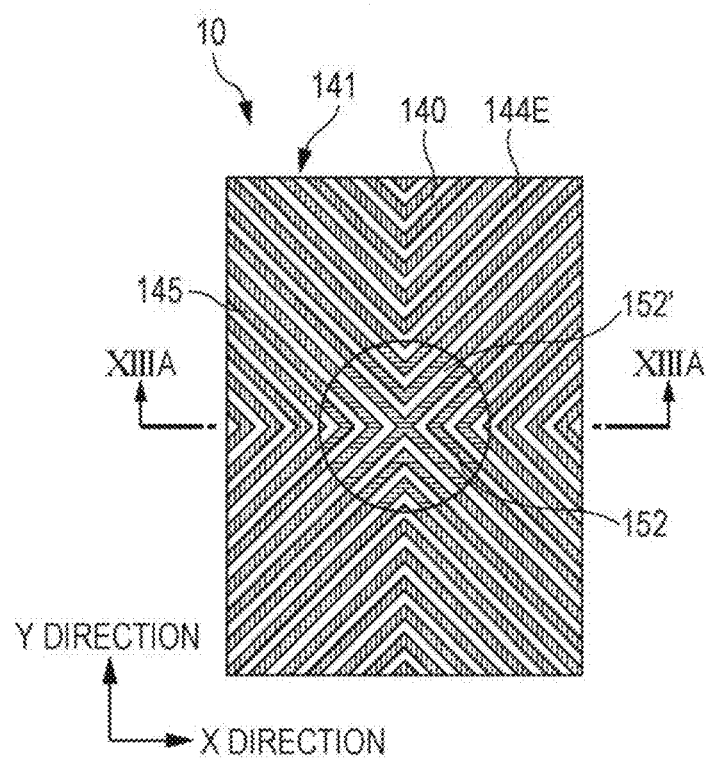
Figure 10A:
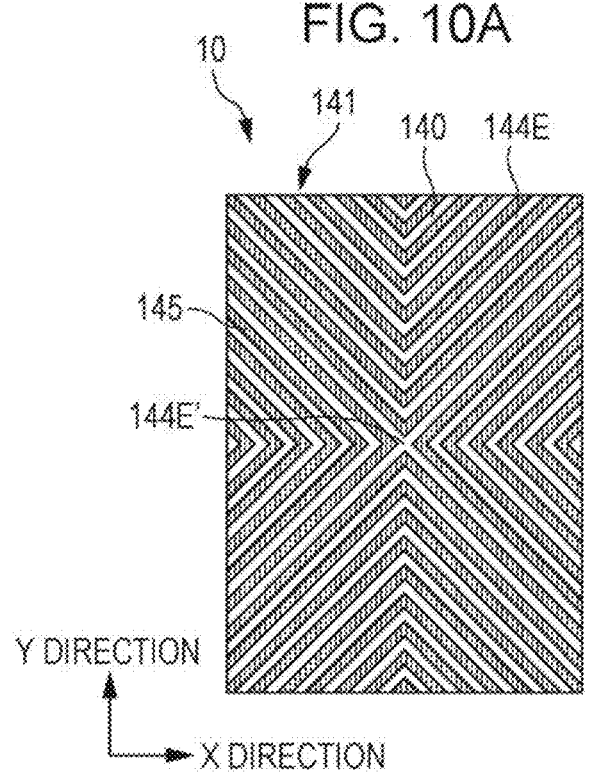
FIGS. 10A, 10B and 10C are a diagram schematically illustrating an arrangement state of a convex portion, a concave portion, a central region and the like, a diagram schematically illustrating an arrangement state of a slit portion provided in a first electrode, and a diagram illustrating an overlapped state of the concave and convex portions and the slit portion, in a modification example of a pixel that forms the liquid crystal display apparatus according to Example 5, respectively.
Figure 10B:
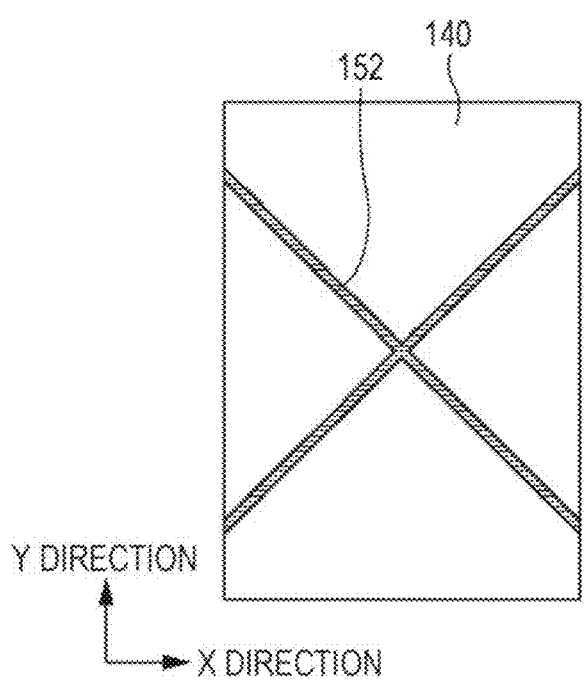
Figure 10C:
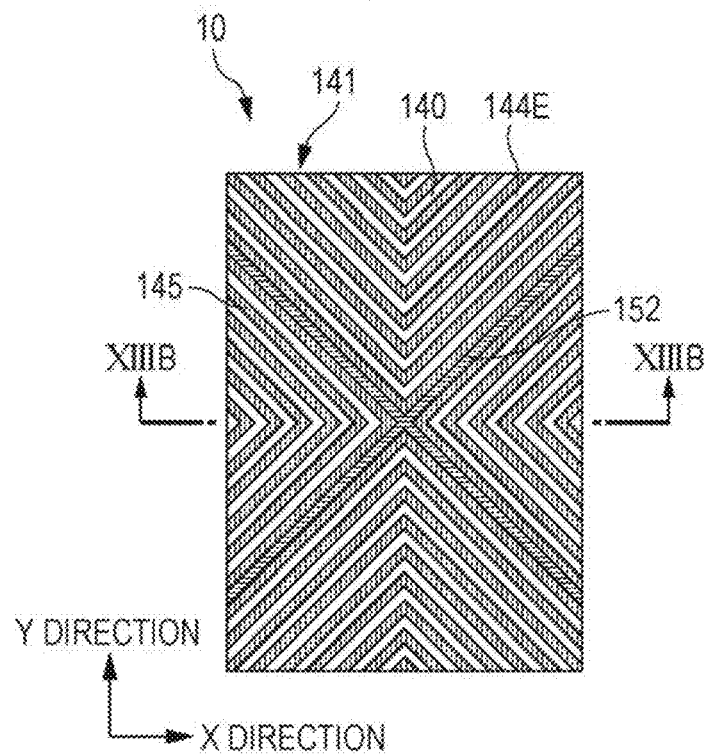
Figure 12A:
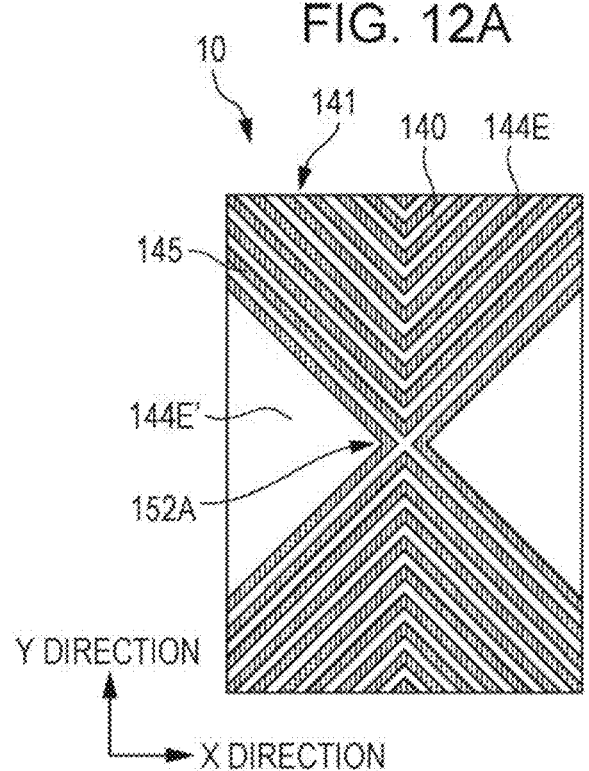
FIGS. 12A, 12B and 12C are a diagram schematically illustrating an arrangement state of a convex portion, a concave portion, a central region and the like, a diagram schematically illustrating an arrangement state of a slit portion provided in a first electrode, and a diagram illustrating an overlapped state of the concave and convex portions and the slit portion, in another modification example of a pixel that forms the liquid crystal display apparatus according to Example 5, respectively.
Figure 12B:
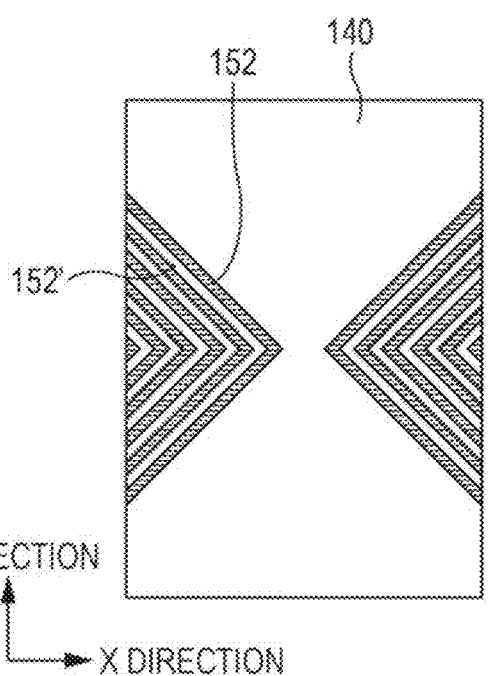
Figure 12C:
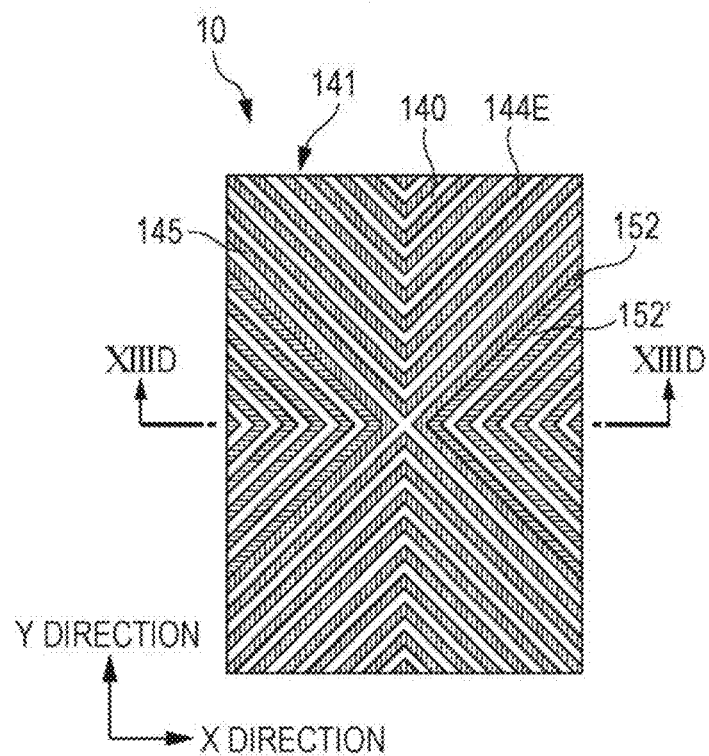
Figure 13A:
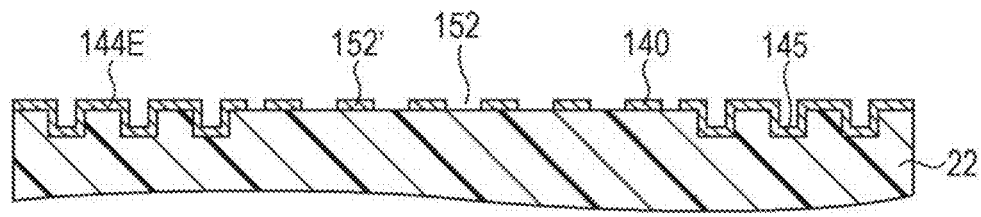
FIG. 13A is a schematic sectional view taken along arrow XIIIA-XIIIA in FIG. 9C.
Figure 13B:
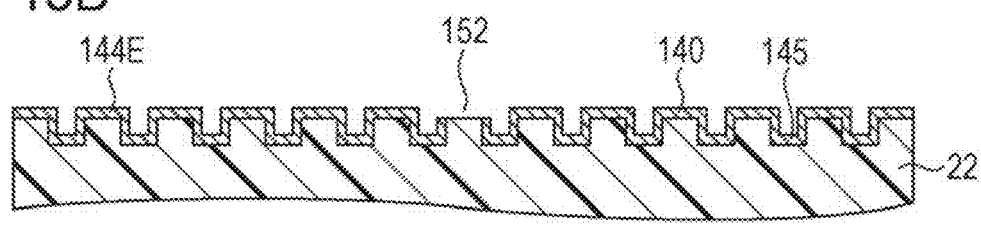
FIG. 13B is a schematic sectional view taken along arrow XIIIB-XIIIB in FIG. 10C.
Figure 13C:
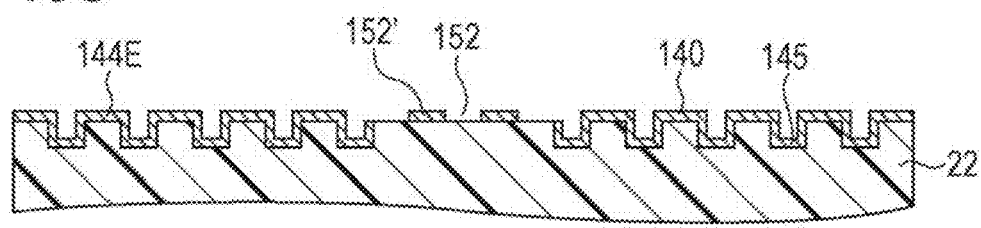
FIG. 13C is a schematic sectional view taken along arrow XIIIC-XIIIC in FIG. 11C.
Figure 13D:
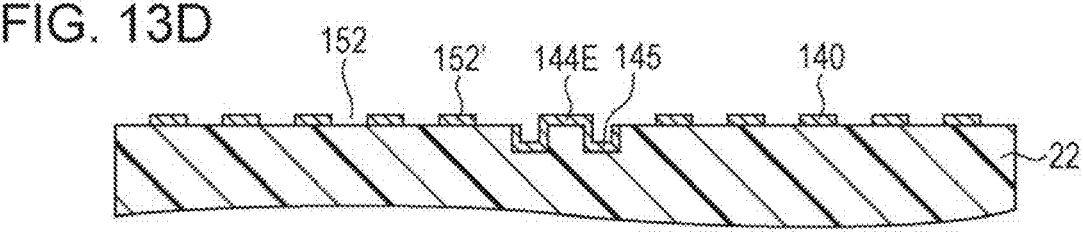
FIG. 13D is a schematic sectional view taken along arrow XIIID-XIIID in FIG. 12C.

FIGS. 9A to 9C, FIGS. 10A to 10C, FIGS. 11A to 11C and FIGS. 12A to 12C are plan views schematically illustrating a first electrode and the like corresponding to one pixel that forms a liquid crystal display apparatus according to Example 5. As shown in the figures, a slit portion 152 in addition to the concave and convex portions 141 is formed in the first electrode 140. A transparent conductive material layer that forms the first electrode 140 is not formed in the slit portion 152. FIG. 13A is a schematic sectional view taken along arrow XIIIA-XIIIA in FIG. 9C, FIG. 13B is a schematic sectional view taken along arrow XIIIB-XIIIB in FIG. 10C, FIG. 13C is a schematic sectional view taken along arrow XIIIC-XIIIC in FIG. 11C, and FIG. 13D is a schematic sectional view taken along arrow XIIID-XIIID in FIG. 12C.

In Example 5, the slit portion 152 is formed in a convex portion region 144E'. Here, as shown in FIGS. 9A, 9B and 9C, the slit portions 152 are provided in a region that includes a central region (central part) 152A of the pixel 10. Here, FIG. 9A is diagram schematically illustrating an arrangement state of the convex portions 144E, the convex portion region 144E', the concave portions 145 and the central region 152A, FIG. 9B is a diagram schematically illustrating an arrangement state of the slit portions 152 provided in the first electrode 140, and FIG. 9C is a diagram illustrating an overlapped state of the concave and convex portions 141 and the slit portions 152. Alternatively, as shown in FIGS. 10A, 10B and 10C, in each quadrant, the slit portion 152 is formed in one convex portion region 144E' (specifically, on one convex portion 144) that extends toward the central region (central part) of the pixel 10. Here, FIG. 10A is a diagram schematically illustrating an arrangement state of the convex portions 144E, the convex portion region 144E', and the concave portions 145, FIG. 10B is a diagram schematically illustrating an arrangement state of the slit portion 152 provided in the first electrode 140, and FIG. 10C is a diagram illustrating an overlapped state of the concave and convex portions 141 and the slit portion 152. Alternatively, as shown FIGS. 11A, 11B and 11C, in each quadrant, the slit portion 152 is formed in a convex portion region 144E' that extends toward a central region (central portion) 152A of the pixel 10. Here, FIG. 11A is a diagram schematically illustrating an arrangement state of the convex portions 144E, the convex portion region 144E', the concave portions 145 and the central region 152A, FIG. 11B is a diagram schematically illustrating an arrangement state of the slit portion 152 provided in the first electrode 140, and FIG. 11C is a diagram illustrating an overlapped state of the concave and convex portions 141 and the slit portion 152. Alternatively, as shown in FIGS. 12A, 12B and 12C, the slit portion 152 is formed in a convex portion region 144E' that is provided in a region that is narrowed by the convex portions that extend toward a central region (central portion) 152A of the pixel 10 and the Y axis. Here, FIG. 12A is a diagram schematically illustrating an arrangement state of the convex portions 144E, the convex portion region 144E', the concave portions 145 and the central region 152A, FIG. 12B is a diagram schematically illustrating an arrangement state of the slit portion 152 provided in the first electrode 140, and FIG. 12C is a diagram illustrating an overlapped state of the concave and convex portions 141 and the slit portion 152. Here, in FIGS. 9A and 9C, FIGS. 10A and 10C, FIGS. 11A and 11C and FIGS. 12A and 12C, the concave portions 145 are given hatched lines that extend in the longitudinal direction. Further, in FIGS. 9B and 9C, FIGS. 10B and 10C, FIGS. 11B and 11C, FIGS. 12B and 12C, and FIG. 24, the slit portions 152 and 252 are given hatched lines that extend in the transverse direction. The slit portion is not provided in a region indicated by reference numeral 152', but a transparent conductive material layer that forms the first electrode 140 is formed therein. The planarizing layer 22 is exposed in the slit portion 152.

Figure 14A:
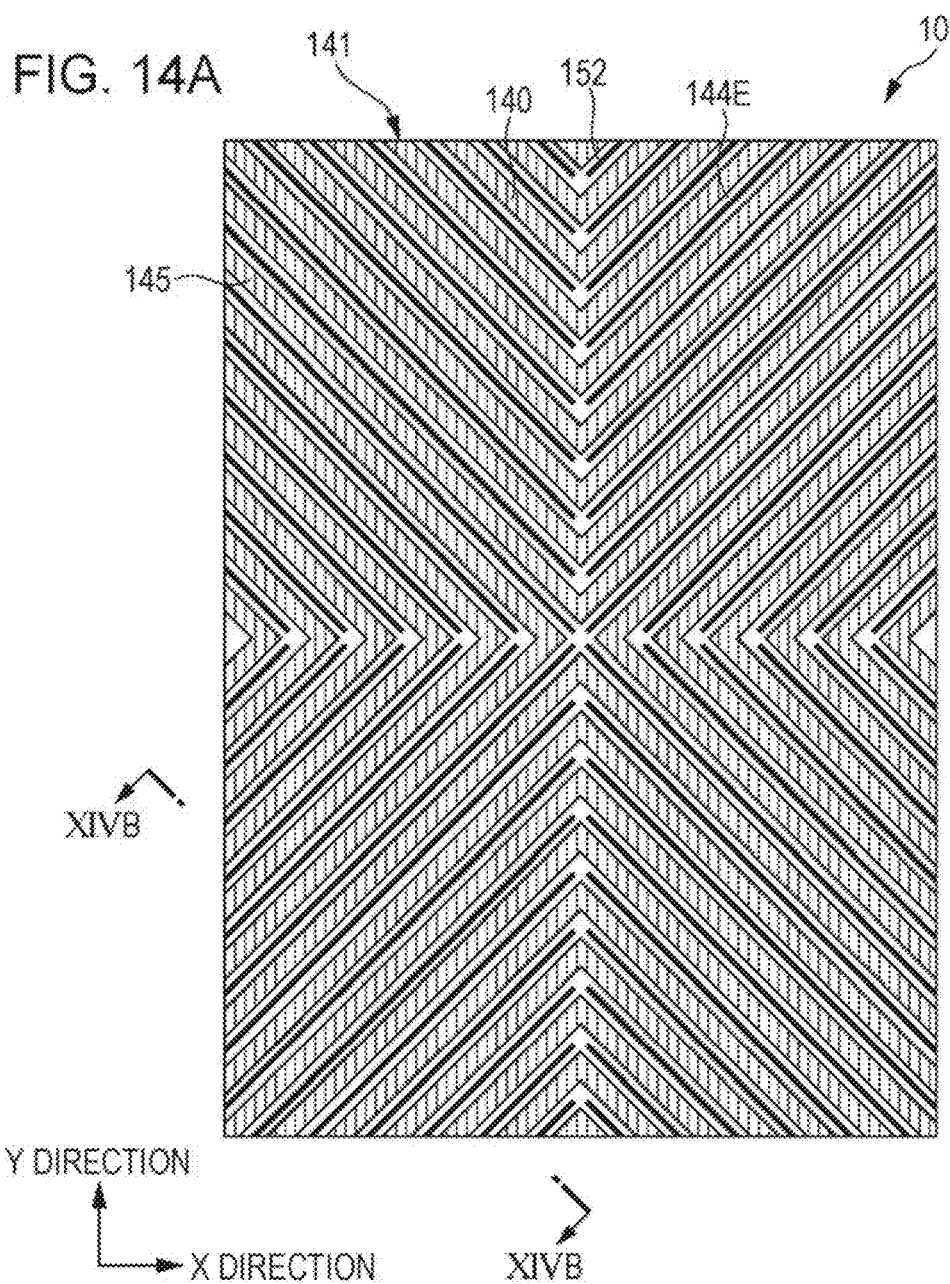
FIGS. 14A and 14B are a diagram schematically illustrating an arrangement state of a convex portion, a concave portion, a slit portion and the like, and a schematic sectional view of a first electrode taken along arrow XIVB-XIVB in FIG. 14A, in another modification example of a pixel that forms the liquid crystal display apparatus according to Example 5, respectively.
Figure 14B:
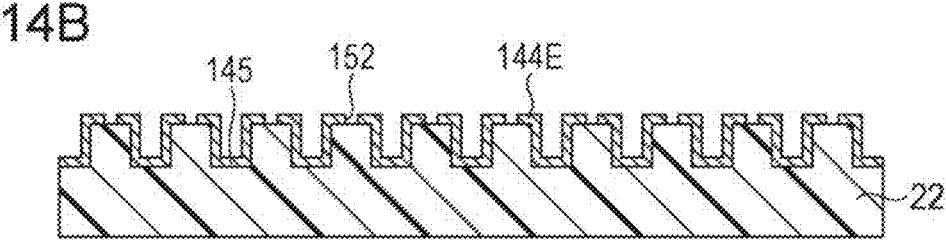
Figure 15A:
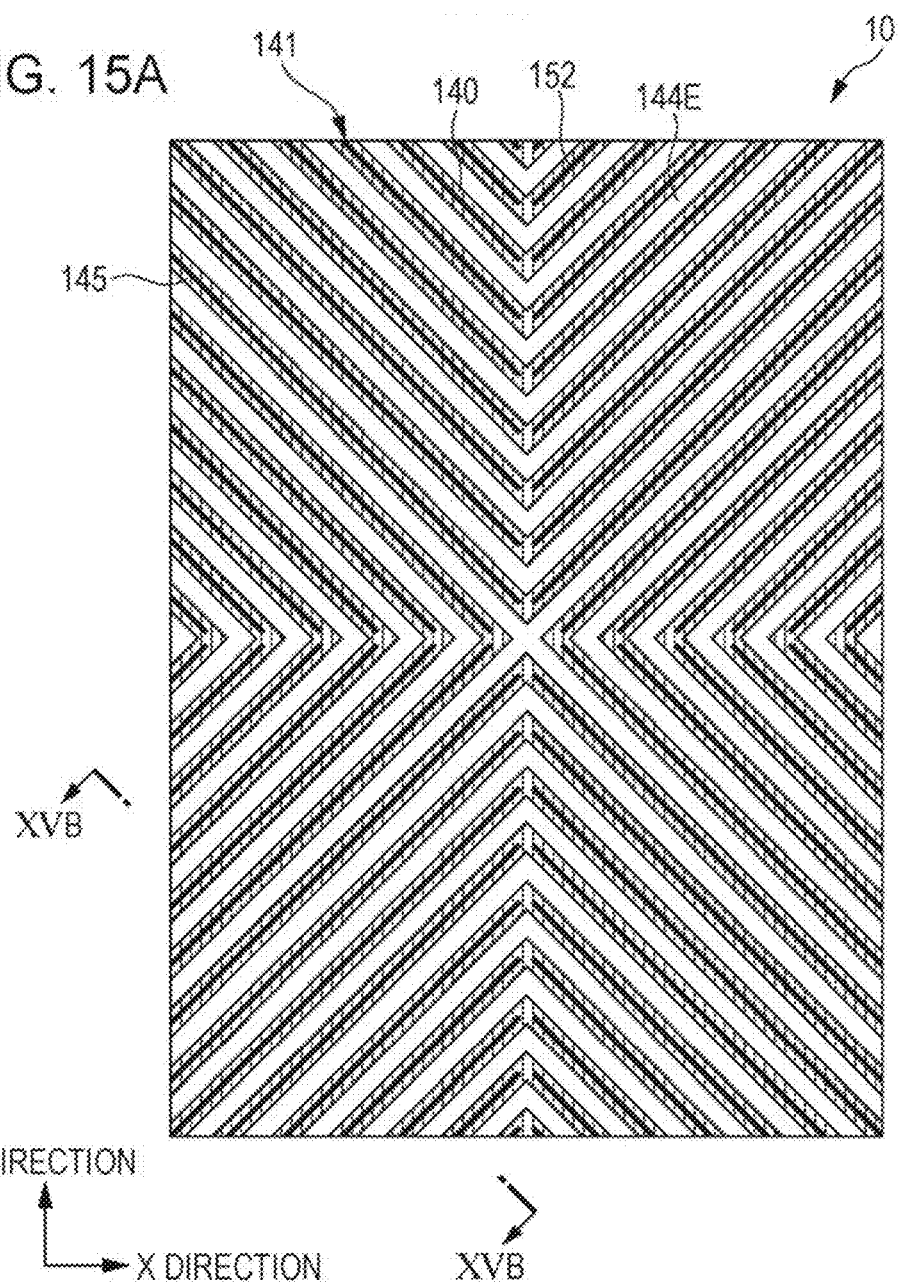
FIGS. 15A and 15B are diagrams schematically illustrating an arrangement state of a convex portion, a concave portion, a slit portion and the like, and a schematic sectional view of a first electrode taken along arrow XVB-XVB in FIG. 15A, in another modification example of a pixel that forms the liquid crystal display apparatus according to Example 5, respectively.
Figure 15B:
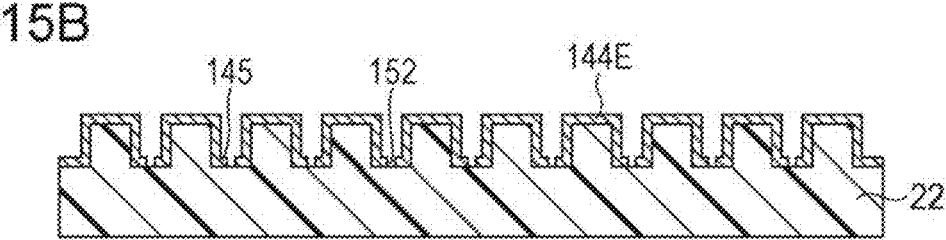

Further, FIG. 14A is a diagram schematically illustrating an arrangement state of a convex portion, a concave portion, a slit portion and the like in another modification example of a pixel that forms the liquid crystal display apparatus according to Example 5, and FIG. 14B is a schematic sectional view of the first electrode and the like taken along arrow XIVB-XIVB in FIG. 14A. As shown in FIGS. 14A and 14B, the slit portion 152 that extends in parallel with the convex portion 144E may be formed at the top of the convex portion 144E. Further, FIG. 15A is a diagram schematically illustrating an arrangement state of a convex portion, a concave portion, a slit portion and the like in still another modification example of a pixel that forms the liquid crystal display apparatus according to Example 5, and FIG. 15B is a schematic sectional view of the first electrode and the like taken along arrow XVB-XVB in FIG. 15A. As shown in FIGS. 15A and 15B, the slit portion 152 that extends in parallel with the concave portion 145 may be formed at the bottom part of the concave portion 145. In FIGS. 14A and 15A, and in FIGS. 25 and 26 to be described later, the slit portions 152 and 252 are indicated by a thick solid line. For example, in the example shown in FIGS. 14A and 14B, the width of the convex portion is 7.0 μm, the width of the concave portion is 3.0 μm, and the width of the slit portion is 3.0 μm. Further, in the example shown in FIGS. 15A and 15B, the width of the convex portion is 3.0 μm, the width of the concave portion is 7.0 μm, and the width of the slit portion is 3.0 μm. Here, the slit portion 152 is formed so that a convex portion 144E is not separated from the other convex portions 144E due to the slit portion 152, or so that a concave portion 145 is not separated from the other concave portions 145 due to the slit portion 152, that is, so that all the concave and convex portions are electrically connected to each other. In the examples shown in FIGS. 14A and 15A, the slit portion 152 is not provided in the convex portion or the concave portion on the X axis and the Y axis. That is, in the convex portion or the concave portion on the X axis and the Y axis, a notch is provided in the slit portion 152. Here, a configuration in which the slit portion is not provided in the convex portion or the concave portion in the periphery of the pixel 10 may be used.

As described above, in Example 5, since the slit portions 152 in addition to the concave and convex portions 141 are formed in the first electrode 140, an electric field generated by the first electrode 140 is distorted in the vicinity of the slit portions 152, and thus, a direction where the liquid crystal molecules fall down is strongly regulated. That is, it is possible to strengthen an alignment regulation force with respect to the liquid crystal molecules in the vicinity of the slit portions 152, and to reliably regulate the tilt state of the liquid crystal molecules in the vicinity of the slit portions 152. Thus, when the liquid crystal display apparatus is manufactured, although the liquid crystal layer is exposed in a desired electric field for a predetermined time in order to give pre-tilts to the liquid crystal molecules, it is possible to reduce the time necessary until alignment of the liquid crystal molecules exposed in the desired electric field is stabilized. That is, it is possible to give the pre-tilts to the liquid crystal molecules in a short time, and to reduce the manufacturing time of the liquid crystal display apparatus. Since the concave and convex portions in addition to the slit portions are provided, the problems in the fine slit structure of the related art do not occur.

When the widths of the convex portion 144E and the concave portion 145 are respectively 2.5 μm and the width of the slit portion 152 is 2.5 μm, in a liquid crystal display apparatus having a configuration of the slit portion 152 shown in FIGS. 11A to 11C, and FIG. 12C, or in a liquid crystal display apparatus having a configuration of the slit portion 152 shown in FIGS. 14A and 15A, the time from the application of voltage during the pre-tilt process to the completion of alignment of the liquid crystal molecules was within 10 seconds. On the other hand, in the liquid crystal display apparatus shown in FIG. 48, the necessary time from the application of voltage during the pre-tilt process to the completion of alignment of the liquid crystal molecules was about 5 minutes to about 10 minutes.

Example 6

Figure 16:
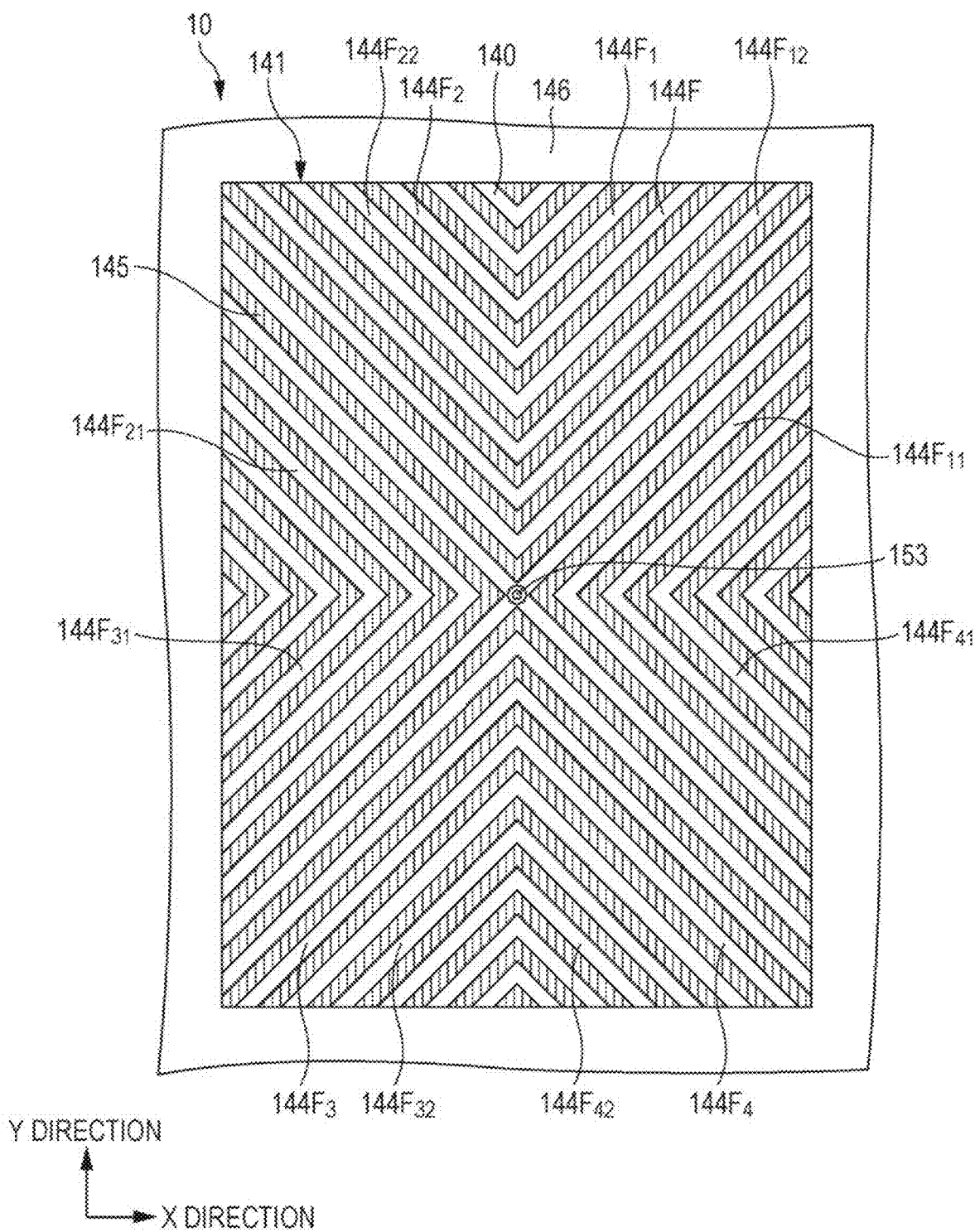
FIG. 16 is a plan view schematically illustrating a first electrode corresponding to one pixel that forms a liquid crystal display apparatus according to Example 6.
Figure 17A:
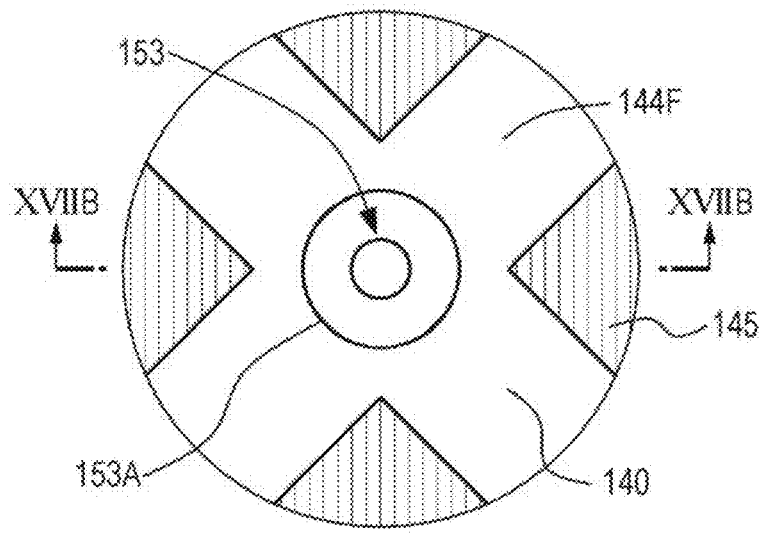
FIG. 17A is a plan view schematically illustrating a part of the first electrode in a central region of one pixel that forms the liquid crystal display apparatus according to Example 6.
Figure 17B:
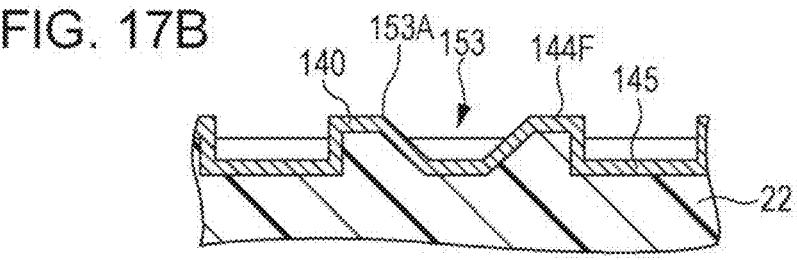
FIGS. 17B and 17C are local sectional views schematically illustrating a part of the first electrode in the central region of one pixel that forms the liquid crystal display apparatus according to Example 6.
Figure 18A:
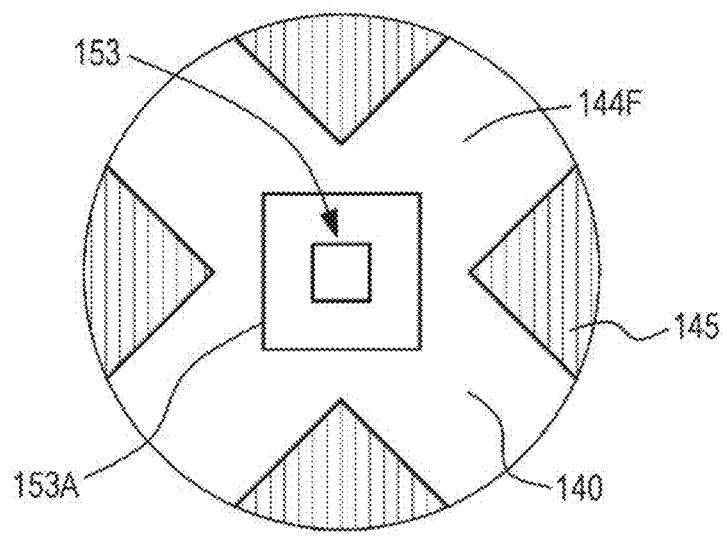
FIGS. 18A and 18B are plan views schematically illustrating a part of the first electrode in the central region of one pixel that forms the liquid crystal display apparatus according to Example 6, respectively.
Figure 18B:
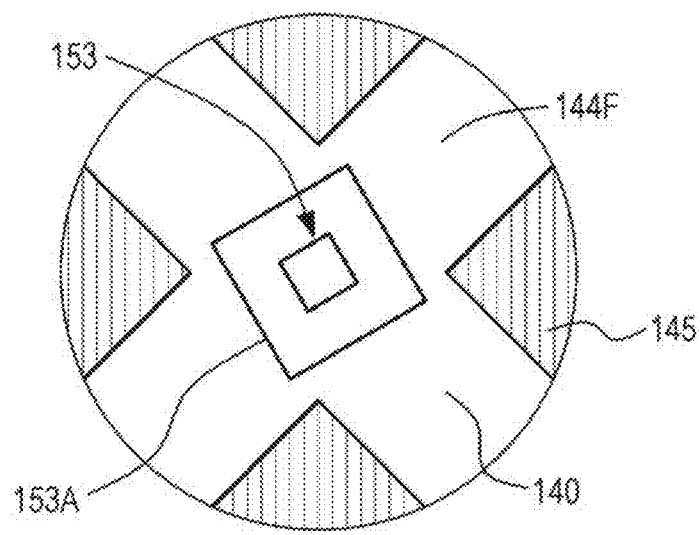

Example 6 is a modification according to Examples 1 to 5, which relates to a liquid crystal display apparatus according to Embodiment 4 of the present disclosure, a liquid crystal display apparatus according to Embodiment 1-B of the present disclosure, and a liquid crystal display apparatus according to Embodiment 3-B of the present disclosure. FIG. 16 is a plan view schematically illustrating a first electrode corresponding to one pixel that forms a liquid crystal display apparatus according to Example 6, and FIGS. 17A, 18A and 18B are plan views schematically illustrating a part of the first electrode in a central region of one pixel that forms the liquid crystal display apparatus according to Example 6. FIG. 17B is a local sectional view thereof. As shown in the figures, a recess 153 is provided in the first electrode 140 in a central region of the pixel 10.

Here, as shown in FIG. 17B, the recess 153 is narrowed toward the first substrate. That is, the recess 153 has a so-called forward tapered slope. An inclination angle of the recess 153 is 5 degrees to 60 degrees, and preferably 20 degrees to 30 degrees. Such an inclination angle may be obtained by giving a slope to the planarizing layer 22, for example, by etching the planarizing layer 22 on the basis of an etching method. Further, the shape of an outer edge 153A of the recess 153 may be a circle (for example, its diameter is 15 μm or 7 μm) as shown in FIG. 17A, or may be a rectangle (for example, a square of which the length of a side is 12 μm) as shown in FIGS. 18A and 18B. An angle formed by the outer edge 153A of the rectangular recess 153 and the extension direction of the convex portion 144F (angle formed by the outer edge 153A of the rectangular recess 153 and the extension direction of the convex portion 144F where the outer edge 153A and an extension portion of the convex portion 144F intersect with each other) may be 90 degrees (see FIG. 18A), or may be an acute angle, for example, 60 degrees (see FIG. 18B).

As described above, in the liquid crystal display apparatus according to Example 6, since the recess 153 is provided in the first electrode 140 in the central region of the pixel, the liquid crystal molecules that are in contact with the recess 153 or the liquid crystal molecules disposed in the vicinity of the recess 153 are in a state of falling down toward the center of the pixel. Thus, when the liquid crystal display apparatus is manufactured, although the liquid crystal layer is exposed in a desired electric field for a predetermined time in order to give pre-tilts to the liquid crystal molecules, it is possible to reduce the time necessary until alignment of the liquid crystal molecules exposed in the desired electric field is stabilized. That is, it is possible to give the pre-tilts to the liquid crystal molecules in a short time, and to reduce the manufacturing time of the liquid crystal display apparatus.

In a liquid crystal display apparatus in which the widths of the convex portion 144F and the concave portion 145 are respectively 2.5 μm, the inclination angle of the recess 153 is 30 degrees, and the shape of the outer edge 153A of the recess 153 is the circle as shown in FIG. 17A, the time from the application of voltage during the pre-tilt process to the completion of alignment of the liquid crystal molecules was within 10 seconds.

Figure 17C:
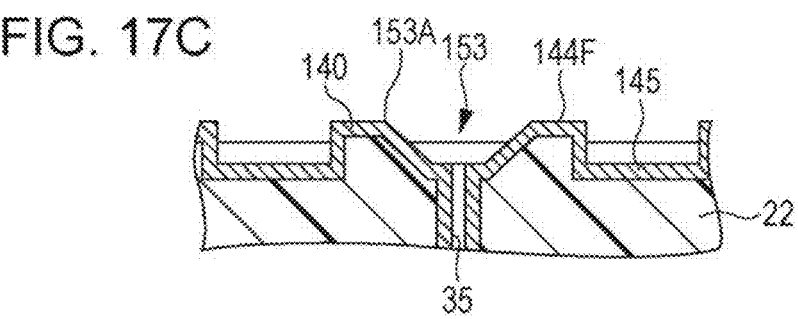

Here, as shown in FIG. 17C, a configuration in which the central part of the recess 153 forms a part of a contact hole (connection hole 35) may be used.

Example 7

Figure 19:
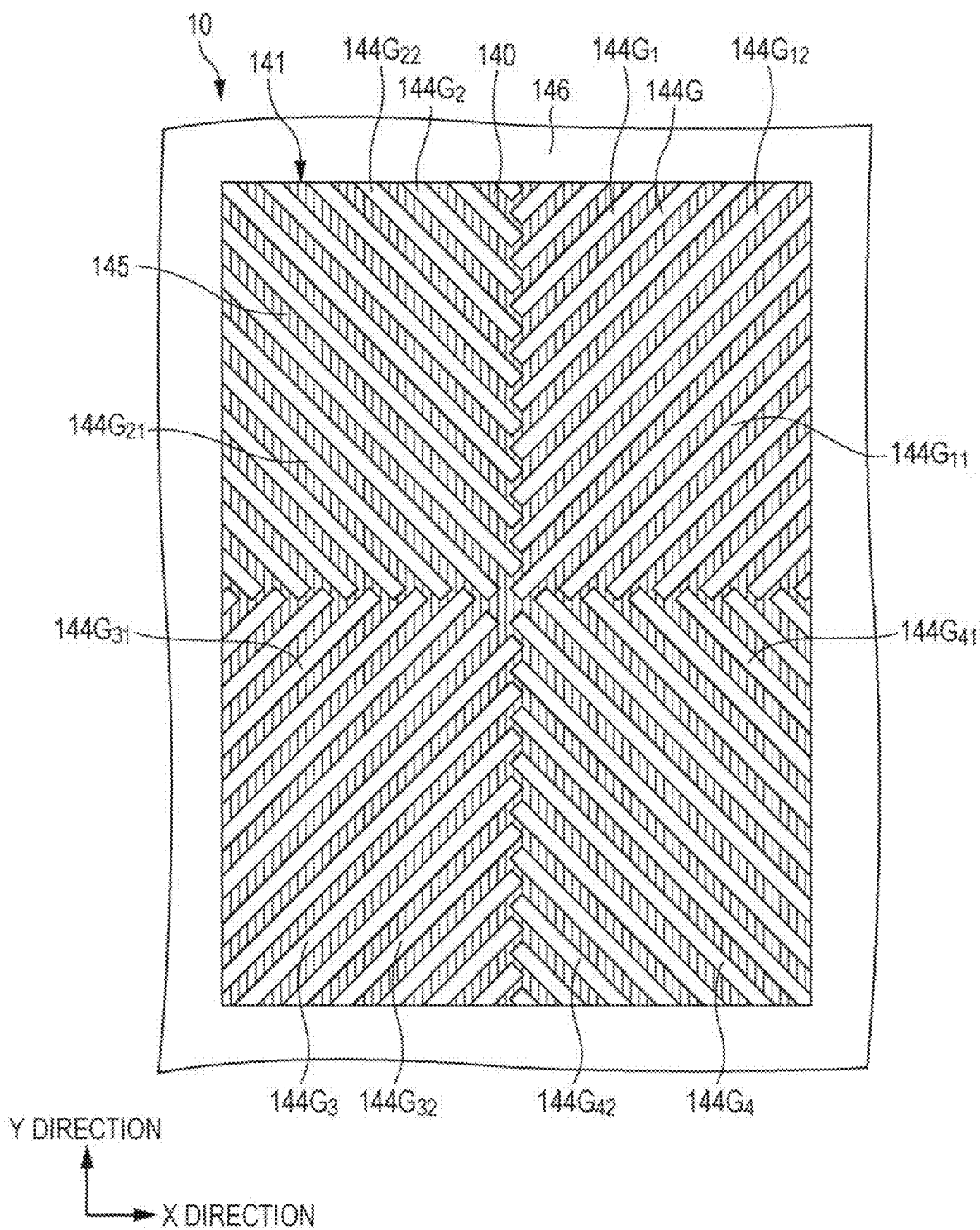
FIG. 19 is a plan view schematically illustrating a first electrode corresponding to one pixel that forms a liquid crystal display apparatus according to Example 7.

Example 7 is a modification according to Examples 1 to 6, which relates to a liquid crystal display apparatus according to Embodiment 5 of the present disclosure, a liquid crystal display apparatus according to Embodiment 1-C of the present disclosure, a liquid crystal display apparatus according to Embodiment 3-C of the present disclosure, and a liquid crystal display apparatus according to Embodiment 4-C of the present disclosure. FIG. 19 is a plan view schematically illustrating a first electrode corresponding to one pixel that forms a liquid crystal display apparatus according to Example 7.

That is, in the liquid crystal display apparatus according to Example 7, when the formation pitch of convex portions 144G along the X axis is Px and the formation pitch of the convex portions 144G along the Y axis is Py (=Px), the width of the convex portion 144G is (Py/2=Px/2), and the width of the concave portion 145 is (Py/2=Px/2).

Further, in Example 7, convex portions 144G11 that extend from the X axis or the vicinity thereof and occupy the first quadrant, convex portions 144G41 that extend from the X axis or the vicinity thereof and occupy the fourth quadrant are formed in a state of deviating from each other (preferably, formed in a state of deviating from each other by (Px/2)); convex portions 144G12 that extend from the Y axis or the vicinity thereof and occupy the first quadrant and convex portions 144G22 that extend from the Y axis or the vicinity thereof and occupy the second quadrant are formed in a state of deviating from each other (preferably, formed in a state of deviating from each other by (Py/2)); convex portions 144G21 that extend from the X axis or the vicinity thereof and occupy the second quadrant and convex portions 144G32 that extend from the X axis or the vicinity thereof and occupy the third quadrant are formed in a state of deviating from each other (preferably, formed in a state of deviating from each other by (Px/2)); and convex portions 144G31 that extend from the Y axis or the vicinity thereof and occupy the third quadrant and convex portions 144G41 that extend from the Y axis or the vicinity thereof and occupy the fourth quadrant are formed in a state of deviating from each other (preferably, formed in a state of deviating from each other by (Py/2)). The convex portions 144G are not linearly symmetric with respect to the X axis and the Y axis, but are rotationally symmetric (point symmetric) with respect to the center of the pixel at 180 degrees.

As described above, as the convex portion 144G and the convex portion 144G are formed in the state of deviating from each other by the half pitch, an electric field generated by the first electrode 140 at the center of the pixel is distorted in the vicinity of the center of the pixel, and thus, a direction where the liquid crystal molecules fall down is strongly regulated. As a result, it is possible to strengthen an alignment regulation force with respect to the liquid crystal molecules in the vicinity of the center of the pixel, and to reliably regulate the tilt state of the liquid crystal molecules in the vicinity of the center of the pixel. Thus, when the liquid crystal display apparatus is manufactured, although the liquid crystal layer is exposed in a desired electric field for a predetermined time in order to give pre-tilts to the liquid crystal molecules, it is possible to reduce the time necessary until alignment of the liquid crystal molecules exposed in the desired electric field is stabilized. That is, it is possible to give the pre-tilts to the liquid crystal molecules in a short time, and to reduce the manufacturing time of the liquid crystal display apparatus.

In a liquid crystal display apparatus in which the widths of the convex portion 144G and the concave portion 145 are respectively 2.5 μm and the convex portion 144G and the convex portion 144G deviate from each other by the half pitch, the time from the application of voltage during the pre-tilt process to the completion of alignment of the liquid crystal molecules was within 10 seconds.

Example 8

Figure 20:
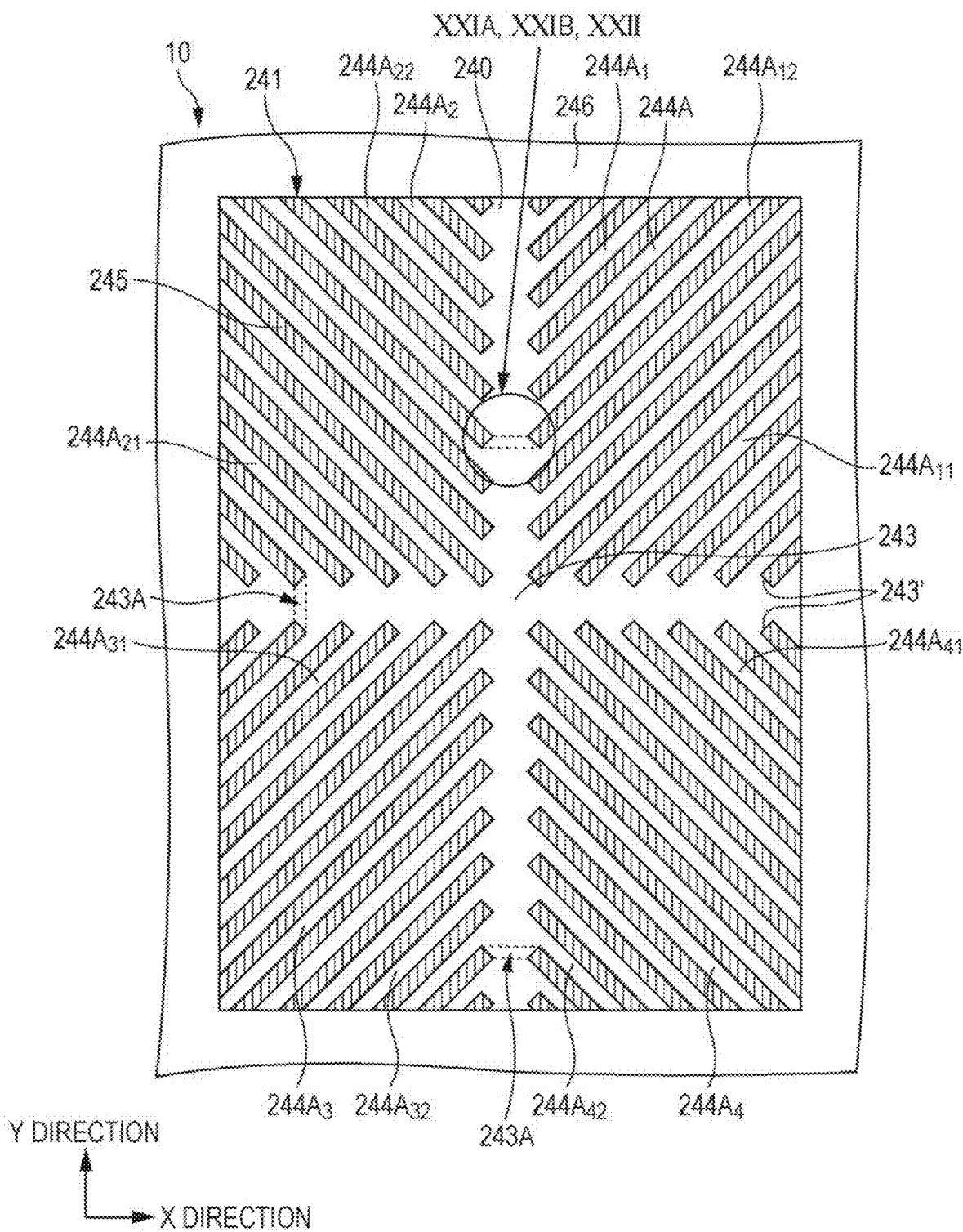
FIG. 20 is a plan view schematically illustrating a first electrode corresponding to one pixel that forms a liquid crystal display apparatus according to Example 8.

Example 8 relates to a liquid crystal display apparatus according to Embodiment 2 of the present disclosure. FIG. 20 is a plan view schematically illustrating a first electrode corresponding to one pixel that forms a liquid crystal display apparatus according to Example 8, and FIGS. 21A, 21B and 22 are schematic plan views illustrating an enlarged part of the first electrode surrounded by a circular region in the schematic plan view of the first electrode in FIG. 20.

In the liquid crystal display apparatus of Example 8, assuming that the X axis and the Y axis pass through the center of the pixel 10, and specifically, assuming that an (X, Y) coordinate system is formed by the X axis and the Y axis that are straight lines that pass through the center of the pixel 10 and are parallel to edge portions of the pixel, a plurality of concave and convex portions 241 includes a stem convex portion 243 that extends on the X axis and the Y axis, and a plurality of branch convex portions 244A that extends from a side edge of the stem convex portion 243 toward the periphery of the pixel 10, and an extension direction of a side edge part 243' of the stem convex portion 243 that is not joined to the branch convex portions 244A is not parallel to the X axis and the Y axis. That is, the extension direction of the side edge part 243' of the stem convex portion 243 that is not joined to the branch convex portions 244A is a direction that is different from the X axis and the Y axis. Here, the stem convex portion 243 and the branch convex portions 244A are linearly symmetric with respect to the X axis, and are also linearly symmetric with respect to the Y axis. Further, the stem convex portion 243 and the branch convex portions 244A are rotationally symmetric (point symmetric) with respect to the center of the pixel at 180 degrees.

Figure 21A:
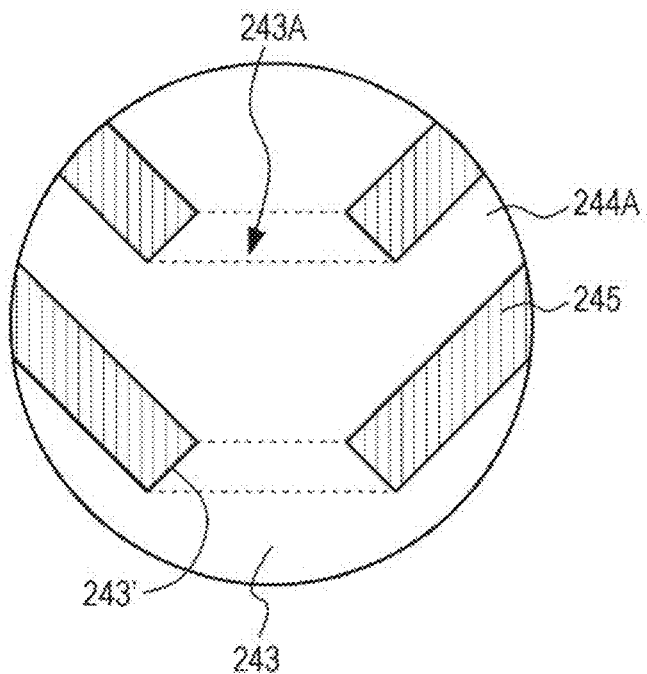
FIGS. 21A and 21B are plan views schematically illustrating an enlarged part of the first electrode surrounded by a circular region in the schematic plan view of the first electrode in FIG. 20, respectively.
Figure 21B:
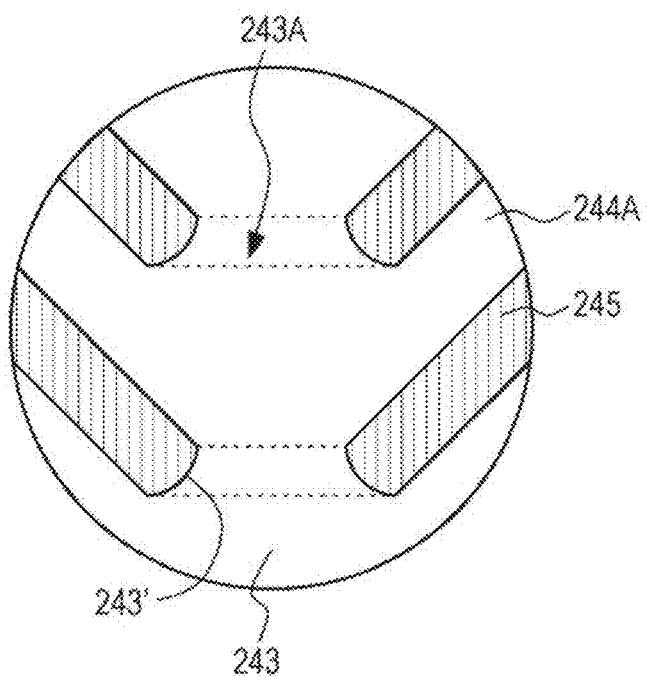
Figure 22:
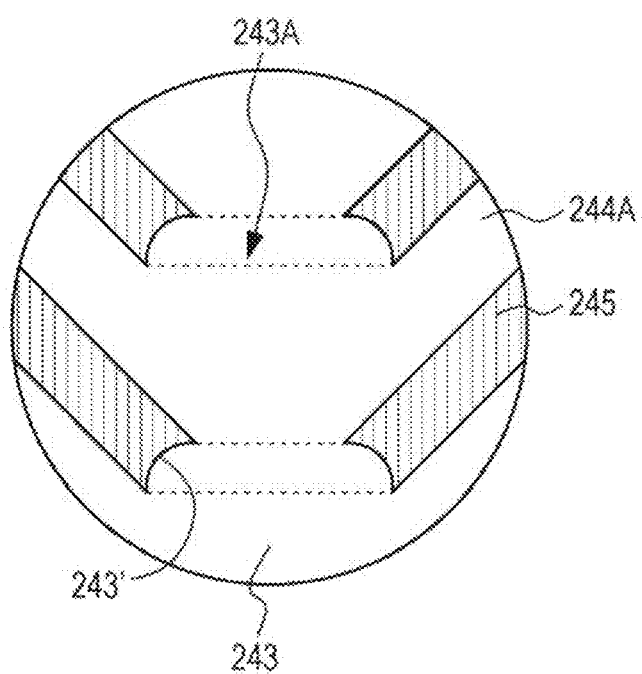
FIG. 22 is a plan view schematically illustrating an enlarged part of the first electrode surrounded by the circular region in the schematic plan view of the first electrode in FIG. 20.

Specifically, the side edge part 243' of the stem convex portion 243 that is not joined to the branch convex portions 244A has a straight line shape as shown in FIGS. 20 and 21A, or has a curved line shape as shown in FIGS. 21B and 22. Further, as shown in FIGS. 20, 21A, 21B and 22, the width of a part 243A of the stem convex portion 243 that is not joined to the branch convex portion 244A is narrowed toward the tip part of the stem convex portion 243.

Here, in the liquid crystal display apparatus of Example 8, a plurality of branch convex portion 244A1 that occupies a first quadrant extends in parallel in a direction where a value of on the Y coordinate increases when a value on the X coordinate increases, a plurality of branch convex portions 244A2 that occupies a second quadrant extends in parallel in a direction where a value on the Y coordinate increases when a value on the X coordinate decreases, a plurality of branch convex portions 244A3 that occupies a third quadrant extends in parallel in a direction where a value on the Y coordinate decreases when a value on the X coordinate decreases, and a plurality of branch convex portions 244A4 that occupies a fourth quadrant extends in parallel in a direction where a value on the Y coordinate decreases when a value on the X coordinate increases.

That is, the stem convex portion 243 and the branch convex portions 244A are linearly symmetric with respect to the X axis, are also linearly symmetric with respect to the Y axis, and are rotationally symmetric (point symmetric) with respect to the center of the pixel at 180 degrees.

Except for the above description, since the liquid crystal display apparatus of Example 8 has the same configuration or structure as in the liquid crystal display apparatus described in Example 1, detailed description thereof is not shown.

As described above, in the liquid crystal display apparatus of Example 8, a part of the stem convex portion that extends in parallel with the X axis or a part of the stem convex portion that extends in parallel with the Y axis does not exist. According, it is possible to provide a liquid crystal display apparatus capable of realizing more uniform and high light transmittance, and to provide a liquid crystal display apparatus having a configuration or structure capable of giving pre-tilts to liquid crystal molecules in a short time.

Specifications of the step convex portion 243, the branch convex portions 244A, and the concave portions 245 are as shown in Table 2.

TABLE 2

Figure 45A:
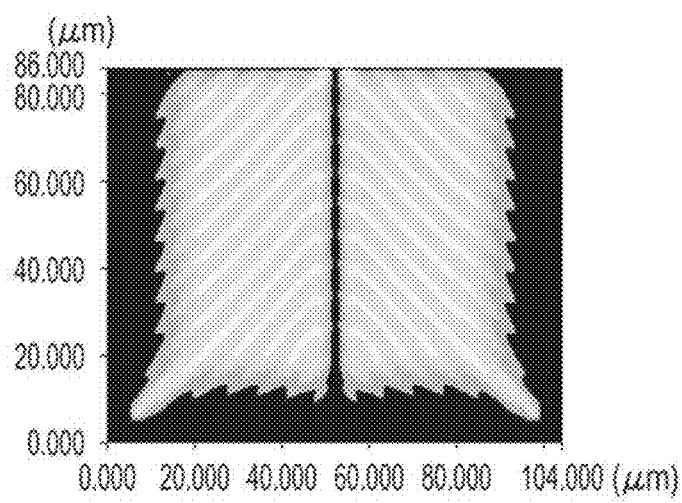
FIGS. 45A, 45B and 45C are images indicating simulation results of light transmittance in Example 8-1, Example 8-2 and Comparative example 8, respectively.
Figure 45B:
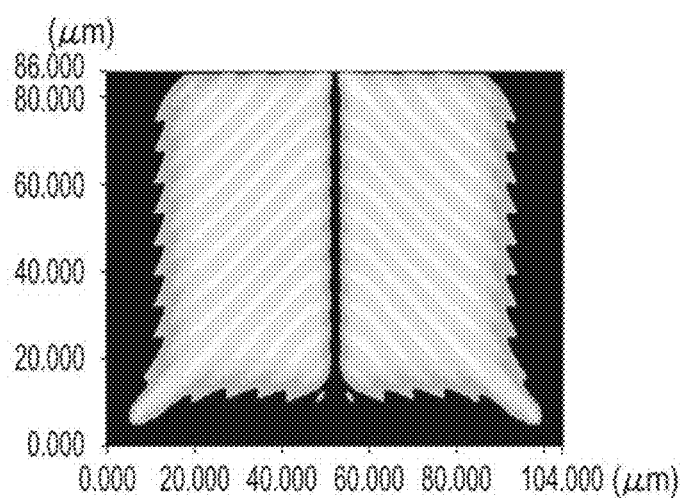
Figure 45C:
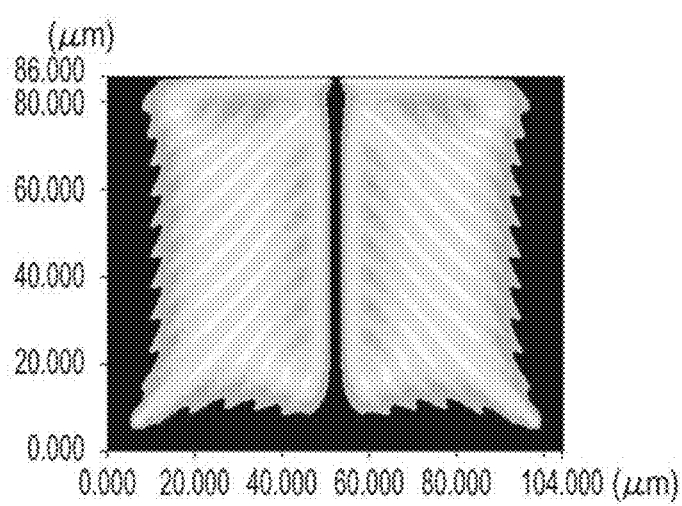

Average height of stem convex portion: 0.2 μm
Width of stem convex portion:

minimum 1.0 μm, maximum 2.0 μm (Example 8-1)
minimum 1.0 μm, maximum 3.5 μm (Example 8-2)
Average height of branch convex portions: 0.2 μm
Formation pitch of branch convex portions: 5.0 μm
Width of branch convex portion: 2.5 μm
Width of concave portion: 2.5 μm Characteristic evaluation was performed in the liquid crystal display apparatus (see FIG. 20) of Example 8 that is obtained in this way and a liquid crystal display apparatus of Comparative Example 8. In Comparative Example 8, the width of the stem convex portion was uniformly 8.0 μm. The light transmittance in the liquid crystal display apparatus was evaluated on the basis of simulation using 3-dimensional liquid crystal director, electric field and optical calculation software (LCD Master 3D FEM Version 7.31 made by SHINTECH CO., LTD.). In the simulation, in the liquid crystal display apparatus of Example 8, only parameters related to a design part in which the light transmittance was improved were changed for inspection, with reference to a simulation result of the liquid crystal display apparatus of Comparative Example 8. Here, the electric potential difference between the first electrode and the second electrode was considered as 7.5 V. A result of a light transmittance improvement rate around the stem convex portion at this time is shown in Table 3. Further, images that indicate the simulation results of the light transmittances in Example 8-1, Example 8-2 and Comparative Example 8 are shown in FIGS. 45A, 45B and 45C. In FIGS. 45A, 45B and 45C, a third quadrant and a fourth quadrant of one pixel are shown, in which the X axis is located at a place where the value on the Y axis is 86 μm and the Y axis is located at a place where the value on the X axis is 52 μm. Compared with a region of dark lines (portions where the light transmittance is locally small) in the liquid crystal display apparatus of Comparative Example 8 shown in FIG. 45C, a region of dark lines in the liquid crystal display apparatus of Example 8 is small.

TABLE 3

| | Light transmittance improvement rate |
|---|---|
| Example 8-1 | 5.35% |
| Example 8-2 | 4.56% |

Figure 23:
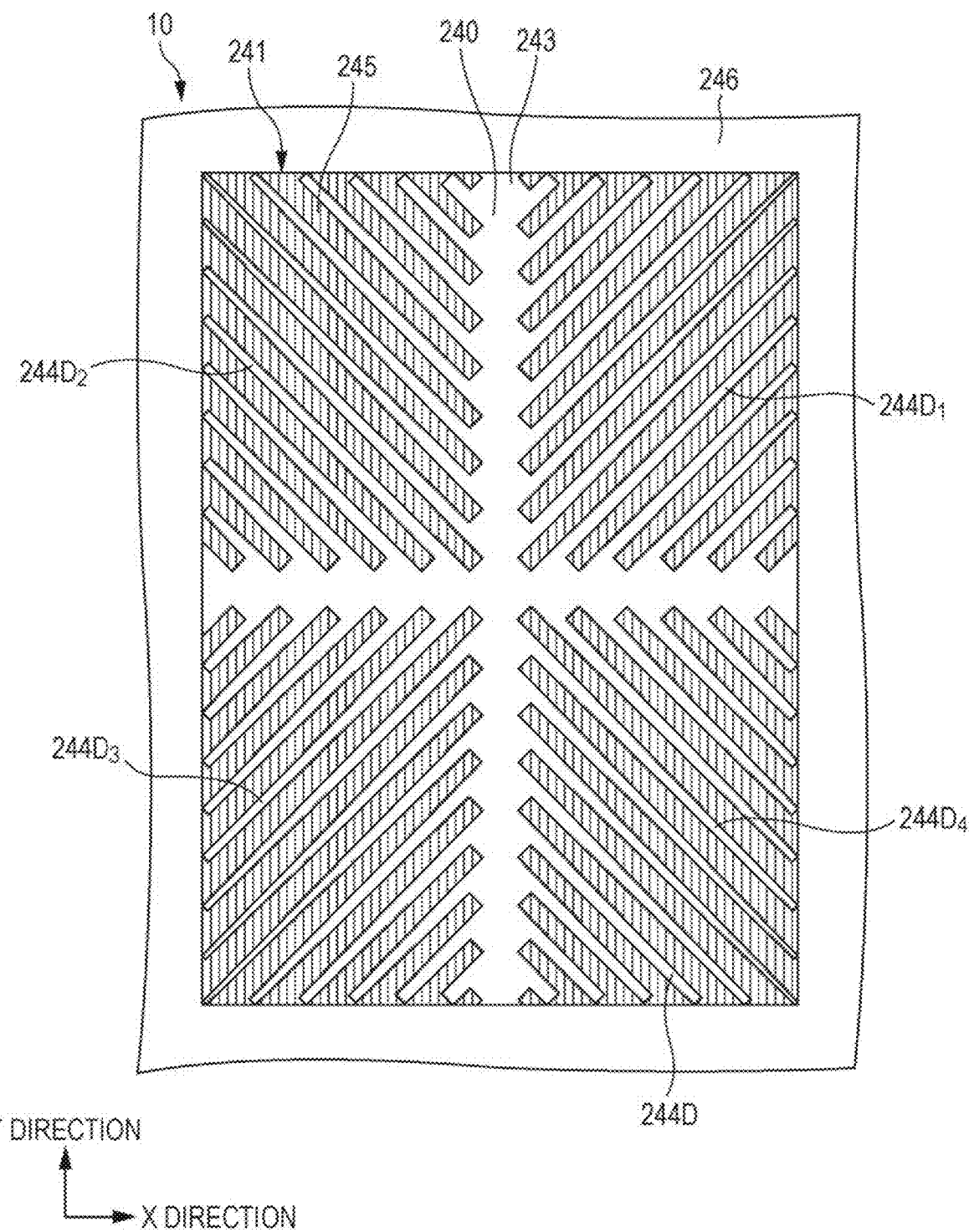
FIG. 23 is a plan view schematically illustrating a first electrode corresponding to one pixel that forms a modification example (see Example 4) of a liquid crystal display apparatus according to Example 8.
Figure 24:
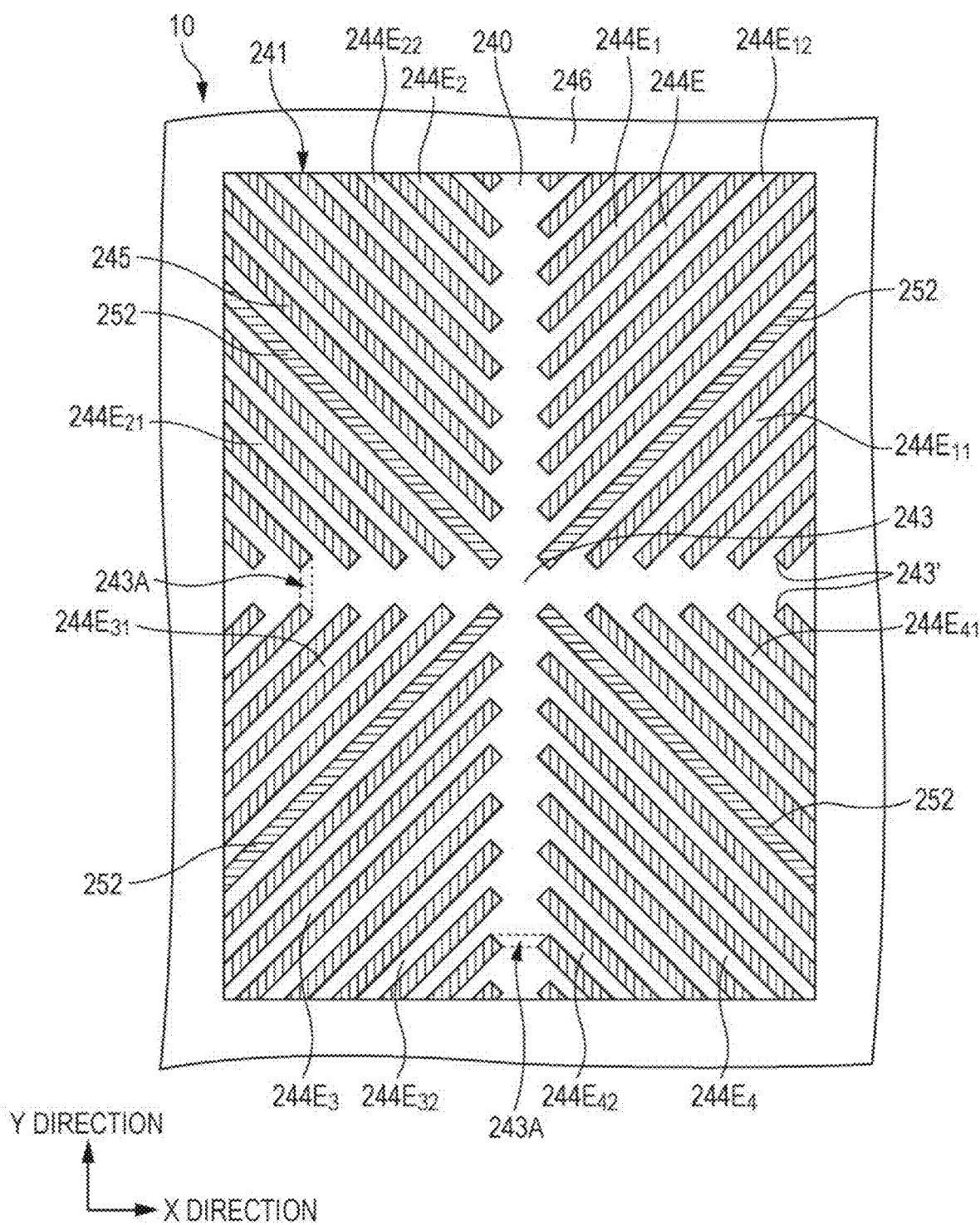
FIG. 24 is a plan view schematically illustrating a first electrode corresponding to one pixel that forms a modification example (see Example 5) of the liquid crystal display apparatus according to Example 8.
Figure 25:
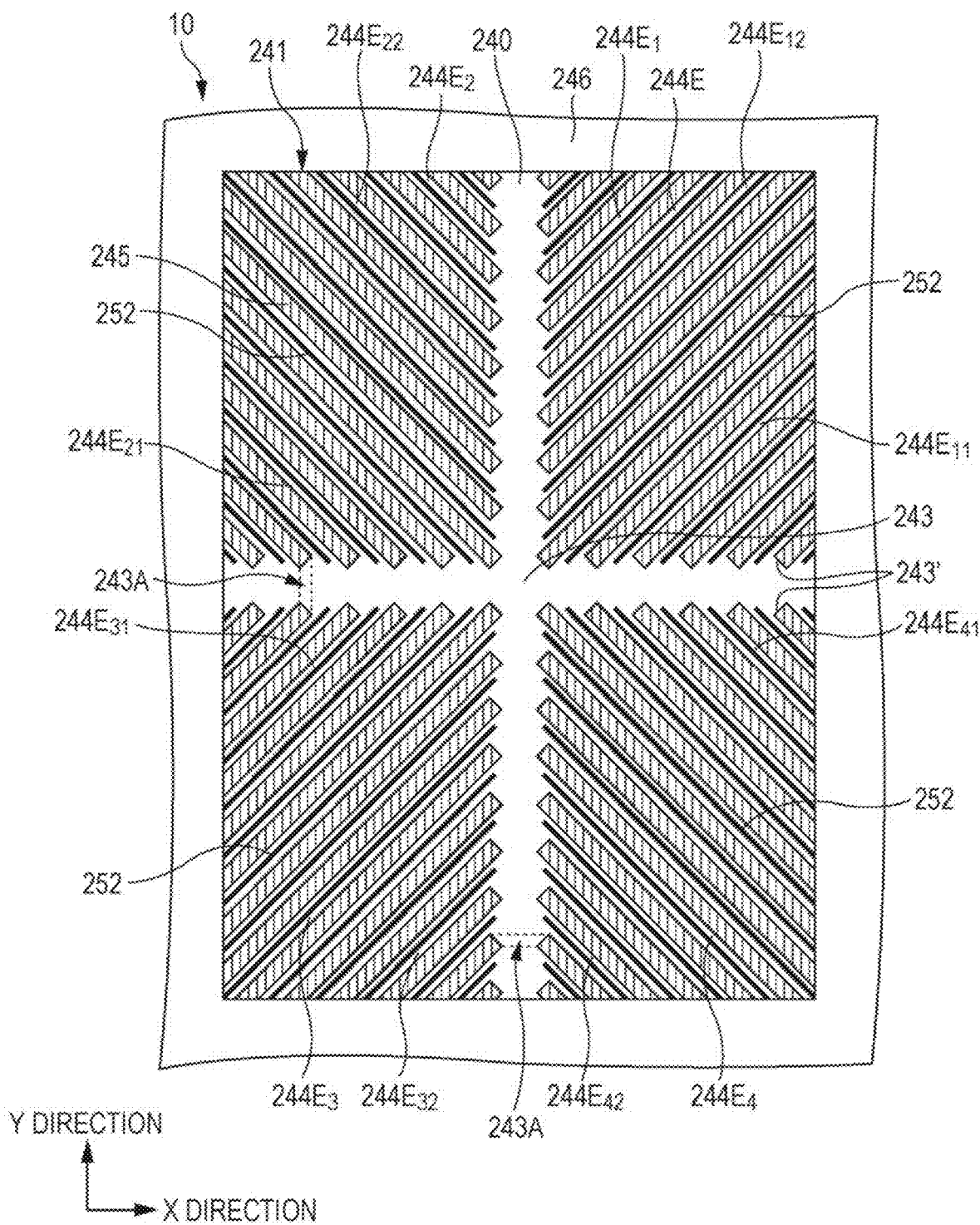
FIG. 25 is a plan view schematically illustrating a first electrode corresponding to one pixel that forms a modification example (see Example 5) of the liquid crystal display apparatus according to Example 8.
Figure 26:
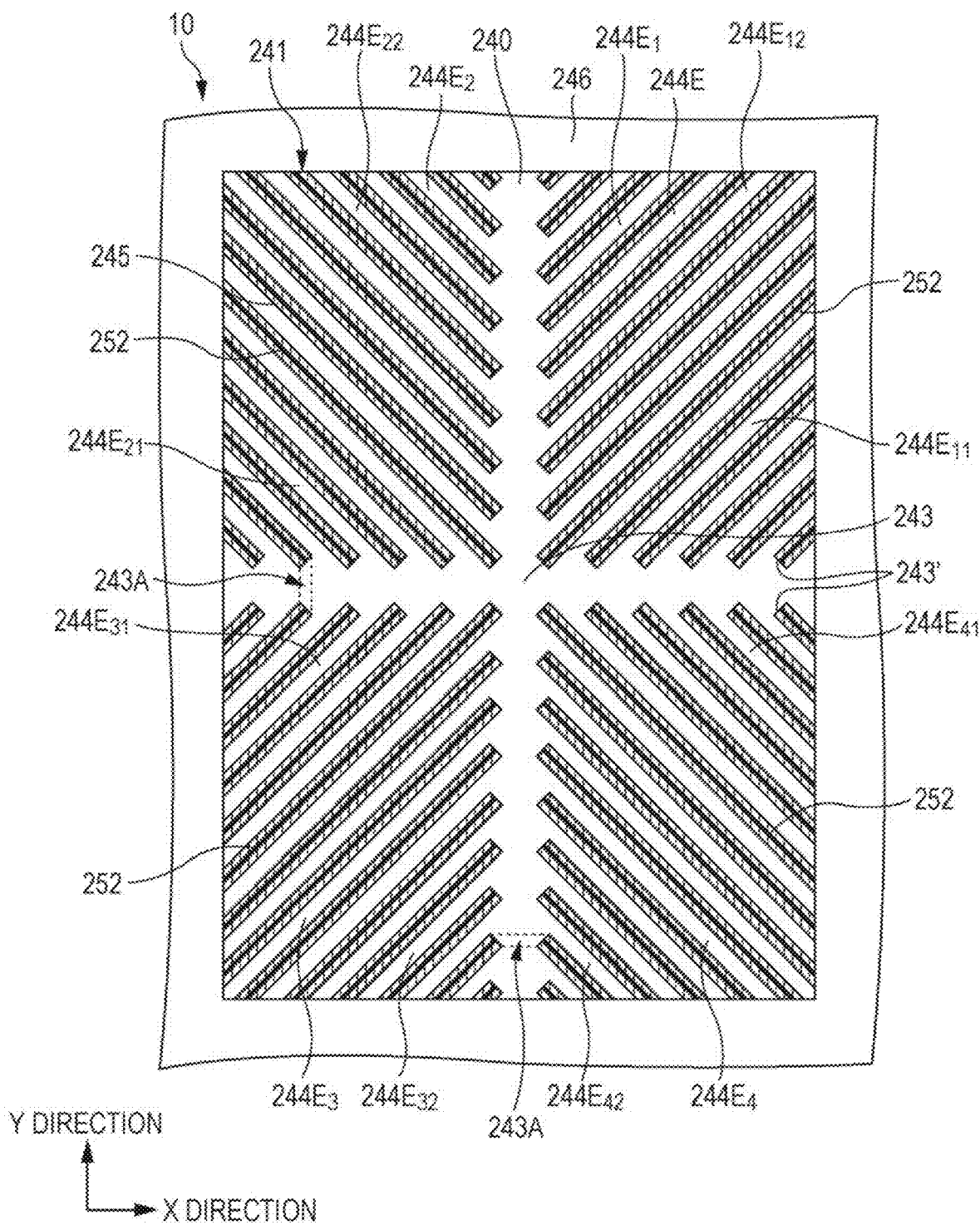
FIG. 26 is a plan view schematically illustrating a first electrode corresponding to one pixel that forms a modification example (see Example 5) of the liquid crystal display apparatus according to Example 8.
Figure 27:
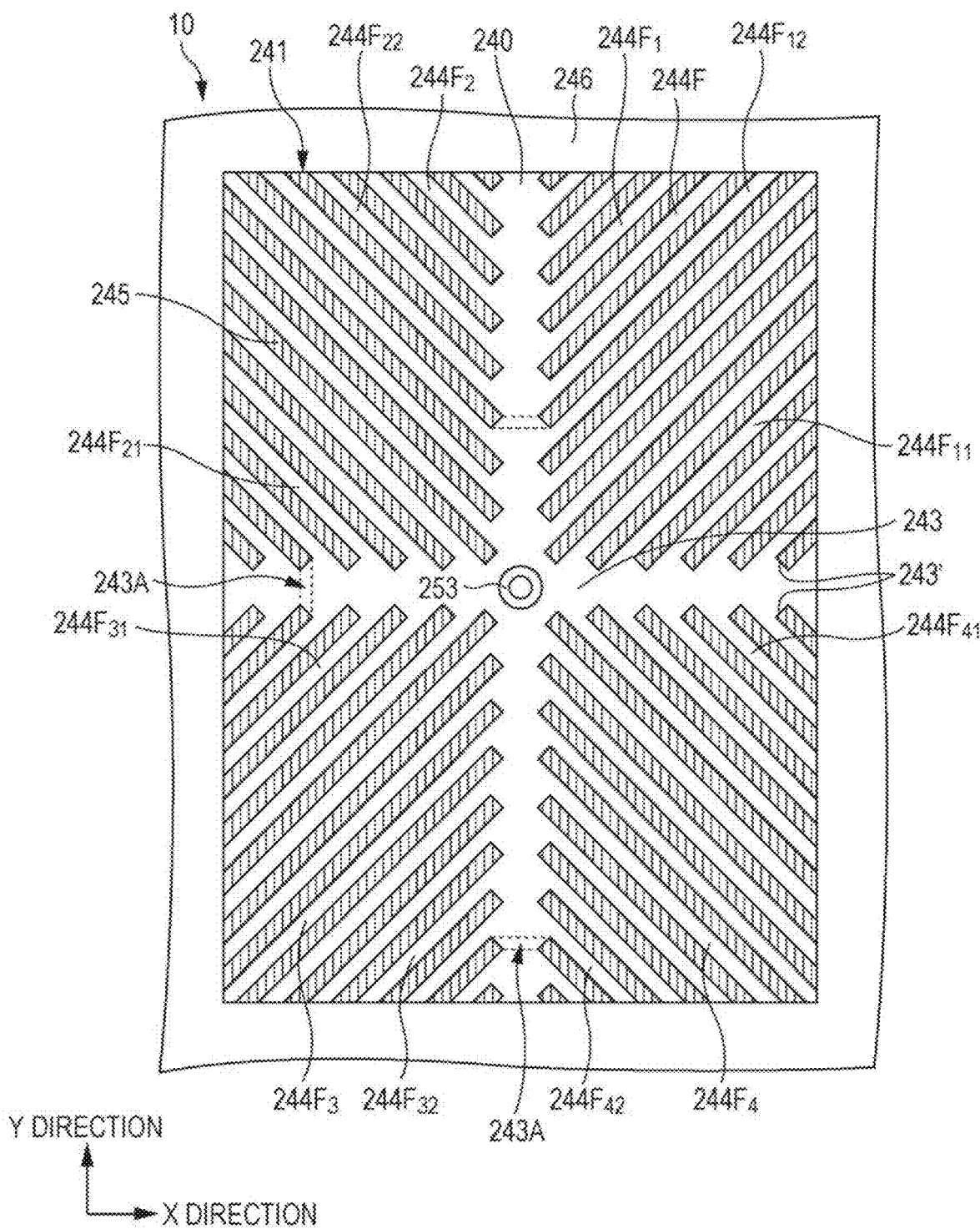
FIG. 27 is a plan view schematically illustrating a first electrode corresponding to one pixel that forms another modification example (see Example 6) of the liquid crystal display apparatus according to Example 8.

With respect to the liquid crystal display apparatus of Example 8, in a similar way to Example 4, the width of a branch convex portion 244D may be narrowed toward the periphery of the pixel 10 (see FIG. 23). Further, in a similar way to Example 5, a slit portion 252 may be formed in the first electrode (a liquid crystal display apparatus according to Embodiment 2-A of the present disclosure or a liquid crystal display apparatus according to Embodiment 3 of the present disclosure) (see FIGS. 24, 25 and 26). FIG. 24 is a plan view schematically illustrating a first electrode corresponding to one pixel that forms a modification example of the liquid crystal display apparatus according to Example 8, in which the slit portion 252 having the same configuration or structure as in FIGS. 10B and 10C is provided. Further, FIGS. 25 and 26 are plan views schematically illustrating a first electrode corresponding to one pixel that forms a modification example of the liquid crystal display apparatus according to Example 8, in which the slit portion 252 having the same configuration or structure as in FIGS. 14A and 15A is provided. Here, the slit portion 252 is formed so that a branch convex portion 244D is not separated from the other branch convex portions 244D due to the slit portion 252, or so that a concave portion 245 is not separated from the other concave portions 245 due to the slit portion 252, that is, so that all concave and convex portions are electrically connected to each other. In the example shown in FIGS. 25 and 26, the slit portion 252 is not provided in the stem convex portion 243. That is, in the stem convex portion, a notch is provided in the slit portion 252. Further, the slit portion may not be provided in the branch convex portions or the concave portions at the periphery of the pixel 10. Further, in a similar way to Example 6, a recess 253 may be provided in the first electrode in the central region of the pixel 10 (a liquid crystal display apparatus according to Embodiment 2-B of the present disclosure, a liquid crystal display apparatus according to Embodiment 3-B of the present disclosure or a liquid crystal display apparatus according to Embodiment 4 of the present disclosure) (see FIG. 27).

Figure 28:
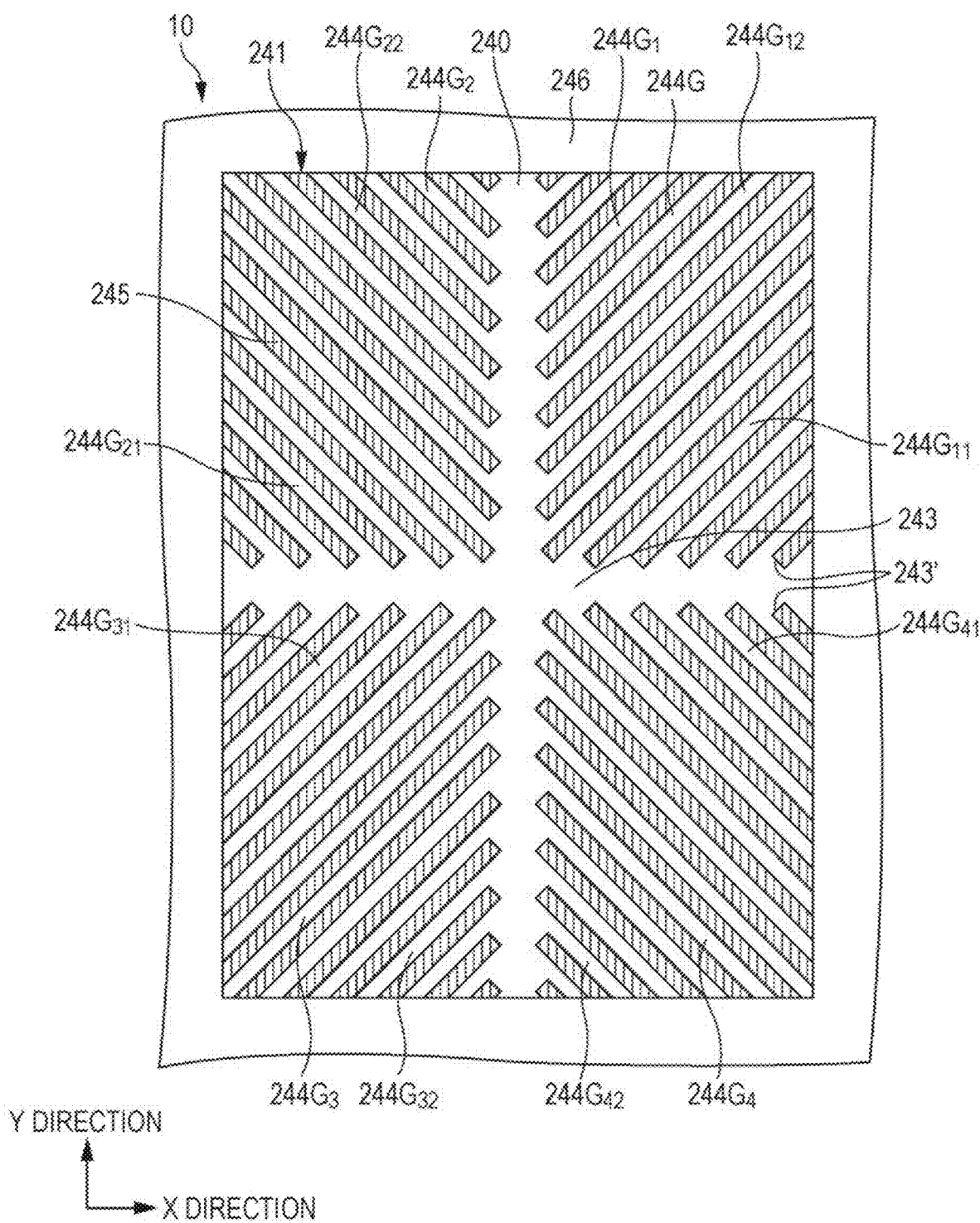
FIG. 28 is a plan view schematically illustrating a first electrode corresponding to one pixel that forms another modification example (see Example 7) of the liquid crystal display apparatus according to Example 8.

Further, in the liquid crystal display apparatus according to Example 8, as shown in FIG. 28 that is a plan view schematically illustrating a first electrode corresponding to one pixel, a configuration (a liquid crystal display apparatus according to Embodiment 2-C of the present disclosure, a liquid crystal display apparatus according to Embodiment 3-C of the present disclosure, a liquid crystal display apparatus according to Embodiment 4-C of the present disclosure or a liquid crystal display apparatus according to Embodiment 5 of the present disclosure) may be used when a formation pitch of the branch convex portions along the X axis is Px and a formation pitch of the branch convex portions along the Y axis is Py, the branch convex portions that extend from the stem convex portion on the X axis and occupy the first quadrant and the branch convex portions that extend from the stem convex portion on the X axis and occupy the fourth quadrant are formed in a state of deviating from each other (preferably, formed in a state of being deviated by (Px/2)); the branch convex portions that extend from the stem convex portion on the Y axis and occupy the first quadrant and the branch convex portions that extend from the stem convex portion on the Y axis and occupy the second quadrant are formed in a state of deviating from each other (preferably, formed in a state of being deviated by (Py/2)); the branch convex portions that extend from the stem convex portion on the X axis and occupy the second quadrant and the branch convex portions that extend from the stem convex portion on the X axis and occupy the third quadrant are formed in a state of deviating from each other (preferably, formed in a state of being deviated by (Px/2)); and the branch convex portions that extend from the stem convex portion on the Y axis and occupy the third quadrant and the branch convex portions that extend from the stem convex portion on the Y axis and occupy the fourth quadrant are formed in a state of deviating from each other (preferably, formed in a state of being deviated by (Py/2)). That is, the stem convex portion and the branch convex portion are not linearly symmetric with respect to the X axis and the Y axis, but are rotationally symmetric (point symmetric) with respect to the center of the pixel at 180 degrees.

Example 9

Figure 29:
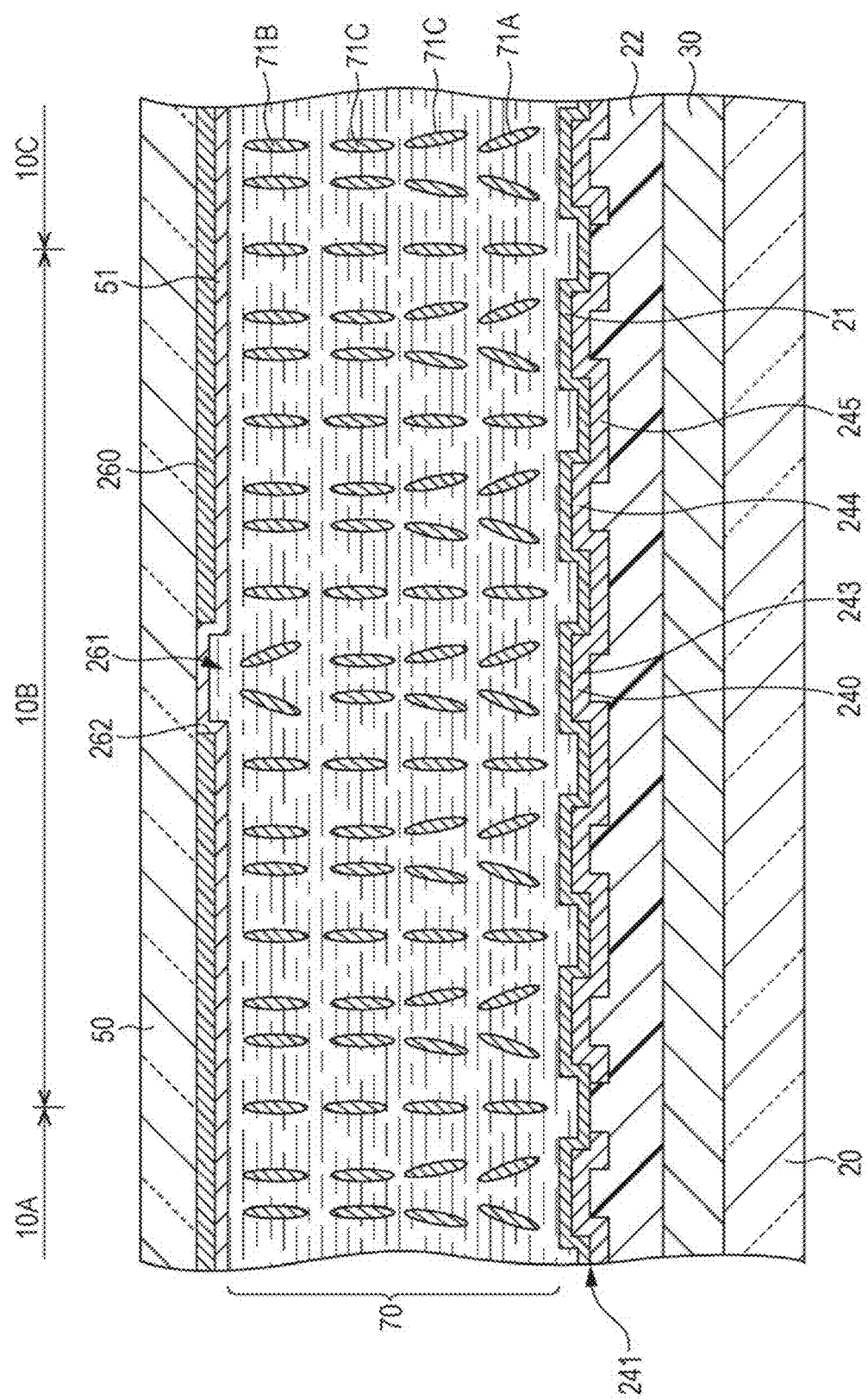
FIG. 29 is a local sectional view schematically illustrating a liquid crystal display apparatus according to Example 9.
Figure 30:
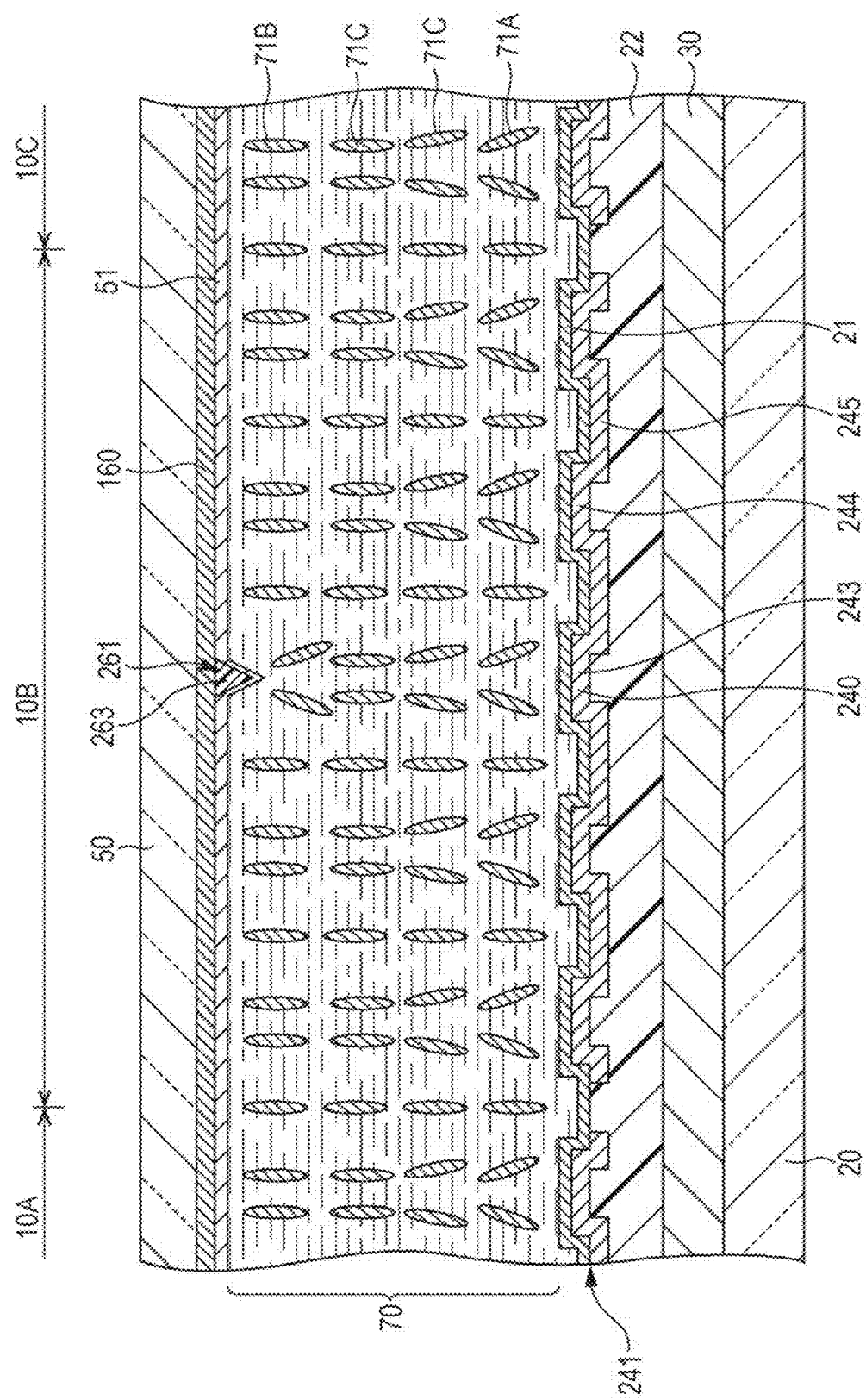
FIG. 30 is a local sectional view schematically illustrating a modification example of the liquid crystal display apparatus according to Example 9.
Figure 40B:
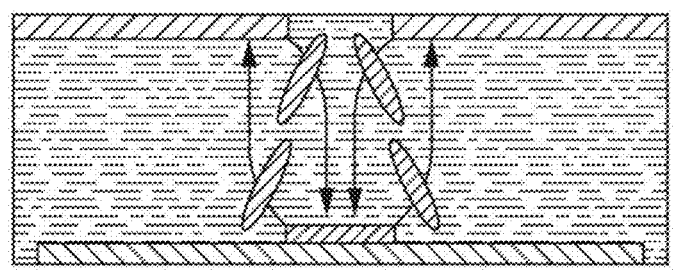
FIGS. 40B and 40C are conceptual diagrams illustrating an operation of liquid crystal molecules in the liquid crystal display apparatus according to Example 2.
Figure 40C:
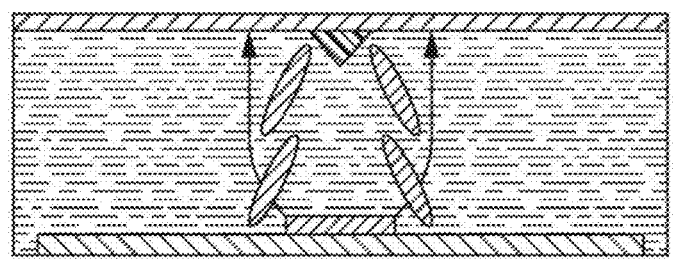

Example 9 is a modification of Example 8. FIGS. 29 and 30 are local sectional views schematically illustrating a liquid crystal display apparatus according to Example 9. Further, FIGS. 40B and 40C are conceptual diagrams illustrating an operation of liquid crystal molecules in the liquid crystal display apparatus according to Example 9. Here, in the liquid crystal display apparatus according to Example 9, an alignment regulating portion 261 is formed in a part of the second electrode 260 corresponding to the stem convex portion 243.

Here, the alignment regulating portion 261 is formed as a second electrode slit portion 262 of 4.0 μm provided in the second electrode 260 (see FIGS. 29 and 40B), or a second electrode protrusion (rib) 263 provided in the second electrode 260 (see FIGS. 30 and 40C). More specifically, the second electrode protrusion 263 is formed of a negative photoresist material, and has a width of 1.4 μm and a height of 1.2 μm. The planar shape of the second electrode slit portion 262 or the second electrode protrusion (rib) 263 is a cross shape, and the sectional shape of the second electrode protrusion 263 is an isosceles triangle. The second electrode 260 is not formed on the second electrode slit portion 262 or the second electrode protrusion (rib) 263.

In the liquid crystal display apparatus according to Example 9, since the alignment regulating portion 261 that includes the second electrode slit portion 262 is formed in the part of the second electrode 260 corresponding to the stem convex portion 243, an electric field generated by the second electrode 260 is distorted in the vicinity of the alignment regulating portion 261. Further, since the alignment regulating portion 261 that includes the second electrode protrusion (rib) 263 is formed, the direction where the liquid crystal molecules disposed in the vicinity of the second electrode protrusion 263 fall down is regulated. Consequently, it is possible to increase the alignment regulation force with respect to the liquid crystal molecules in the vicinity of the alignment regulating portion 261, and to reliably regulate the tilt state of the liquid crystal molecules in the vicinity of the alignment regulating portion 261. Thus, when an image is displayed, it is possible to reliably suppress the problem that dark lines are generated in a part of the image corresponding to the stem convex portion. That is, it is possible to provide a liquid crystal display apparatus capable of realizing uniform and high light transmittance while maintaining an excellent voltage response characteristic, to achieve reduction in cost of a light source that forms a backlight and low power consumption, and to achieve improvement in reliability of the TFT. Here, the alignment regulating portion 261 may be formed as a protrusion-shaped part of the second electrode 260.

The configuration or structure of the second electrode in Example 9 may be similarly applied to the liquid crystal display apparatus described in Example 1 to Example 7.

Example 10

Figure 31:
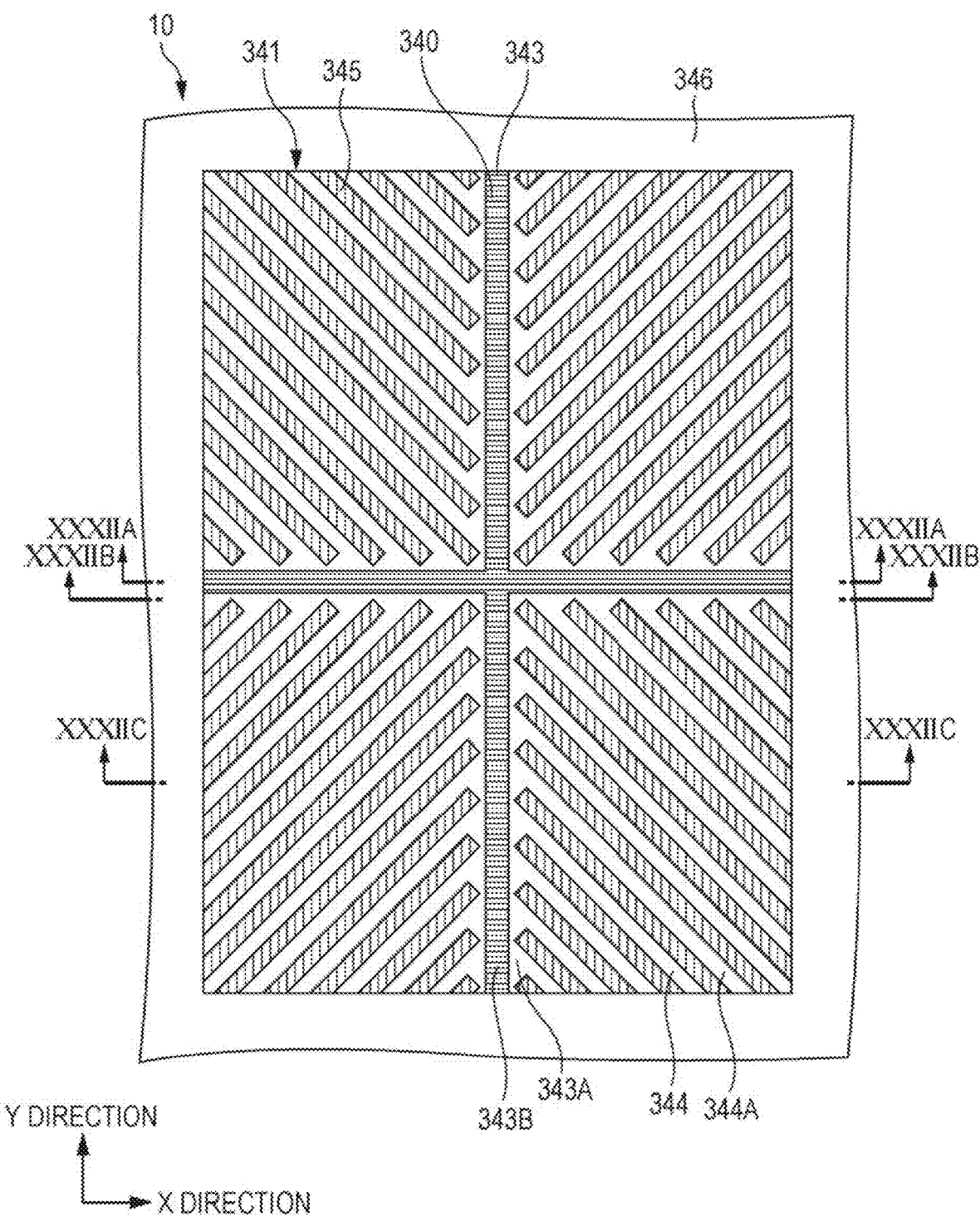
FIG. 31 is a plan view schematically illustrating a first electrode corresponding to one pixel that forms a liquid crystal display apparatus according to Example 10.
Figure 32A:
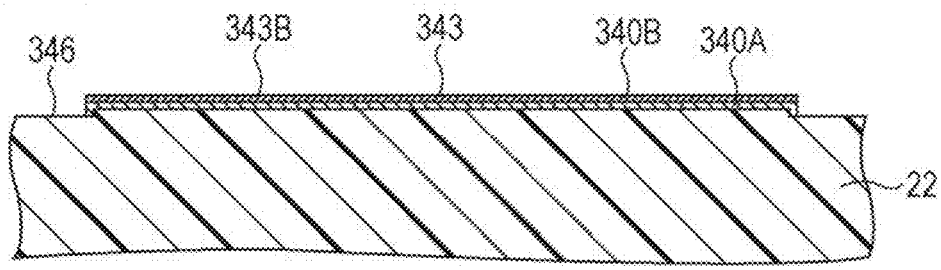
FIGS. 32A, 32B and 32C are local sectional views schematically illustrating the first electrode and the like taken along arrows XXXIIA-XXXIIA, XXXIIB-XXXIIB and XXXIIC-XXXIIC in FIG. 31 in the liquid crystal display apparatus according to Example 10.
Figure 32B:
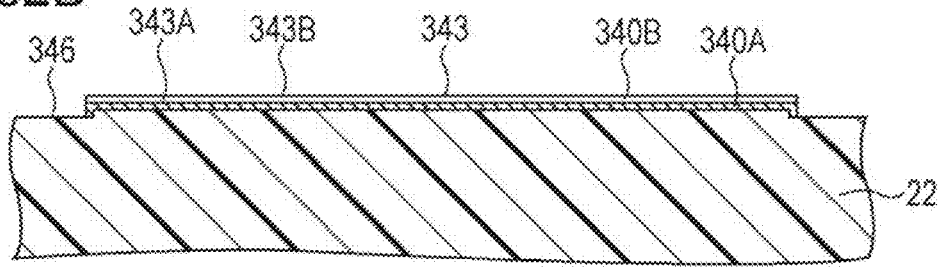
Figure 32C:
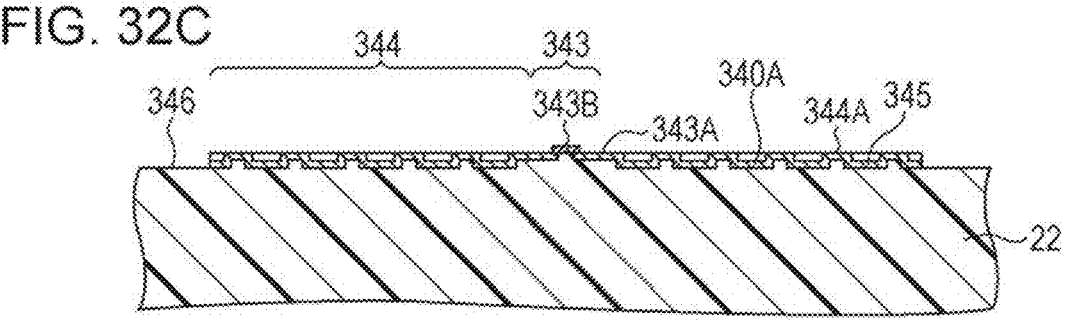
Figure 32D:
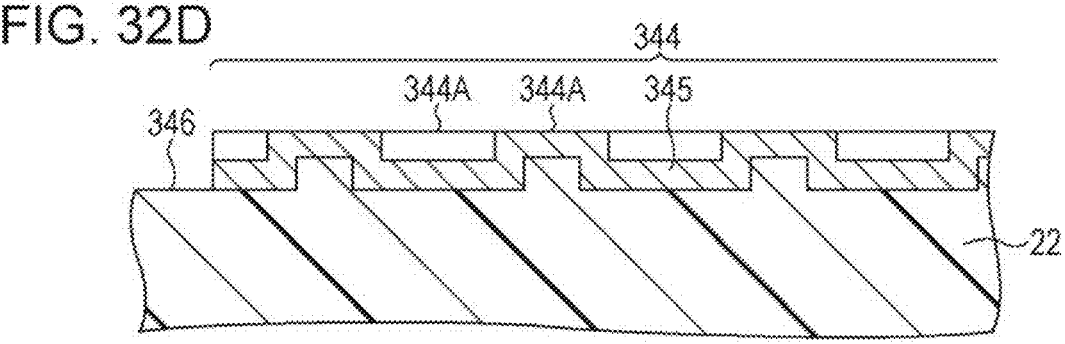
FIG. 32D is a local sectional view schematically illustrating an enlarged part of the first electrode in FIG. 32C.

Example 10 is another modification of Example 8. FIG. 31 is a plan view schematically illustrating a first electrode corresponding to one pixel that forms a liquid crystal display apparatus according to Example 10, FIGS. 32A to 32C are local sectional views schematically illustrating the first electrode and the like taken along arrows XXXIA-XXXIA, XXXIB-XXXIB and XXXIC-XXXIC in FIG. 31, and FIG. 32D is a local sectional view schematically illustrating an enlarged part of the first electrode in FIG. 32C. The local sectional views schematically illustrating the liquid crystal display apparatus of Example 10 are substantially the same as FIG. 1.

In FIGS. 31, 34, 35, 37 and 38, the width of the branch convex portion is uniformly shown, but the branch convex portion may be tapered in a similar way to the description of Example 4. That is, the width of the branch convex portions may be widest at a part of the branch convex portion that is joined to the stem convex portion and may be narrowed toward a tip part thereof from the part joined to the stem convex portion.

In the liquid crystal display apparatus of Example 10, a plurality of concave and convex portions 341 (a stem convex portion 343, branch convex portions 344 and concave portions 345) is formed in a first electrode 340, and a plurality of step portions is formed in the stem convex portion 343 provided in the first electrode 340. Further, the concave and convex portions 341 include the stem convex portion (main convex portion) 343 that passes through the center of the pixel and extends in a cross shape, and the plurality of branch convex portions (sub convex portions) 344 that extends toward the periphery of the pixel from the stem convex portion 343.

Here, the cross-sectional shape of the stem convex portion 343 when the stem convex portion 343 is cut on a virtual vertical plane orthogonal to the extension direction of the stem convex portion 343 is a cross-sectional shape that the step portions go down from the center of the cross-sectional shape of the stem convex portion 343 toward edges of the cross-sectional shape of the stem convex portion 343. Specifically, the top face of the stem convex portion 343 includes a top face 343B disposed at a central part of the stem convex portion 343 and top faces 343A disposed on both sides of the top face 343B. Since two step portions exist in the stem convex portion 343 in this way, the step portions become high in the order of the top faces 343A and the top face 343B with reference to the concave portion 345. The top face of the branch convex portion 344 is represented as reference numeral 344A, in which the top face 343A of the stem convex portion 343 and the top face 344A of the branch convex portion 344 are at the same level. In the figures, hatched lines that extend in the transverse direction are given to the top face 343B of the stem convex portion 343, and hatched lines that extend in the longitudinal direction are given to the concave portion 345.

The step portions in the stem convex portion or the branch convex portions (to be described later) may be obtained, for example, by (a) forming a resist material layer on a planarizing layer (or a color filter layer) that is a base (the planarizing layer and the color filter layer are generally referred to as a "planarizing layer or the like"), (b) forming concave and convex portions in the resist material layer through exposure and development, (c) forming concave and convex portions on the planarizing layer or the like through etching of the resist material layer, and the planarizing layer or the like, and (d) forming and patterning a transparent conductive material layer on the planarizing layer or the like.

Further, the step portions in the stem convex portion or the branch convex portions (to be described later) may be obtained, for example, by (a) forming a resist material layer on a base layer formed on a planarizing layer or the like, (b) forming concave and convex portions in the resist material layer through exposure and development, (c) forming concave and convex portions on the base layer through etching of the resist material layer, and the planarizing layer or the like, and (d) forming and patterning a transparent conductive material layer on the base layer.

Further, the step portions in the stem convex portion or the branch convex portions (to be described later) may be obtained, for example, by (a) forming an insulating material layer patterned on a planarizing layer or the like that is a base, and (b) forming and patterning a transparent conductive material layer on the planarizing layer or the like and the insulating material layer.

Further, the step portions in the stem convex portion or the branch convex portions (to be described later) may be obtained, for example, by (a) forming a transparent conductive material layer on a planarizing layer or the like that is a base, (b) forming a resist material layer on the transparent conductive material layer, (c) forming concave and convex portions in the resist material layer through exposure and development, and (d) etching the resist material layer, and the transparent conductive material layer.

Further, the step portions in the stem convex portion or the branch convex portions (to be described later) may be obtained, for example, by (a) forming and patterning a first transparent conductive material layer (see reference numeral 340A in FIGS. 32A and 32B) on a planarizing layer or the like that is a base, and (b) forming and patterning a second transparent conductive material layer (see reference numeral 340B in FIGS. 32A and 32B) having an etching selectivity ratio to the first transparent conductive material layer on the first transparent conductive material layer.

Further, the step portion in the stem convex portion or the branch convex portions (to be described later) may be obtained, for example, by forming convex portions in a planarizing layer by the influence of the thicknesses of components (for example, various signal lines, an auxiliary capacitance electrode, a gate electrode, a source/drain electrode, and various interconnections) of the liquid crystal display apparatus formed on or above the first substrate by optimizing the thickness of the planarizing layer.

The above description relating to the stem convex portion or the branch convex portions may be applied to Examples 8 and 9. Further, except for the above description, the configuration or structure of the liquid crystal display apparatus of Example 10 is the same as the configuration or structure of the liquid crystal display apparatus of Example 1.

Figure 33A:
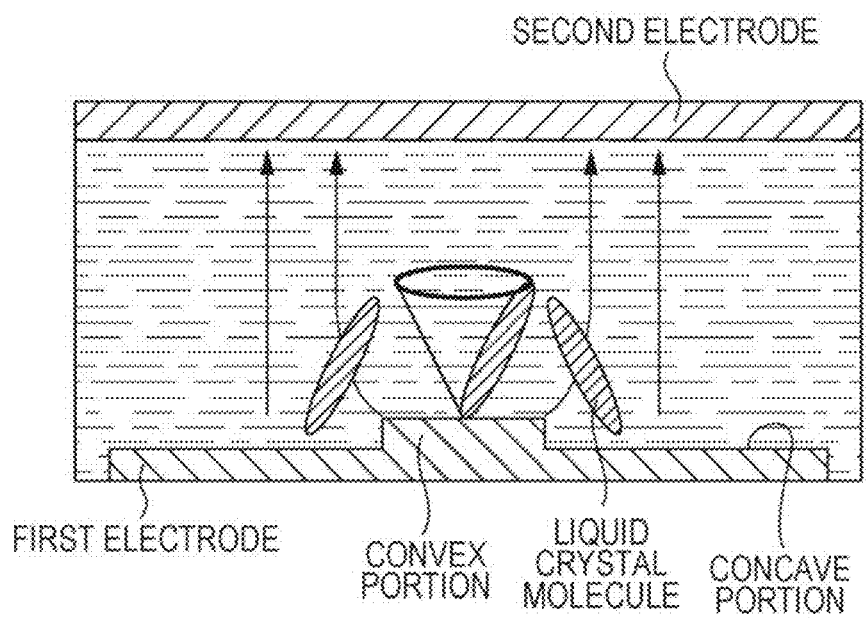
FIGS. 33A and 33B are conceptual diagrams illustrating a liquid crystal display apparatus in the related art and an operation of liquid crystal molecules in the liquid crystal display apparatus according to Example 10, respectively.
Figure 33B:
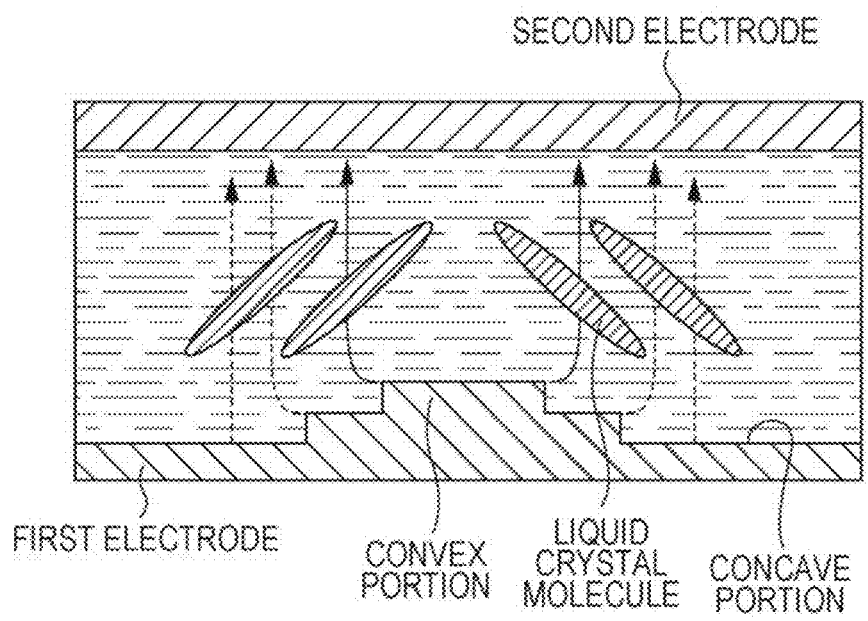

In the related art liquid crystal display apparatus, a step portion is not formed in the stem convex portion. As shown in a conceptual diagram of FIG. 33A illustrating an operation of the liquid crystal molecules, there is a case where the alignment regulation force with respect to the liquid crystal molecules at the central part of the stem convex portion is weak and the tilt state of the liquid crystal molecules at the central part of the stem convex portion is not determined. On the other hand, in Example 10, since the plurality of step portions is formed in the stem convex portion 343 as described above, that is, since the plurality of top faces 343A and 343B is formed in the stem convex portion 343, the electric field is highest at the central part of the stem convex portion 343, and is decreased toward the edges of the stem convex portion 343. As shown in the conceptual diagram of FIG. 33B illustrating an operation of the liquid crystal molecules, it is possible to strengthen the alignment regulation force with respect to the liquid crystal molecules at the central part of the stem convex portion 343, and to reliably regulate the tilt state of the liquid crystal molecules at the central part of the stem convex portion 343. Thus, when an image is displayed, it is possible to reliably suppress the problem that dark lines are generated in a part of the image corresponding to the central part of the stem convex portion 343. That is, it is possible to provide a liquid crystal display apparatus capable of realizing uniform and high light transmittance while maintaining an excellent voltage response characteristic, to achieve reduction in cost of a light source that forms a backlight and low power consumption, and to achieve improvement in reliability of the TFT.

Example 11

Figure 34:
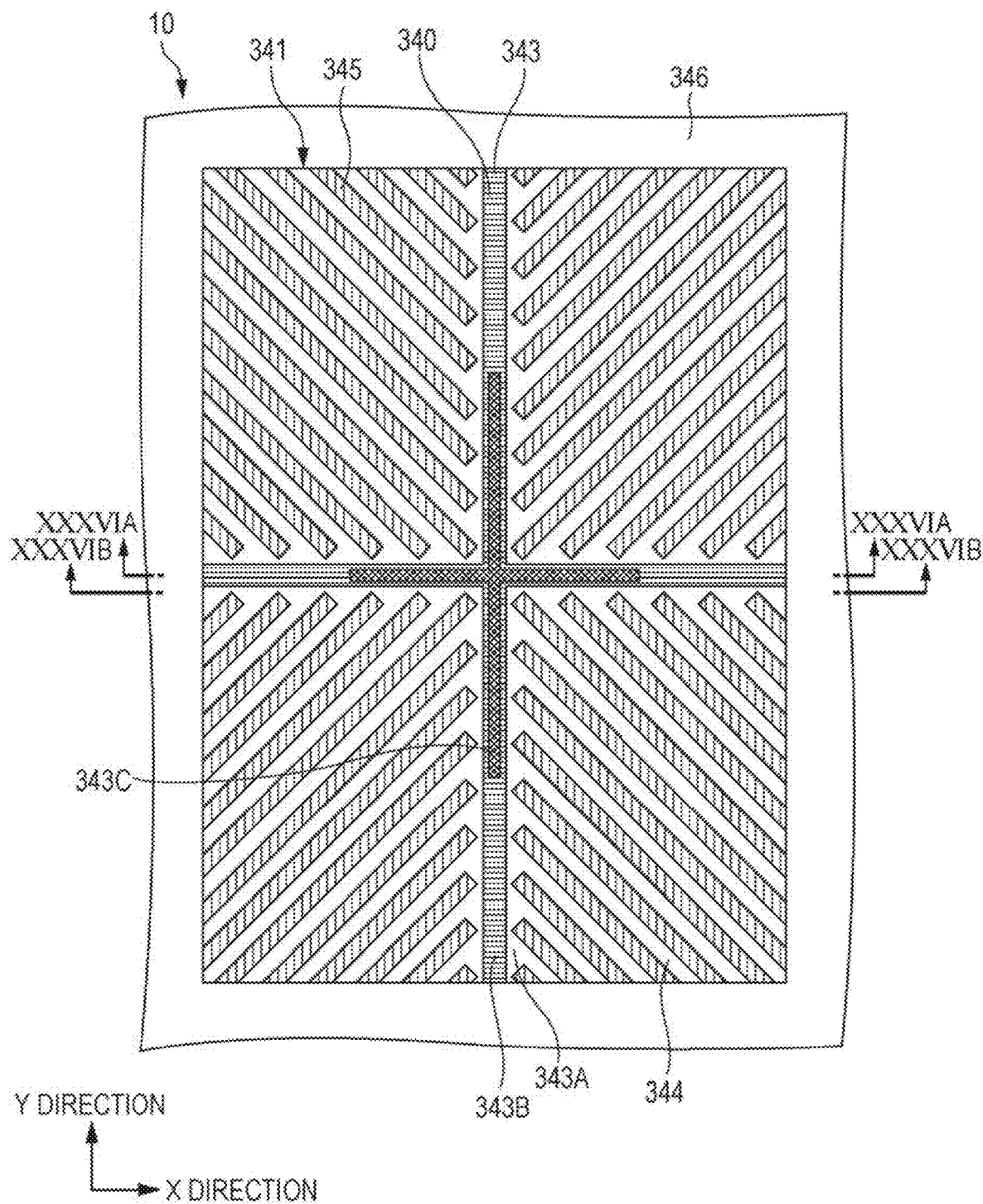
FIG. 34 is a plan view schematically illustrating a first electrode corresponding to one pixel that forms a liquid crystal display apparatus according to Example 11.
Figure 36A:
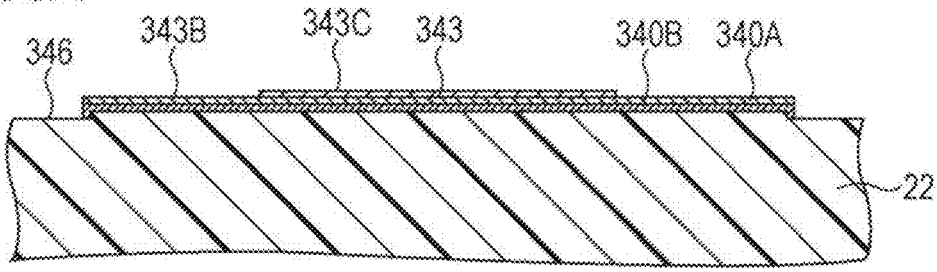
FIGS. 36A and 36B are local sectional views schematically illustrating the first electrode and the like taken along arrows XXXVIA-XXXVIA and XXXVIB-XXXVIB in FIG. 34 in the liquid crystal display apparatus according to Example 11.
Figure 36B:
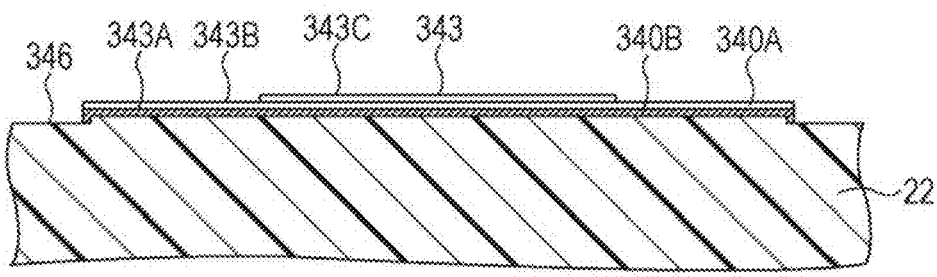

Example 11 is a modification of Example 10. FIG. 34 is a plan view schematically illustrating a first electrode corresponding to one pixel that forms a liquid crystal display apparatus according to Example 11, and FIGS. 36A and 36B are local sectional views schematically illustrating the first electrode and the like taken along arrows XXXVIA-XXXVIA and XXXVIB-XXXVIB in FIG. 34.

In Example 11, the top face of the stem convex portion 343 includes a top face 343C disposed at the central part of the stem convex portion 343, top faces 343B disposed on both sides of the top face 343C, and top faces 343A disposed outside the top face 343B. Since three step portions exist in the stem convex portion 343 in this way, the step portions become high in the order of the top faces 343A, the top faces 343B and the top face 343C with reference to the concave portion 345. Further, the cross-sectional shape of the stem convex portion 343 when the stem convex portion 343 is cut on a virtual vertical plane that is parallel to the extension direction of the stem convex portion 343 is a cross-sectional shape (top faces 343B and top faces 343A) that the step portions go down from the central part (top face 343C) of the cross-sectional shape of the stem convex portion 343 toward end parts of the cross-sectional shape of the stem convex portion 343. In the figure, cross-hatched lines are given to the top face 343C.

Except for the above description, since the configuration or structure of the liquid crystal display apparatus of Example 11 is the same as the configuration or structure of the liquid crystal display apparatus of Example 10, detailed description thereof is not shown.

Example 12

Figure 35:
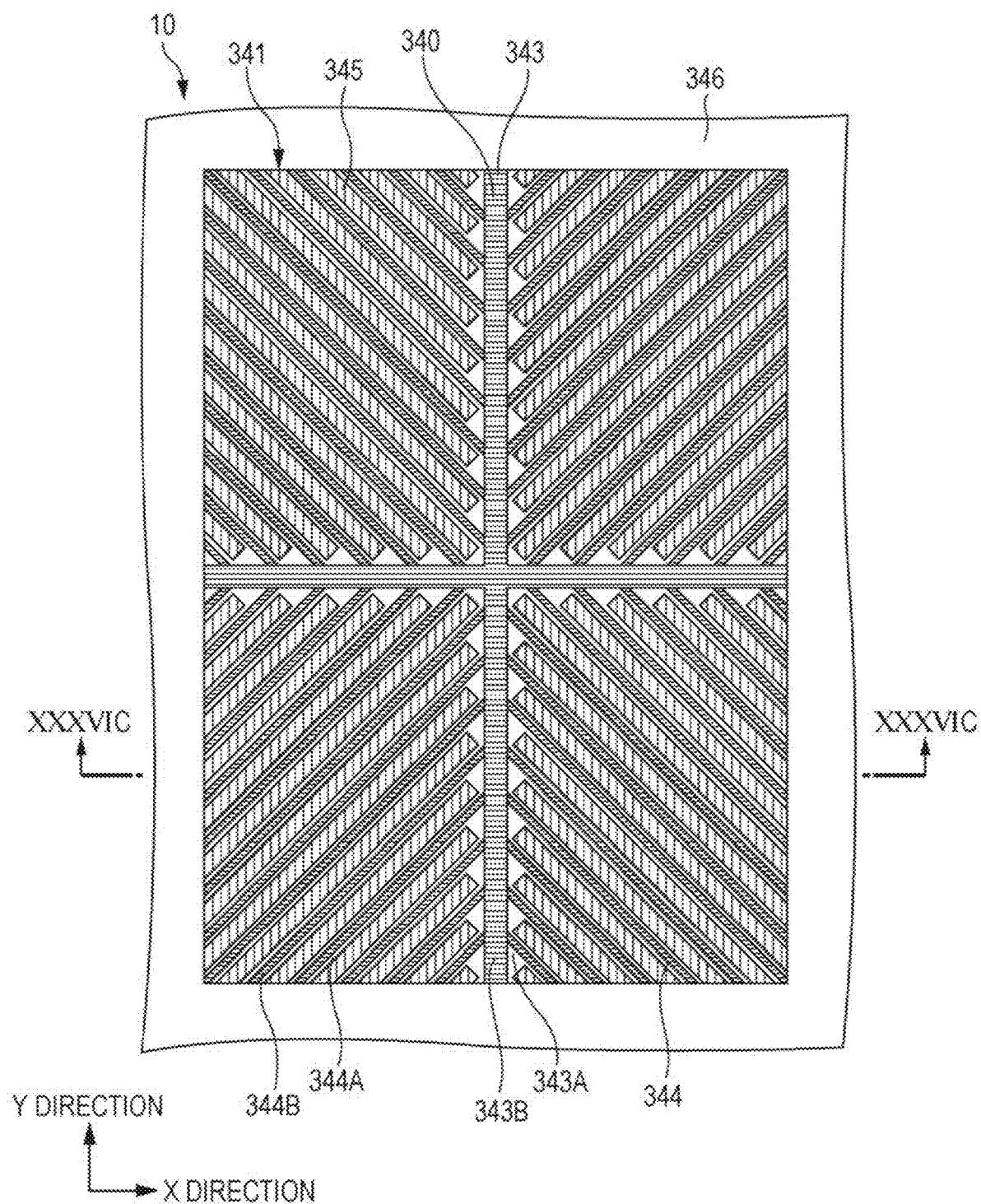
FIG. 35 is a plan view schematically illustrating a first electrode corresponding to one pixel that forms a liquid crystal display apparatus according to Example 12.
Figure 36C:
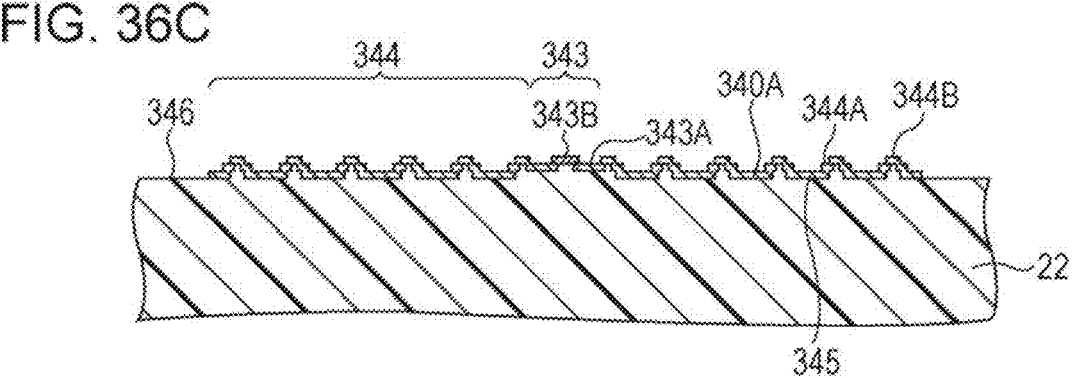
FIG. 36C is a local sectional view schematically illustrating the first electrode and the like taken along arrows XXXVIC-XXXVIC in FIG. 35 in a liquid crystal display apparatus according to Example 12.
Figure 36D:
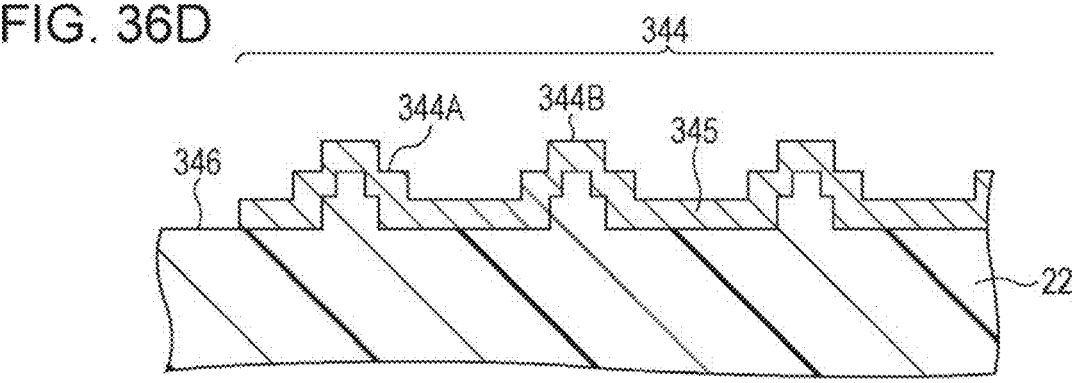
FIG. 36D is a local sectional view schematically illustrating an enlarged part of the first electrode in FIG. 36C.

Example 12 is another modification of Example 10. FIG. 35 is a plan view schematically illustrating a first electrode corresponding to one pixel that forms a liquid crystal display apparatus according to Example 12, and FIG. 36C is a local sectional view schematically illustrating the first electrode and the like taken along arrows XXXVIC-XXXVIC in FIG. 35, and FIG. 36D is a local sectional view schematically illustrating an enlarged part of the first electrode in FIG. 36C.

In Example 12, the cross-sectional shape of the branch convex portion 344 when the branch convex portion 344 is cut on a virtual vertical plane orthogonal to the extension direction of the branch convex portion 344 is a cross-sectional shape that the step portions go down from the center of the cross-sectional shape of the branch convex portion 344 toward edges of the cross-sectional shape of the branch convex portion 344. Specifically, the top face of branch convex portion 344 includes a top face 344B that extends from the stem convex portion 343 and top faces 344A disposed on both sides of the top face 344B. Since two step portions exist in the branch convex portion 344 in this way, the step portions become high in the order of the top faces 344A and the top face 344B with reference to the concave portion 345. In the figure, hatched lines that extend in the transverse direction are given to the top face 344B. Further, in FIGS. 35 and 37, boundaries of the stem convex portion and the branch convex portions are shown by solid lines. The height difference between the top face 344B and top faces 344A of the branch convex portion 344 is 0.20 µm on average. The top face 343B of the stem convex portion 343 and the top face 344B of the branch convex portion 344 are at the same level.

Except for the above description, since the configuration or structure of the liquid crystal display apparatus of Example 12 is the same as the configuration or structure of the liquid crystal display apparatus of Example 10, detailed description thereof is not shown.

Figure 37:
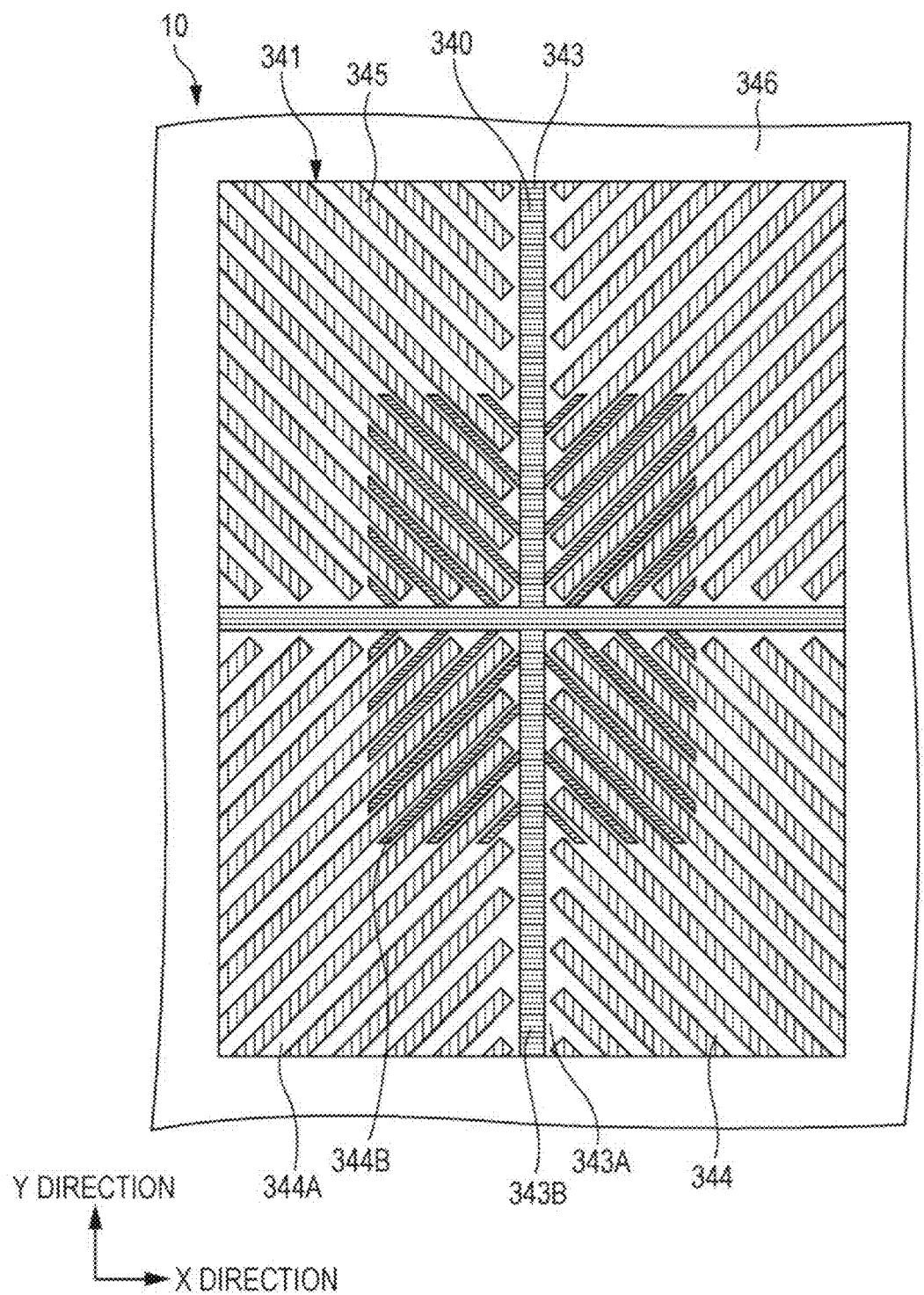
FIG. 37 is a plan view schematically illustrating a modification example of the first electrode corresponding to one pixel that forms the liquid crystal display apparatus according to Example 12.
Figure 38:
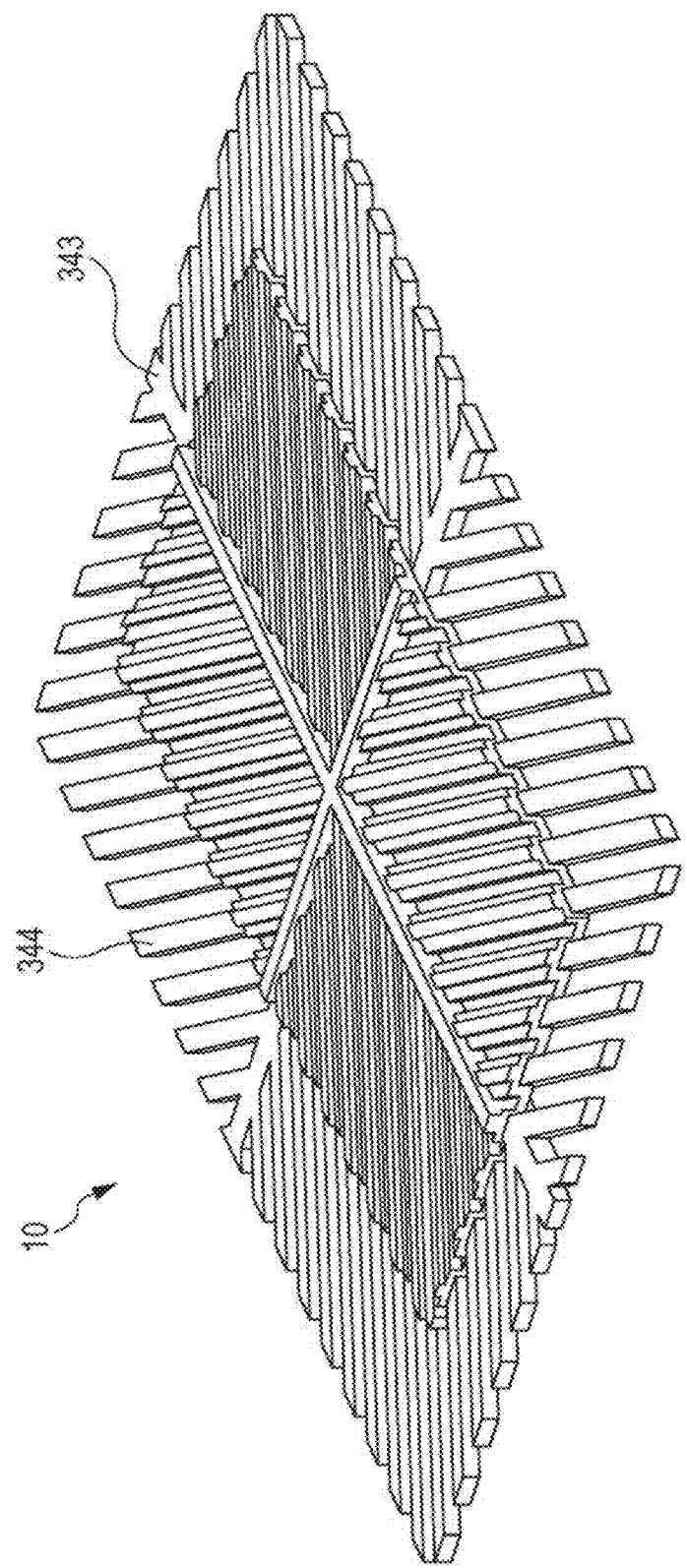
FIG. 38 is a plan view schematically illustrating another modification example of the first electrode corresponding to one pixel that forms the liquid crystal display apparatus according to Example 12.

Here, as shown in FIG. 37 that is a plan view schematically illustrating a first electrode corresponding to one pixel that forms a liquid crystal display apparatus, the cross-sectional shape of the branch convex portion 344 when the branch convex portion 344 is cut on a virtual vertical plane that is parallel to the extension direction of the branch convex portion 344 may be a cross-sectional shape that the step portions go down from the stem convex portion side of the cross-sectional shape of the branch convex portion 344 toward an end part of the cross-sectional shape of the branch convex portion 344. Further, as shown in FIG. 38 that is a perspective view schematically illustrating a first electrode corresponding to one pixel that forms a liquid crystal display apparatus, the above configuration or structure of the branch convex portion 344 may be combined with the stem convex portion 343 described in Example 11. Further, the configuration or structure of the branch convex portion may also be applied to the convex portion in the liquid crystal display apparatus described in Examples 1 to 7.

Example 13

Figure 39:
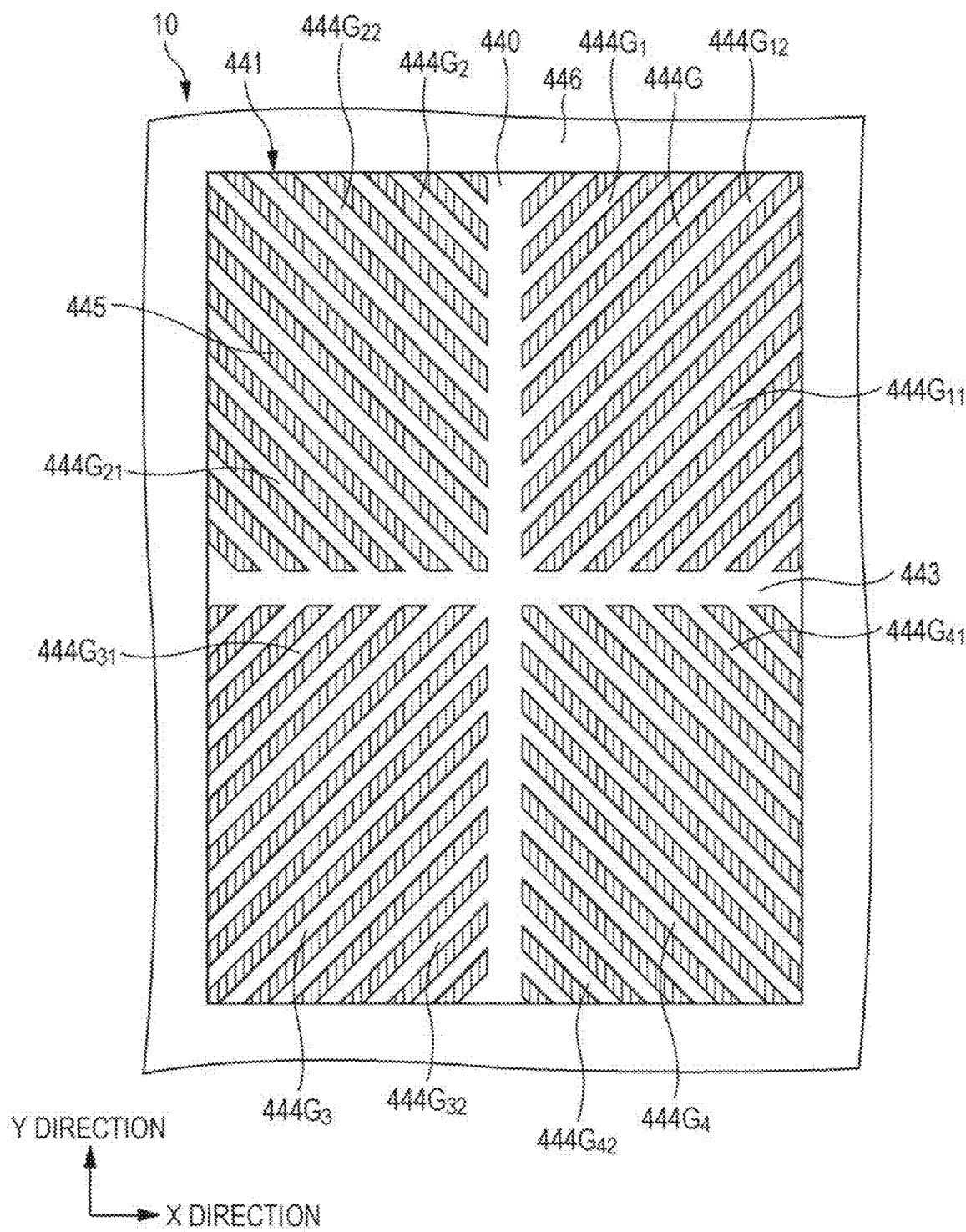
FIG. 39 is a plan view schematically illustrating a first electrode corresponding to one pixel that forms a liquid crystal display apparatus according to Example 13.

Example 13 relates to a liquid crystal display apparatus according to Embodiment 5 of the present disclosure. FIG. 39 is a plan view schematically illustrating a first electrode corresponding to one pixel that forms the liquid crystal display apparatus according to Example 13. In the liquid crystal display apparatus of Example 13, assuming that the X axis and the Y axis pass through the center of a pixel, and specifically, assuming that an (X, Y) coordinate system is formed by the X axis and the Y axis that are straight lines that pass through the center of the pixel 10 and are parallel to edge portions of the pixel, a plurality of concave and convex portions includes a stem convex portion 443 that extends on the X axis and the Y axis, and a plurality of branch convex portions 444G that extends from a side edge of the stem convex portion 443 toward the periphery of the pixel. Here, a plurality of branch convex portions 444G1 that occupies a first quadrant extends in parallel in a direction where a value on the Y coordinate increases as a value on the X coordinate increases, a plurality of branch convex portions 444G2 that occupies a second quadrant extends in parallel in a direction where a value on the Y coordinate increases as a value on the X coordinate decreases, a plurality of branch convex portions 444G3 that occupies a third quadrant extends in parallel in a direction where a value on the Y coordinate decreases as a value on the X coordinate decreases, and a plurality of branch convex portions 444G4 that occupies a fourth quadrant extends in parallel in a direction where a value on the Y coordinate decreases as a value on the X coordinate increases. Further, branch convex portions 444G11 that extend from the stem convex portion 443 on the X axis and occupy the first quadrant and branch convex portions 444G41 that extend from the stem convex portion 443 on the X axis and occupy the fourth quadrant are formed in a state of deviating from each other (preferably, formed in a state of deviating from each other by (Px/2)); branch convex portions 444G12 that extend from the stem convex portion 443 on the Y axis and occupy the first quadrant and branch convex portions 444G22 that extend from the stem convex portion 443 on the Y axis and occupy the second quadrant are formed in a state of deviating from each other (preferably, formed in a state of deviating from each other by (Py/2)); branch convex portions 444G21 that extend from the stem convex portion 443 on the X axis and occupy the second quadrant and branch convex portions 444G31 that extend from the stem convex portion 443 on the X axis and occupy the third quadrant are formed in a state of deviating from each other (preferably, formed in a state of deviating from each other by (Px/2)); and branch convex portions 444G32 that extend from the stem convex portion 443 on the Y axis and occupy the third quadrant and branch convex portions 444G42 that extend from the stem convex portion 443 on the Y axis and occupy the fourth quadrant are formed in a state of deviating from each other (preferably, formed in a state of deviating from each other by (Py/2)). Here, Px represents a formation pitch of the branch convex portions along the X axis, and Py represents a formation pitch of the branch convex portions along the Y axis. That is, the stem convex portion 443 and the branch convex portions 444G are not linearly symmetric with respect to the X axis and the Y axis, but are rotationally symmetric (point symmetric) with respect to the center of the pixel at 180 degrees.

In the liquid crystal display apparatus of Example 13, when the formation pitch of the branch convex portions 444G along the X axis is Px and the formation pitch of the branch convex portions 444G along the Y axis is Py (=Px), the width of the branch convex portion 444G is (Py/2=Px/2), and the width of the concave portion 445 is (Py/2=Px/2).

Except for the above description, since the liquid crystal display apparatus of Example 13 has the same configuration or structure as in the liquid crystal display apparatus described in Example 1, detailed description thereof is not shown.

Hereinbefore, the present disclosure is described on the basis of preferable examples, but the present disclosure is not limited to these examples, and various modifications may be made. The planar shape of the convex portions or the branch convex portions is not limited to the "V" shape in these examples, and various patterns such as a stripe or a ladder-type, in which the convex portions or the branch convex portions extend in a plurality of directions may be employed. When the convex portions or the branch convex portions are generally viewed, the planar shape of the end parts of the convex portions or the branch convex portions may be a linear shape or a stepwise shape. Further, the planar shape of the end part of each convex portion or each branch convex portion may be a straight line, a combination of segments, or a curved line such as an arc.

The liquid crystal display apparatus (liquid crystal display device) of the VA mode is described in the examples, but the present disclosure is not limited thereto, and may be applied to a different display mode such as an ECB mode (positive liquid crystal mode in horizontal alignment without twist), an in-plane switching (IPS) mode, a fringe field switching (FFS) mode or an optically compensated bend (OCB) mode. In these cases, it is possible to achieve the same effects. Here, in the present disclosure, compared with a case where the pre-tilt process is not performed, it is possible to achieve an improvement effect of a specifically high response characteristic in the VA mode, compared with the IPS mode or the FFS mode. Further, in the examples, an exclusively transmissive liquid crystal display apparatus (liquid crystal display device) is described, but the present disclosure is not limited to the transmissive type, and for example, a reflective type may be used. In the case of the reflective type, a pixel electrode is formed of an electrode material having light reflectivity, such as aluminum or the like.

Figure 46:
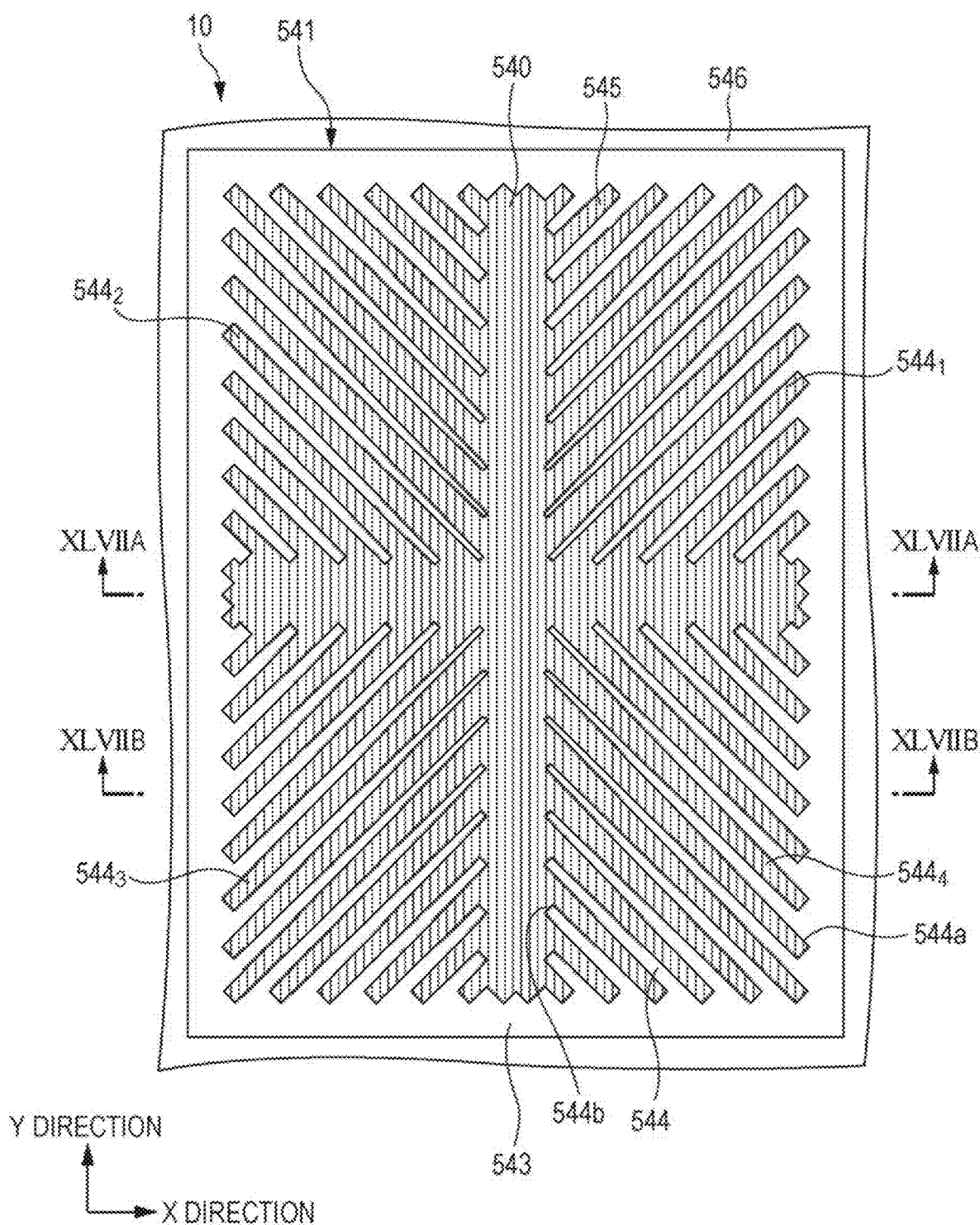
FIG. 46 is a plan view schematically illustrating a first electrode corresponding to one pixel that forms a modification example of the liquid crystal display apparatus according to Example 8.
Figure 47A:
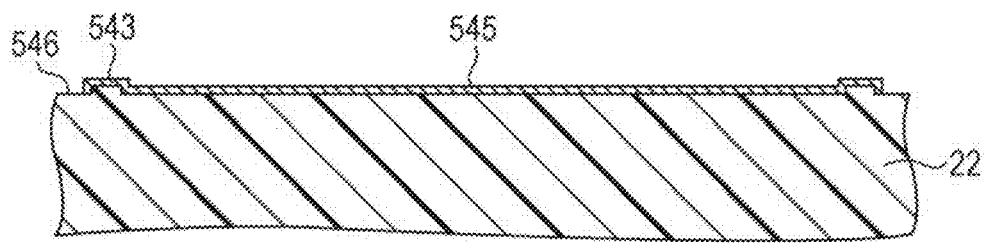
FIGS. 47A and 47B are local sectional views schematically illustrating the first electrode and the like taken along arrows XLVIIA-XLVIIA and XLVIIB-XLVIIB in FIG. 46.
Figure 47B:
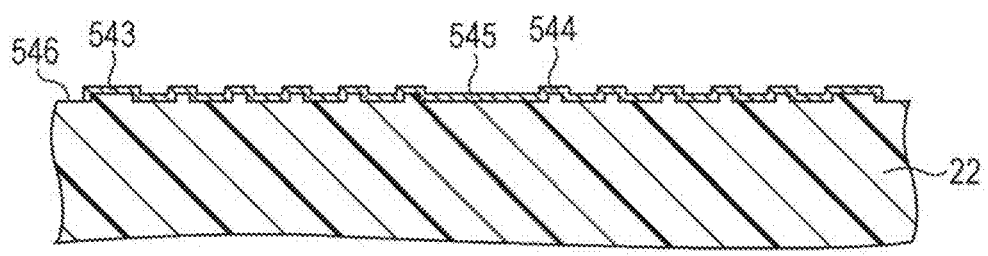
Figure 47C:
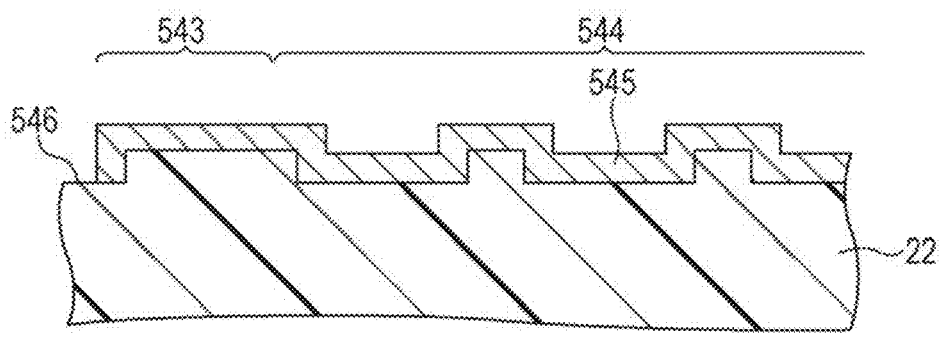
FIG. 47C is a local sectional view schematically illustrating an enlarged part of the first electrode in FIG. 47B.

The liquid crystal display apparatus described in Example 8 may be modified, like a liquid crystal display apparatus shown in FIG. 46. FIG. 46 is a plan view schematically illustrating a first electrode corresponding to one pixel that forms a modification example of the liquid crystal display apparatus according to Example 8, FIGS. 47A and 47B are local sectional views schematically illustrating the first electrode and the like taken along arrows XLVIIA-XLVIIA and XLVIIB-XLVIIB in FIG. 46, and FIG. 47C is a local sectional view schematically illustrating an enlarged part of the first electrode in FIG. 47B.

Here, a concave and convex portion 541 includes a stem convex portion (main convex portion) 543 that is formed in a frame shape in the periphery of a pixel, and a plurality of branch convex portions (sub convex portions) 544 that extends from the stem convex portion 543 toward the inside of the pixel. Further, the plurality of branch convex portions 544 corresponds to a part of the convex portions provided in the first electrode. Here, the width of the branch convex portion 544 is largest in a part 544a of the branch convex portion that is joined to the stem convex portion 543 and is narrowed from the part 544a that is joined to the stem convex portion 543 toward a tip part 544b. More specifically, the width of the branch convex portion 544 is linearly narrowed from the part 544a that is joined to the stem convex portion 543 toward the tip part 544b. The width of the branch convex portion 544 may be uniform. Reference numeral 545 represents concave portions.

Further, assuming that the X axis and the Y axis pass through the center of the pixel, and assuming that the (X, Y) coordinate system is formed by the X axis and the Y axis that are straight lines parallel to edge portions of the pixel, a plurality of branch convex portions 5441 that occupies a first quadrant extends in parallel in a direction where a value on the Y coordinate increases when a value on the X coordinate increases, a plurality of branch convex portions 5442 that occupies a second quadrant extends in parallel in a direction where a value on the Y coordinate increases when a value on the X coordinate decreases, a plurality of branch convex portions 5443 that occupies a third quadrant extends in parallel in a direction where a value on the Y coordinate decreases when a value on the X coordinate decreases, a plurality of branch convex portions 5444 that occupies a fourth quadrant extends in parallel in a direction where a value on the Y coordinate decreases when a value on the X coordinate increases.

The plurality of branch convex portions 5441 that occupies the first quadrant has an axis line that extends at 45 degrees with respect to the X axis, the plurality of branch convex portions 5442 that occupies the second quadrant has an axis line that extends at 135 degrees with respect to the X axis, the plurality of branch convex portions 5443 that occupies the third quadrant has an axis line that extends at 225 degrees with respect to the X axis, and the plurality of branch convex portions 5444 that occupies the fourth quadrant has an axis line that extends at 315 degrees with respect to the X axis.

The present disclosure may have the following configurations.

[1] Liquid Crystal Display Apparatus: Embodiment 1

A liquid crystal display apparatus that includes arrangement of a plurality of pixels, each pixel including: a first substrate and a second substrate; a first electrode formed on an opposed surface of the first substrate that faces the second substrate; a first alignment film that covers the first electrode and the opposed surface of the first substrate; a second electrode formed on an opposed surface of the second substrate that faces the first substrate; a second alignment film that covers the second electrode and the opposed surface of the second substrate; and a liquid crystal layer that includes liquid crystal molecules provided between the first alignment film and the second alignment film, wherein a pre-tilt is given to the liquid crystal molecules, wherein a plurality of concave and convex portions is formed in the first electrode, and wherein assuming that an X axis and a Y axis pass through the center of the pixel, a plurality of convex portions that occupies a first quadrant extends in parallel in a direction where a value on the Y coordinate increases when a value on the X coordinate increases, a plurality of convex portions that occupies a second quadrant extends in parallel in a direction where a value on the Y coordinate increases when a value on the X coordinate decreases, a plurality of convex portions that occupies a third quadrant extends in parallel in a direction where a value on the Y coordinate decreases when a value on the X coordinate decreases, and a plurality of convex portions that occupies a fourth quadrant extends in parallel in a direction where a value on the Y coordinate decreases when a value on the X coordinate increases.

[2] The liquid crystal display apparatus according to [1], wherein each convex portion that extends from the X axis and occupies the first quadrant is joined to each convex portion that extends from the X axis and occupies the fourth quadrant, wherein each convex portion that extends from the Y axis and occupies the first quadrant is joined to each convex portion that extends from the Y axis and occupies the second quadrant, wherein each convex portion that extends from the X axis and occupies the second quadrant is joined to each convex portion that extends from the X axis and occupies the third quadrant, and wherein each convex portion that extends from the Y axis and occupies the third quadrant is joined to each convex portion that extends from the Y axis and occupies the fourth quadrant.

[3] The liquid crystal display apparatus according to [2], wherein a protrusion that extends in a direction toward the periphery of the pixel is provided at a junction of two convex portions.

[4] The liquid crystal display apparatus according to [3], wherein the protrusion is surrounded by a plurality of segments.

[5] The liquid crystal display apparatus according to [3], wherein the protrusion is surrounded by a single curve.

[6] The liquid crystal display apparatus according to [3], wherein the protrusion is surrounded by a plurality of curves.

[7] The liquid crystal display apparatus according to [1], wherein each convex portion that extends from the X axis or the vicinity thereof and occupies the first quadrant is not joined to each convex portion that extends from the X axis or the vicinity thereof and occupies the fourth quadrant, each convex portion that extends from the Y axis or the vicinity thereof and occupies the first quadrant is not joined to each convex portion that extends from the Y axis or the vicinity thereof and occupies the second quadrant, each convex portion that extends from the X axis or the vicinity thereof and occupies the second quadrant is not joined to each convex portion that extends from the X axis or the vicinity thereof and occupies the third quadrant, and each convex portion that extends from the Y axis or the vicinity thereof and occupies the third quadrant is not joined to each convex portion that extends from the Y axis or the vicinity thereof and occupies the fourth quadrant.

[8] The liquid crystal display apparatus according to any one of [1] to [7], wherein the width of the convex portion is narrowed toward the periphery of the pixel.

[9] The liquid crystal display apparatus according to any one of [1] to [8], wherein a slit portion is further formed in the first electrode.

[10] The liquid crystal display apparatus according to [9], wherein the slit portion is formed in a convex portion region.

[11] The liquid crystal display apparatus according to [10], wherein the slit portion is provided in the convex portion region that includes a central part of the pixel.

[12] The liquid crystal display apparatus according to [10], wherein the slit portion is formed in the convex portion region that extends toward a central region of the pixel.

[13] The liquid crystal display apparatus according to [10], wherein the slit portion is formed in the convex portion region provided in a region that is narrowed by the convex portion that extends toward a central region of the pixel and the Y axis.

[14] The liquid crystal display apparatus according to [9], wherein the slit portion that extends in parallel to the convex portion is formed at a top part of the convex portion.

[15] The liquid crystal display apparatus according to [9], wherein the slit portion that extends in parallel to the concave portion is formed at a bottom part of the concave portion.

[16] The liquid crystal display apparatus according to any one of [1] to [13], wherein a recess is provided in the first electrode in a central region of the pixel.

[17] The liquid crystal display apparatus according to [16], wherein the recess becomes narrow toward the first substrate.

[18] The liquid crystal display apparatus according to [17], wherein an inclination angle of the recess is 5 degrees to 60 degrees.

[19] The liquid crystal display apparatus according to any one of [16] to [18], wherein the shape of an outer edge of the recess is a circle.

[20] The liquid crystal display apparatus according to any one of [16] to [18], wherein the shape of the outer edge of the recess is a rectangle.

[21] The liquid crystal display apparatus according to [20], wherein an angle formed by an outer edge of the rectangular recess and an extension direction of the convex portion is 90 degrees.

[22] The liquid crystal display apparatus according to [20], wherein an angle formed by an outer edge of the rectangular recess and an extension direction of the convex portion is an acute angle.

[23] The liquid crystal display apparatus according to any one of [16] to [22], wherein a central part of the recess forms a part of a contact hole.

[24] The liquid crystal display apparatus according to any one of [1] to [23], wherein the convex portion that extends from the X axis or the vicinity thereof and occupies the first quadrant and the convex portion that extends from the X axis or the vicinity thereof and occupies the fourth quadrant are formed in a state of deviating from each other, wherein the convex portion that extends from the Y axis or the vicinity thereof and occupies the first quadrant and the convex portion that extends from the Y axis or the vicinity thereof and occupies the second quadrant are formed in a state of deviating from each other, wherein the convex portion that extends from the X axis or the vicinity thereof and occupies the second quadrant and the convex portion that extends from the X axis or the vicinity thereof and occupies the third quadrant are formed in a state of deviating from each other, and wherein the convex portion that extends from the Y axis or the vicinity thereof and occupies the third quadrant and the convex portion that extends from the Y axis or the vicinity thereof and occupies the fourth quadrant are formed in a state of deviating from each other.

[25] The liquid crystal display apparatus according to [24], wherein when a formation pitch of the convex portions along the X axis is $P_x$ and a formation pitch of the convex portions along the Y axis is $P_y$, the convex portions that extend from the X axis or the vicinity thereof and occupy the first quadrant and the convex portions that extend from the X axis or the vicinity thereof and occupy the fourth quadrant are formed in a state of deviating from each other by $(P_x/2)$; the convex portions that extend from the Y axis or the vicinity thereof and occupy the first quadrant and the convex portions that extend from the Y axis or the vicinity thereof and occupy the second quadrant are formed in a state of deviating from each other $(P_y/2)$; the convex portions that extend from the X axis or the vicinity thereof and occupy the second quadrant and the convex portions that extend from the X axis or the vicinity thereof and occupy the third quadrant are formed in a state of deviating from each other by $(P_x/2)$; and the convex portions that extend from the Y axis or the vicinity thereof and occupy the third quadrant and the convex portions that extend from the Y axis or the vicinity thereof and occupy the fourth quadrant are formed in a state of deviating from each other by $(P_y/2)$.

[26] Liquid Crystal Display Apparatus: Embodiment 2

A liquid crystal display apparatus that includes arrangement of a plurality of pixels, each pixel including: a first substrate and a second substrate; a first electrode formed on an opposed surface of the first substrate that faces the second substrate; a first alignment film that covers the first electrode and the opposed surface of the first substrate; a second electrode formed on an opposed surface of the second substrate that faces the first substrate; a second alignment film that covers the second electrode and the opposed surface of the second substrate; and a liquid crystal layer that includes liquid crystal molecules provided between the first alignment film and the second alignment film, wherein a pre-tilt is given to the liquid crystal molecules, wherein a plurality of concave and convex portions is formed in the first electrode, and wherein assuming that an X axis and a Y axis pass through the center of the pixel, the plurality of concave and convex portions includes a stem convex portion that extends on the X axis and the Y axis and a plurality of branch convex portions that extends from a side edge of the stem convex portion toward the periphery of the pixel, wherein an extension direction of a side edge part of the stem convex portion that is not joined to the branch convex portions is not parallel to the X axis and is not parallel to the Y axis.

[27] The liquid crystal display apparatus according to [26], wherein the stem convex portion that forms the plurality of concave and convex portions is not formed on the X axis and the Y axis, but is formed in a frame shape in the periphery of the pixel.

[28] The liquid crystal display apparatus according to [26] or [27], wherein the side edge part of the stem convex portion that is not joined to the branch convex portions has a straight line shape.

[29] The liquid crystal display apparatus according to any one of [26] to [28], wherein the side edge part of the stem convex portion that is not joined to the branch convex portions has a curved line shape.

[30] The liquid crystal display apparatus according to any one of [26] to [29], wherein the width of a part of the stem convex portion that is not joined to the branch convex portions is narrowed toward a tip part of the stem convex portion.

[31] The liquid crystal display apparatus according to any one of [26] to [30], wherein the width of each branch convex portion is narrowed toward the periphery of the pixel.

[32] The liquid crystal display apparatus according to any one of [26] to [31], wherein a slit portion is further formed in the first electrode.

[33] The liquid crystal display apparatus according to [32], wherein a slit portion is formed in a convex portion region.

[34] The liquid crystal display apparatus according to [33], wherein the slit portion is provided in the convex portion region that includes a central part of the pixel.

[35] The liquid crystal display apparatus according to [33], wherein the slit portion is formed in the convex portion region that extends toward a central region of the pixel.

[36] The liquid crystal display apparatus according to [33], wherein the slit portion is formed in the convex portion region provided in a region that is narrowed by the branch convex portion that extends toward a central region of the pixel and the Y axis.

[37] The liquid crystal display apparatus according to [32], wherein the slit portion that extends in parallel to the convex portion is formed at a top part of the convex portion.

[38] The liquid crystal display apparatus according to [32], wherein the slit portion that extends in parallel to the concave portion is formed at a bottom part of the concave portion.

[39] The liquid crystal display apparatus according to any one of [26] to [36], wherein a recess is provided in the first electrode in a central region of the pixel.

[40] The liquid crystal display apparatus according to [39], wherein the recess becomes narrow toward the first substrate.

[41] The liquid crystal display apparatus according to [40], wherein an inclination angle of the recess is 5 degrees to 60 degrees.

[42] The liquid crystal display apparatus according to any one of [39] to [41], wherein the shape of an outer edge of the recess is a circle.

[43] The liquid crystal display apparatus according to any one of [39] to [41], wherein the shape of the outer edge of the recess is a rectangle.

[44] The liquid crystal display apparatus according to [43], wherein an angle formed by an outer edge of the rectangular recess and an extension direction of the convex portion is 90 degrees.

[45] The liquid crystal display apparatus according to [43], wherein an angle formed by an outer edge of the rectangular recess and an extension direction of the convex portion is an acute angle.

[46] The liquid crystal display apparatus according to any one of [39] to [45], wherein a central part of the recess forms a part of a contact hole.

[47] The liquid crystal display apparatus according to any one of [26] to [46], wherein a plurality of branch convex portions that occupies a first quadrant extends in parallel in a direction where a value on the Y coordinate increases when a value on the X coordinate increases, a plurality of branch convex portions that occupies a second quadrant extends in parallel in a direction where a value on the Y coordinate increases when a value on the X coordinate decreases, a plurality of branch convex portions that occupies a third quadrant extends in parallel in a direction where a value on the Y coordinate decreases when a value on the X coordinate decreases, a plurality of branch convex portions that occupies a fourth quadrant extends in parallel in a direction where a value on the Y coordinate decreases when a value on the X coordinate increases.

[48] The liquid crystal display apparatus according to any one of [26] to [47], wherein the branch convex portions that extend from the stem convex portion on the X axis and occupy the first quadrant and the branch convex portions that extend from the stem convex portion on the X axis and occupy the fourth quadrant are formed in a state of deviating from each other, the branch convex portions that extend from the stem convex portion on the Y axis and occupy the first quadrant and the branch convex portions that extend from the stem convex portion on the Y axis and occupy the second quadrant are formed in a state of deviating from each other, the branch convex portions that extend from the stem convex portion on the X axis and occupy the second quadrant and the branch convex portions that extend from the stem convex portion on the X axis and occupy the third quadrant are formed in a state of deviating from each other, and the branch convex portions that extend from the stem convex portion on the Y axis and occupy the third quadrant and the branch convex portions that extend from the stem convex portion on the Y axis and occupy the fourth quadrant are formed in a state of deviating from each other.

[49] The liquid crystal display apparatus according to [48], wherein when a formation pitch of the branch convex portions along the X axis is $P_x$ and a formation pitch of the branch convex portions along the Y axis is $P_y$, the branch convex portions that extend from the stem convex portion on the X axis and occupy the first quadrant and the branch convex portions that extend from the stem convex portion on the X axis and occupy the fourth quadrant are formed in a state of deviating from each other ($P_x/2$), the branch convex portions that extend from the stem convex portion on the Y axis and occupy the first quadrant and the branch convex portions that extend from the stem convex portion on the Y axis and occupy the second quadrant are formed in a state of deviating from each other ($P_y/2$), the branch convex portions that extend from the stem convex portion on the X axis and occupy the second quadrant and the branch convex portions that extend from the stem convex portion on the X axis and occupy the third quadrant are formed in a state of deviating from each other ($P_x/2$), and the branch convex portions that extend from the stem convex portion on the Y axis and occupy the third quadrant and the branch convex portions that extend from the stem convex portion on the Y axis and occupy the fourth quadrant are formed in a state of deviating from each other ($P_y/2$).

[50] Liquid Crystal Display Apparatus: Embodiment 3

A liquid crystal display apparatus that includes arrangement of a plurality of pixels, each pixel including: a first substrate and a second substrate; a first electrode formed on an opposed surface of the first substrate that faces the second substrate; a first alignment film that covers the first electrode and the opposed surface of the first substrate; a second electrode formed on an opposed surface of the second substrate that faces the first substrate; a second alignment film that covers the second electrode and the opposed surface of the second substrate; and a liquid crystal layer that includes liquid crystal molecules provided between the first alignment film and the second alignment film, wherein a pre-tilt is given to the liquid crystal molecules, wherein a plurality of concave and convex portions is formed in the first electrode, and wherein a slit portion is further formed in the first electrode.

[51] The liquid crystal display apparatus according to [50], wherein the slit portion is formed in a convex portion region.

[52] The liquid crystal display apparatus according to [51], wherein the slit portion is provided in the convex portion region that includes a central part of the pixel.

[53] The liquid crystal display apparatus according to [51], wherein the slit portion is formed in the convex portion region that extends toward a central region of the pixel.

[54] The liquid crystal display apparatus according to [51], wherein the slit portion is formed in the convex portion region provided in a region that is narrowed by the convex portion that extends toward a central region of the pixel and the Y axis.

[55] The liquid crystal display apparatus according to [50], wherein the slit portion that extends in parallel to the convex portion is formed at a top part of the convex portion.

[56] The liquid crystal display apparatus according to [50], wherein the slit portion that extends in parallel to the concave portion is formed at a bottom part of the concave portion.

[57] The liquid crystal display apparatus according to any one of [50] to [54], wherein the width of the convex portion is narrowed toward the periphery of the pixel.

[58] The liquid crystal display apparatus according to any one of [50] to [57], wherein a recess is provided in the first electrode in a central region of the pixel.

[59] The liquid crystal display apparatus according to [58], wherein the recess is narrowed toward the first substrate.

[60] The liquid crystal display apparatus according to [59], wherein an inclination angle of the recess is 5 degrees to 60 degrees.

[61] The liquid crystal display apparatus according to any one of [58] to [60], wherein the outer shape of the recess is a circle.

[62] The liquid crystal display apparatus according to any one of [58] to [60], wherein the outer shape of the recess is a rectangle.

[63] The liquid crystal display apparatus according to [62], wherein an angle formed by an outer edge of the rectangular recess and an extension direction of the convex portion is 90 degrees.

[64] The liquid crystal display apparatus according to [62], wherein an angle formed by an outer edge of the rectangular recess and an extension direction of the convex portion is an acute angle.

[65] The liquid crystal display apparatus according to any one of [58] to [64], wherein a central part of the recess forms a part of a contact hole.

[66] The liquid crystal display apparatus according to any one of [50] to [65], wherein assuming that the X axis and the Y axis pass through the center of the pixel, the plurality of concave and convex portions includes a stem convex portion that extends on the X axis and the Y axis and a plurality of branch convex portions that extends from a side edge of the stem convex portion toward the periphery of the pixel.

[67] The liquid crystal display apparatus according to [66], wherein a plurality of branch convex portions that occupies a first quadrant extends in parallel in a direction where a value on the Y coordinate increases when a value on the X coordinate increases, a plurality of branch convex portions that occupies a second quadrant extends in parallel in a direction where a value on the Y coordinate increases when a value on the X coordinate decreases, a plurality of branch convex portions that occupies a third quadrant extends in parallel in a direction where a value on the Y coordinate decreases when a value on the X coordinate decreases, a plurality of branch convex portions that occupies a fourth quadrant extends in parallel in a direction where a value on the Y coordinate decreases when a value on the X coordinate increases.

[68] The liquid crystal display apparatus according to [67], wherein the branch convex portions that extend from the stem convex portion on the X axis and occupy the first quadrant and the branch convex portions that extend from the stem convex portion on the X axis and occupy the fourth quadrant are formed in a state of deviating from each other, the branch convex portions that extend from the stem convex portion on the Y axis and occupy the first quadrant and the branch convex portions that extend from the stem convex portion on the Y axis and occupy the second quadrant are formed in a state of deviating from each other, the branch convex portions that extend from the stem convex portion on the X axis and occupy the second quadrant and the branch convex portions that extend from the stem convex portion on the X axis and occupy the third quadrant are formed in a state of deviating from each other, and the branch convex portions that extend from the stem convex portion on the Y axis and occupy the third quadrant and the branch convex portions that extend from the stem convex portion on the Y axis and occupy the fourth quadrant are formed in a state of deviating from each other.

[69] The liquid crystal display apparatus according to [68], wherein when a formation pitch of the branch convex portions along the X axis is $P_x$ and a formation pitch of the branch convex portions along the Y axis is $P_y$, the branch convex portions that extend from the stem convex portion on the X axis and occupy the first quadrant and the branch convex portions that extend from the stem convex portion on the X axis and occupy the fourth quadrant are formed in a state of deviating from each other ($P_x/2$), the branch convex portions that extend from the stem convex portion on the Y axis and occupy the first quadrant and the branch convex portions that extend from the stem convex portion on the Y axis and occupy the second quadrant are formed in a state of deviating from each other ($P_y/2$), the branch convex portions that extend from the stem convex portion on the X axis and occupy the second quadrant and the branch convex portions that extend from the stem convex portion on the X axis and occupy the third quadrant are formed in a state of deviating from each other ($P_x/2$), and the branch convex portions that extend from the stem convex portion on the Y axis and occupy the third quadrant and the branch convex portions that extend from the stem convex portion on the Y axis and occupy the fourth quadrant are formed in a state of deviating from each other ($P_y/2$).

[70] Liquid Crystal Display Apparatus: Embodiment 4

A liquid crystal display apparatus that includes arrangement of a plurality of pixels, each pixel including: a first substrate and a second substrate; a first electrode formed on an opposed surface of the first substrate that faces the second substrate; a first alignment film that covers the first electrode and the opposed surface of the first substrate; a second electrode formed on an opposed surface of the second substrate that faces the first substrate; a second alignment film that covers the second electrode and the opposed surface of the second substrate; and a liquid crystal layer that includes liquid crystal molecules provided between the first alignment film and the second alignment film, wherein a pre-tilt is given to the liquid crystal molecules, wherein a plurality of concave and convex portions is formed in the first electrode, and wherein a recess is provided in the first electrode in a central region of the pixel.

[71] The liquid crystal display apparatus according to [70], wherein the recess is narrowed toward the first substrate.

[72] The liquid crystal display apparatus according to [71], wherein an inclination angle of the recess is 5 degrees to 60 degrees.

[73] The liquid crystal display apparatus according to any one of [70] to [72], wherein the outer shape of the recess is a circle.

[74] The liquid crystal display apparatus according to any one of [70] to [72], wherein the outer shape of the recess is a rectangle.

[75] The liquid crystal display apparatus according to [74], wherein an angle formed by an outer edge of the rectangular recess and an extension direction of the convex portion is 90 degrees.

[76] The liquid crystal display apparatus according to [74], wherein an angle formed by an outer edge of the rectangular recess and an extension direction of the convex portion is an acute angle.

[77] The liquid crystal display apparatus according to any one of [70] to [76], wherein a central part of the recess forms a part of a contact hole.

[78] The liquid crystal display apparatus according to any one of [70] to [77], wherein assuming that the X axis and the Y axis pass through the center of the pixel, the plurality of concave and convex portions includes a stem convex portion that extends on the X axis and the Y axis and a plurality of branch convex portions that extends from a side edge of the stem convex portion toward the periphery of the pixel.

[79] The liquid crystal display apparatus according to [78], wherein a plurality of branch convex portions that occupies a first quadrant extends in parallel in a direction where a value on the Y coordinate increases when a value on the X coordinate increases, a plurality of branch convex portions that occupies a second quadrant extends in parallel in a direction where a value on the Y coordinate increases when a value on the X coordinate decreases, a plurality of branch convex portions that occupies a third quadrant extends in parallel in a direction where a value on the Y coordinate decreases when a value on the X coordinate decreases, a plurality of branch convex portions that occupies a fourth quadrant extends in parallel in a direction where a value on the Y coordinate decreases when a value on the X coordinate increases.

[80] The liquid crystal display apparatus according to [79], wherein the branch convex portions that extend from the stem convex portion on the X axis and occupy the first quadrant and the branch convex portions that extend from the stem convex portion on the X axis and occupy the fourth quadrant are formed in a state of deviating from each other, the branch convex portions that extend from the stem convex portion on the Y axis and occupy the first quadrant and the branch convex portions that extend from the stem convex portion on the Y axis and occupy the second quadrant are formed in a state of deviating from each other, the branch convex portions that extend from the stem convex portion on the X axis and occupy the second quadrant and the branch convex portions that extend from the stem convex portion on the X axis and occupy the third quadrant are formed in a state of deviating from each other, and the branch convex portions that extend from the stem convex portion on the Y axis and occupy the third quadrant and the branch convex portions that extend from the stem convex portion on the Y axis and occupy the fourth quadrant are formed in a state of deviating from each other.

[81] The liquid crystal display apparatus according to [80], wherein when a formation pitch of the branch convex portions along the X axis is $P_x$ and a formation pitch of the branch convex portions along the Y axis is $P_y$, the branch convex portions that extend from the stem convex portion on the X axis and occupy the first quadrant and the branch convex portions that extend from the stem convex portion on the X axis and occupy the fourth quadrant are formed in a state of deviating from each other ($P_x/2$), the branch convex portions that extend from the stem convex portion on the Y axis and occupy the first quadrant and the branch convex portions that extend from the stem convex portion on the Y axis and occupy the second quadrant are formed in a state of deviating from each other ($P_y/2$), the branch convex portions that extend from the stem convex portion on the X axis and occupy the second quadrant and the branch convex portions that extend from the stem convex portion on the X axis and occupy the third quadrant are formed in a state of deviating from each other ($P_x/2$), and the branch convex portions that extend from the stem convex portion on the Y axis and occupy the third quadrant and the branch convex portions that extend from the stem convex portion on the Y axis and occupy the fourth quadrant are formed in a state of deviating from each other ($P_y/2$).

[82] Liquid Crystal Display Apparatus: Embodiment 5

A liquid crystal display apparatus that includes arrangement of a plurality of pixels, each pixel including: a first substrate and a second substrate; a first electrode formed on an opposed surface of the first substrate that faces the second substrate; a first alignment film that covers the first electrode and the opposed surface of the first substrate; a second electrode formed on an opposed surface of the second substrate that faces the first substrate; a second alignment film that covers the second electrode and the opposed surface of the second substrate; and a liquid crystal layer that includes liquid crystal molecules provided between the first alignment film and the second alignment film, wherein a pre-tilt is given to the liquid crystal molecules, wherein a plurality of concave and convex portions is formed in the first electrode, wherein assuming that an X axis and a Y axis pass through the center of the pixel, the plurality of concave and convex portions includes a stem convex portion that extends on the X axis and the Y axis and a plurality of branch convex portions that extends from a side edge of the stem convex portion toward the periphery of the pixel, wherein a plurality of branch convex portions that occupies a first quadrant extends in parallel in a direction where a value on the Y coordinate increases when a value on the X coordinate increases, a plurality of branch convex portions that occupies a second quadrant extends in parallel in a direction where a value on the Y coordinate increases when a value on the X coordinate decreases, a plurality of branch convex portions that occupies a third quadrant extends in parallel in a direction where a value on the Y coordinate decreases when a value on the X coordinate decreases, and a plurality of branch convex portions that occupies a fourth quadrant extends in parallel in a direction where a value on the Y coordinate decreases when a value on the X coordinate increases, and wherein the branch convex portions that extend from the stem convex portion on the X axis and occupy the first quadrant and the branch convex portions that extend from the stem convex portion on the X axis and occupy the fourth quadrant are formed in a state of deviating from each other, the branch convex portions that extend from the stem convex portion on the Y axis and occupy the first quadrant and the branch convex portions that extend from the stem convex portion on the Y axis and occupy the second quadrant are formed in a state of deviating from each other, the branch convex portions that extend from the stem convex portion on the X axis and occupy the second quadrant and the branch convex portions that extend from the stem convex portion on the X axis and occupy the third quadrant are formed in a state of deviating from each other, and the branch convex portions that extend from the stem convex portion on the Y axis and occupy the third quadrant and the branch convex portions that extend from the stem convex portion on the Y axis and occupy the fourth quadrant are formed in a state of deviating from each other.

[83] The liquid crystal display apparatus according to [82], wherein when a formation pitch of the branch convex portions along the X axis is $P_x$ and a formation pitch of the branch convex portions along the Y axis is $P_y$, the branch convex portions that extend from the stem convex portion on the X axis and occupy the first quadrant and the branch convex portions that extend from the stem convex portion on the X axis and occupy the fourth quadrant are formed in a state of deviating from each other ($P_x/2$), the branch convex portions that extend from the stem convex portion on the Y axis and occupy the first quadrant and the branch convex portions that extend from the stem convex portion on the Y axis and occupy the second quadrant are formed in a state of deviating from each other ($P_y/2$), the branch convex portions that extend from the stem convex portion on the X axis and occupy the second quadrant and the branch convex portions that extend from the stem convex portion on the X axis and occupy the third quadrant are formed in a state of deviating from each other ($P_x/2$), and the branch convex portions that extend from the stem convex portion on the Y axis and occupy the third quadrant and the branch convex portions that extend from the stem convex portion on the Y axis and occupy the fourth quadrant are formed in a state of deviating from each other ($P_y/2$).

According to some aspects, a liquid crystal display panel comprising an electrode is provided. The electrode comprises a plurality of convex branch electrode portions arranged in a plane, the convex branch electrode portions being convex when viewed from a first direction perpendicular to the plane and extending from a central region of the electrode to a periphery of the electrode, and a plurality of concave branch electrode portions, the concave branch electrode portions being concave when viewed from the first direction, extending from the central region to the periphery and adjacent to convex branch electrode portions, wherein pairs of the plurality of convex branch electrode portions meet in the central region such that the pairs of the plurality of convex branch electrode portions form continuous convex portions, and wherein pairs of the plurality of concave branch electrode portions meet in the central region such that the pairs of the plurality of concave branch electrode portions form continuous concave portions.

In some embodiments, the central region of the electrode comprises a region extending from a first side of the electrode to a second side of the electrode.

In some embodiments, the region is a first region, and the central region of the electrode further comprises a second region extending from a third side of the electrode to a fourth side of the electrode, and the first and second regions overlap at least once.

In some embodiments, the electrode comprises a plurality of sections, the convex branch electrode portions within a first section of the plurality of sections are substantially parallel to one another and oriented at a first angle, and the convex branch electrode portions within a second section of the plurality of sections are substantially parallel to one another and oriented at a second angle, different from the first angle.

In some embodiments, the electrode exhibits rotational symmetry.

In some embodiments, at least a subset of the pairs of the plurality of concave branch electrode portions meet in the central region such that a width of an intersection of the pair of concave branch electrode portions is different from a width of the concave branch electrode portions.

In some embodiments, the width of an intersection of the pair of concave branch electrode portions is greater than the width of the concave branch electrode portions.

In some embodiments, a width of at least a subset of the concave branch electrode portions is greater in a peripheral portion of the electrode than the width of the at least a subset of concave branch electrode portions in the central region of the electrode.

In some embodiments, the liquid crystal display panel further comprises one or more openings in the electrode.

In some embodiments, the one or more openings comprise a slit within a concave branch electrode portion and/or within a convex branch electrode portion.

In some embodiments, the liquid crystal display panel further comprises a recess in the central region.

According to some aspects, a liquid crystal display panel comprising an electrode is provided. The electrode comprises a plurality of convex branch electrode portions arranged in a plane, the convex branch electrode portions being convex when viewed from a first direction perpendicular to the plane and extending from a central region of the electrode to a periphery of the electrode, and a plurality of concave branch electrode portions, the concave branch electrode portions being concave when viewed from the first direction, extending from the central region to the periphery and adjacent to convex branch electrode portions, wherein the electrode has a plurality of edges, and wherein the plurality of concave branch electrodes have a side edge within the central region that is not parallel to any of the plurality of edges of the electrode.

In some embodiments, the liquid crystal display panel further comprises a central convex electrode portion within the central region and extending from a first edge of the electrode to a second edge of the electrode.

In some embodiments, the central convex electrode portion is a first central convex electrode portion, and the liquid crystal display panel further comprises a second central convex electrode portion within the central region extending from a third edge of the electrode to a fourth edge of the electrode, and the first and second central convex electrode portions overlap at least once.

In some embodiments, the central region of the electrode comprises a region extending from the first edge of the electrode to the second edge of the electrode.

In some embodiments, the region is a first region, the central region of the electrode further comprises a second region extending from the third edge of the electrode to the fourth edge of the electrode, and the first and second regions overlap at least once.

In some embodiments, the side edges of the plurality of concave branch electrodes are curved.

In some embodiments, a width of at least a subset of the concave branch electrode portions is greater in a peripheral portion of the electrode than the width of the at least a subset of concave branch electrode portions in the central region of the electrode.

In some embodiments, the liquid crystal display panel, further comprises one or more openings in the electrode.

In some embodiments, the one or more openings comprise a slit within a concave branch electrode portion and/or within a convex branch electrode portion.

In some embodiments, at least a subset of the plurality of concave branch electrode portions meet in the central region such that concave branch electrode portions of the subset form a contiguous concave electrode portion.

In some embodiments, the liquid crystal display panel further comprises a recess in the central region.

In some embodiments, the electrode is a first electrode and the liquid crystal display panel further comprises a second electrode comprising an alignment regulating portion.

According to some aspects, a method of applying a pretilt to molecules in a liquid crystal layer of a liquid crystal display panel by applying a voltage to the liquid crystal layer via first and second electrodes is provided. The first electrode comprises a plurality of convex branch electrode portions arranged in a plane, the convex branch electrode portions being convex when viewed from a first direction perpendicular to the plane and extending from a central region of the electrode to a periphery of the electrode, and a plurality of concave branch electrode portions, the concave branch electrode portions being concave when viewed from the first direction, extending from the central region to the periphery and adjacent to convex branch electrode portions, wherein pairs of the plurality of convex branch electrode portions meet in the central region such that the pairs of the plurality of convex branch electrode portions form continuous convex portions, and wherein pairs of the plurality of concave branch electrode portions meet in the central region such that the pairs of the plurality of concave branch electrode portions form continuous concave portions.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display apparatus, comprising:
a plurality of pixels, wherein each pixel of the plurality of pixels comprises:
   a first substrate;
   a second substrate;
   a first electrode on a first opposed surface of the first substrate, the first electrode faces the second substrate;
   a first alignment film that covers both the first electrode and the first opposed surface of the first substrate;
   a color filter layer between the first substrate and the first electrode;
   a TFT layer between the color filter layer and the first opposed surface of the first substrate, wherein an entirety of a surface of the TFT layer is in contact with the first opposed surface of the first substrate;
   a second electrode on a second opposed surface of the second substrate, the second electrode faces the first substrate;
   a second alignment film that covers both the second electrode and the second opposed surface of the second substrate; and
   a liquid crystal layer that includes a plurality of liquid crystal molecules between the first alignment film and the second alignment film, wherein
      the first electrode comprises a slit portion, a plurality of concave portions and a plurality of convex portions, and
      a plurality of widths of the plurality of convex portions linearly decreases towards a periphery of the pixel.

2. The liquid crystal display apparatus according to claim 1, wherein each of the plurality of liquid crystal molecules are pre-tilted.

3. The liquid crystal display apparatus according to claim 1, wherein a first convex portion of the plurality of convex portions comprises the slit portion.

4. The liquid crystal display apparatus according to claim 1, wherein
the slit portion is in a first region of the first electrode, and
the first region includes a central region of each pixel of the plurality of pixels.

5. The liquid crystal display apparatus according to claim 1, wherein each of the plurality of concave portions and the plurality of convex portions are electrically interconnected.

6. The liquid crystal display apparatus according to claim 1, wherein
the slit portion is in a first region, and
the first region is other than a periphery of each pixel of the plurality of pixels.

7. The liquid crystal display apparatus according to claim 1, wherein the first substrate is a glass substrate with a thickness of 0.7 mm.

8. A liquid crystal display apparatus, comprising:
a plurality of pixels, wherein each pixel of the plurality of pixels comprises:
a first substrate;
a second substrate;
a first electrode on a first opposed surface of the first substrate, the first electrode faces the second substrate;
a first alignment film that covers both the first electrode and the first opposed surface of the first substrate;
a color filter layer between the first substrate and the first electrode;
a TFT layer between the color filter layer and the first opposed surface of the first substrate, wherein an entirety of a surface of the TFT layer is in contact with the first opposed surface of the first substrate;
a second electrode on a second opposed surface of the second substrate, the second electrode faces the first substrate;
a second alignment film that covers both the second electrode and the second opposed surface of the second substrate; and
a liquid crystal layer that includes a plurality of liquid crystal molecules between the first alignment film and the second alignment film, wherein
the first electrode comprises a recess in a central region of each pixel of the plurality of pixels, a plurality of concave portions, and a plurality of convex portions, and
a plurality of widths of the plurality of convex portions linearly decreases towards a periphery of the pixel.

9. The liquid crystal display apparatus according to claim 8, wherein each of the plurality of liquid crystal molecules are pre-tilted.

10. The liquid crystal display apparatus according to claim 8, wherein each of the plurality of concave portions and the plurality of convex portions are electrically interconnected.

* * * * *